(12) United States Patent
Kurosawa et al.

(10) Patent No.: US 7,866,886 B2
(45) Date of Patent: Jan. 11, 2011

(54) PACKAGING BAG WITH SELF-CLOSEABLE OUTFLOW PORT, AND METHOD OF MANUFACTURING THE PACKAGING BAG

(75) Inventors: Kazuyuki Kurosawa, Yokohama (JP); Naoto Matsuda, Yokohama (JP); Ichiro Kunihiro, Yokohama (JP)

(73) Assignee: Toyo Seikan Kaisha, Ltd., Tokyo (JP)

( * ) Notice: Subject to any disclaimer, the term of this patent is extended or adjusted under 35 U.S.C. 154(b) by 1067 days.

(21) Appl. No.: 10/535,814

(22) PCT Filed: Nov. 22, 2002

(86) PCT No.: PCT/JP02/12243

§ 371 (c)(1),
(2), (4) Date: May 20, 2005

(87) PCT Pub. No.: WO2004/048217

PCT Pub. Date: Jun. 10, 2004

(65) Prior Publication Data

US 2006/0072858 A1   Apr. 6, 2006

(51) Int. Cl.
*B65D 30/24* (2006.01)
*B65D 33/00* (2006.01)

(52) U.S. Cl. ................ 383/44; 383/200; 383/906

(58) Field of Classification Search .......... 383/44, 383/906, 200
See application file for complete search history.

(56) References Cited

U.S. PATENT DOCUMENTS

| | | | | |
|---|---|---|---|---|
| 4,793,121 A * | 12/1988 | Jamison | ............ | 53/410 |
| 4,952,068 A * | 8/1990 | Flint | ............ | 366/337 |
| 5,195,658 A * | 3/1993 | Hoshino | ............ | 222/92 |
| 5,529,224 A * | 6/1996 | Chan et al. | ............ | 222/212 |
| 5,564,143 A * | 10/1996 | Pekar et al. | ............ | 5/708 |
| 5,996,845 A * | 12/1999 | Chan | ............ | 222/107 |
| 6,641,307 B2 * | 11/2003 | Matsuda et al. | ............ | 383/38 |
| 6,655,837 B2 * | 12/2003 | Matsuda et al. | ............ | 383/38 |
| 6,732,889 B2 * | 5/2004 | Oren et al. | ............ | 222/494 |
| 6,776,307 B1 * | 8/2004 | Hagihara | ............ | 222/107 |
| 7,036,986 B2 * | 5/2006 | Matsuda et al. | ............ | 383/38 |
| 2002/0141664 A1 * | 10/2002 | Matsuda et al. | ............ | 383/40 |

(Continued)

FOREIGN PATENT DOCUMENTS

FR    2820119 A3 *    8/2002

(Continued)

*Primary Examiner*—Jes F Pascua
(74) *Attorney, Agent, or Firm*—Westerman, Hattori, Daniels & Adrian, LLP

(57) ABSTRACT

In the pouch of the present invention in which a pouring spout is formed by means of a heat-sealed part and a non-heat-sealed part by heat sealing plastic films, the inside surfaces of the films that form the portion of the boundary area between the heat-sealed part and non-heat-sealed part of the pouring spout passage on the side of the non-heat-sealed part contact each other so that no gaps are left in a closed state. Accordingly, even if the pouch is suspended with the pouring spout down following the opening of the pouring spout, the leakage of the contents such as a liquid or the like accommodated in the interior of the pouch from the pouring spout a small amount at a time can be securely prevented.

3 Claims, 28 Drawing Sheets

U.S. PATENT DOCUMENTS

| | | | |
|---|---|---|---|
| 2003/0068102 A1* | 4/2003 | Matsuda et al. | 383/38 |
| 2004/0045842 A1* | 3/2004 | Matsuda et al. | 206/219 |

FOREIGN PATENT DOCUMENTS

| | | | | |
|---|---|---|---|---|
| JP | 01099963 A | * | 4/1989 | |
| JP | 02252457 A | * | 10/1990 | |
| JP | 06312753 A | * | 11/1994 | |
| JP | 07041017 A | * | 2/1995 | |
| JP | 07041018 A | * | 2/1995 | |
| JP | 09104404 A | * | 4/1997 | |
| JP | 9-188311 | | 7/1997 | |
| JP | 09207953 A | * | 8/1997 | |
| JP | 11-70599 | | 3/1999 | |
| JP | 11-193039 | | 7/1999 | |
| JP | 11193039 A | * | 7/1999 | |
| JP | 11254558 A | * | 9/1999 | |
| JP | 2002193282 A | * | 7/2002 | |
| JP | 2003182749 A | * | 7/2003 | |
| JP | 2006188278 A | * | 7/2006 | |

* cited by examiner

Fig. 1
(A)
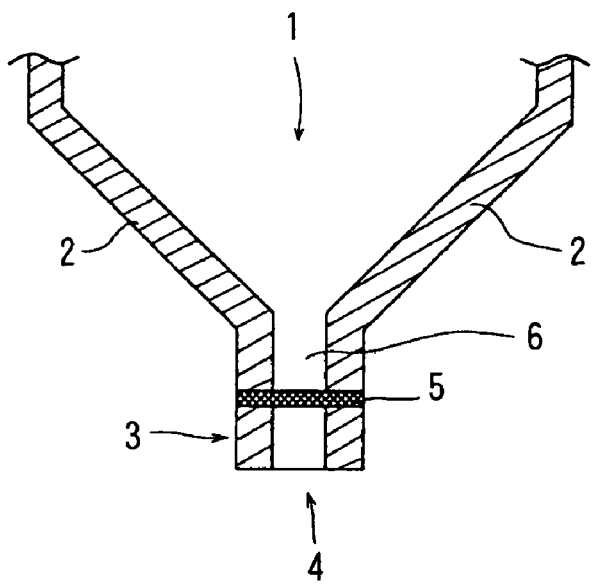
(B)
(C)
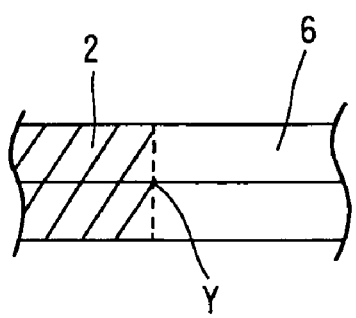
(D)
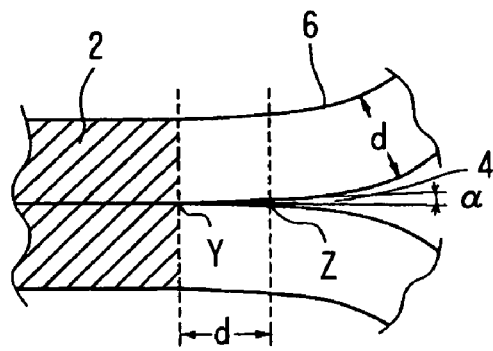
(E)
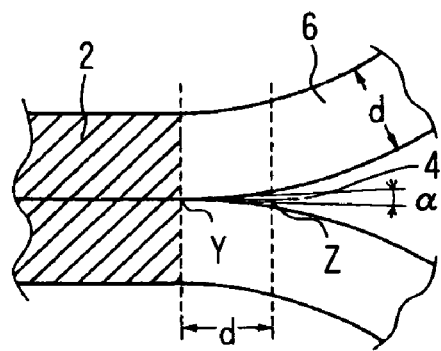

Fig. 3
(A)
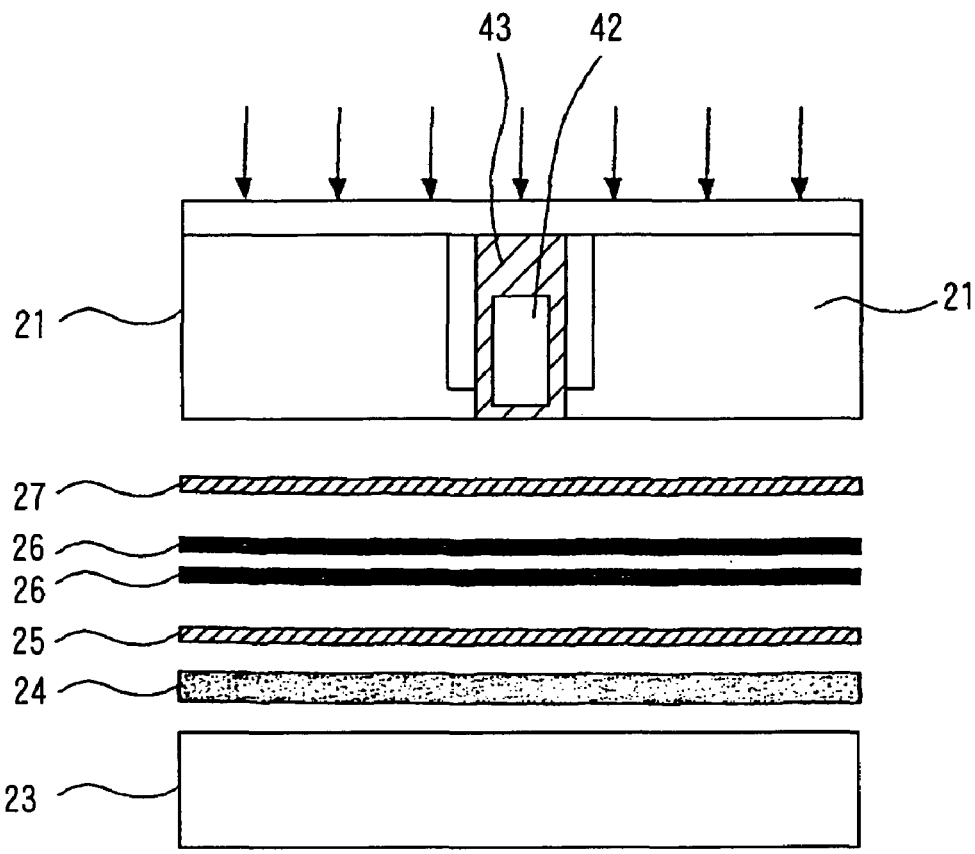
(B)
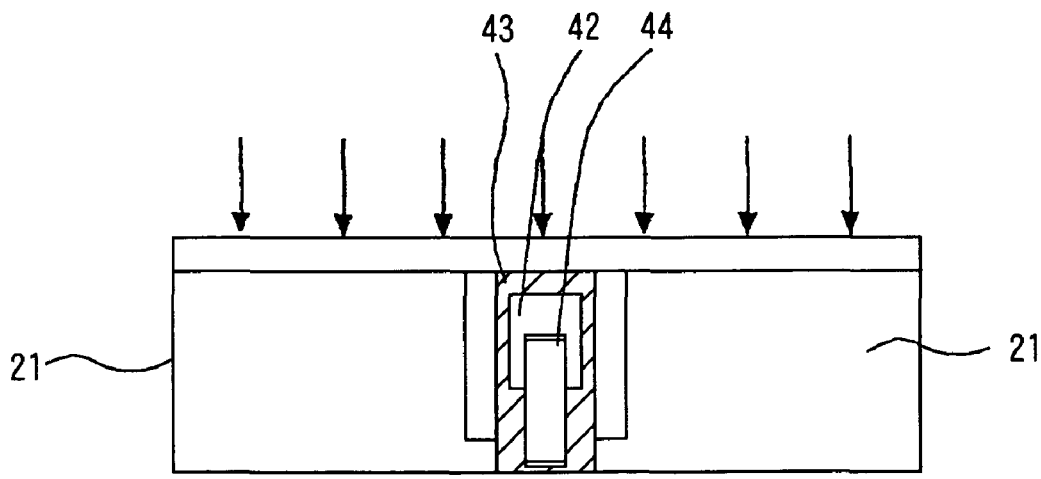

Fig. 4
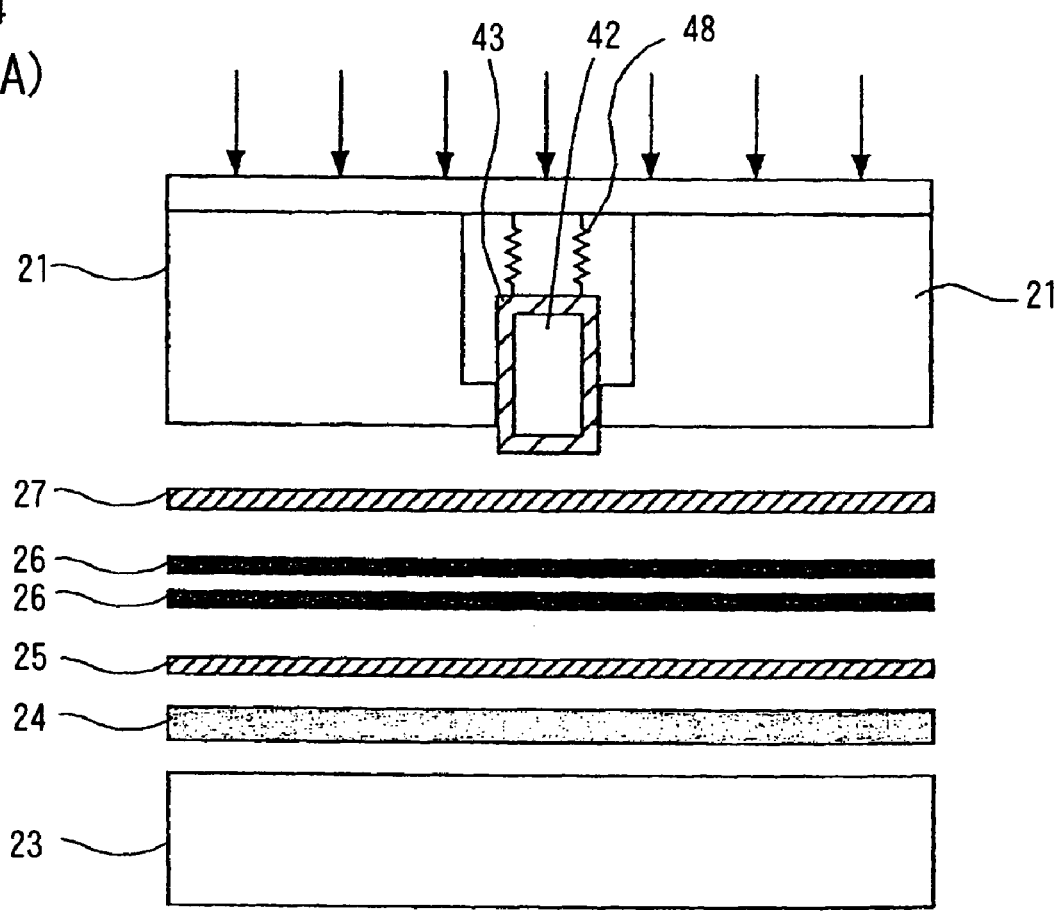
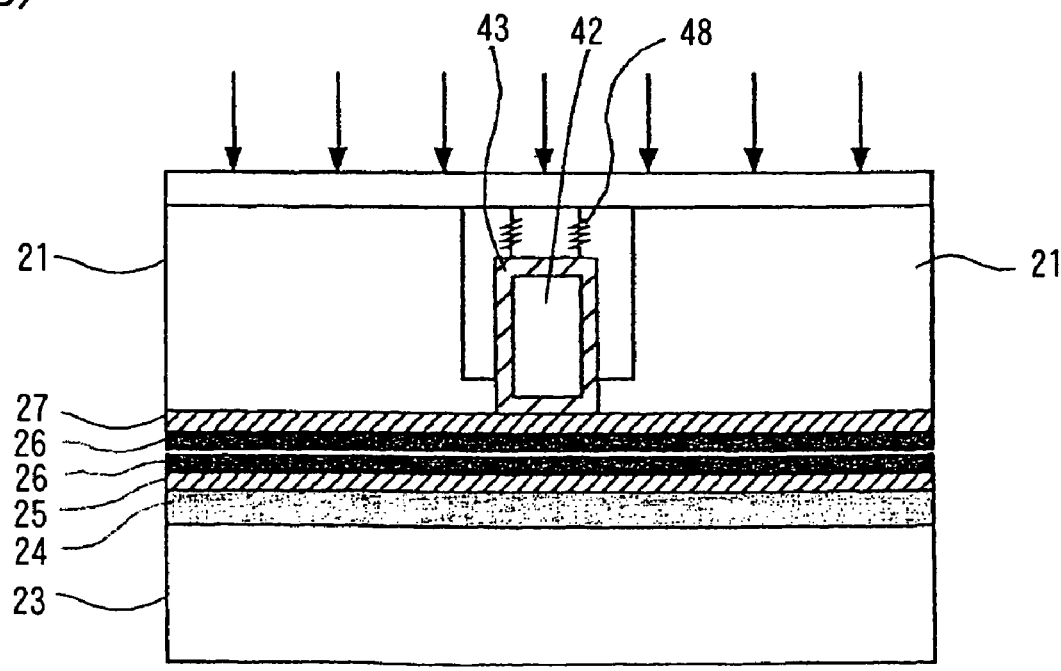

Fig. 6
(A)
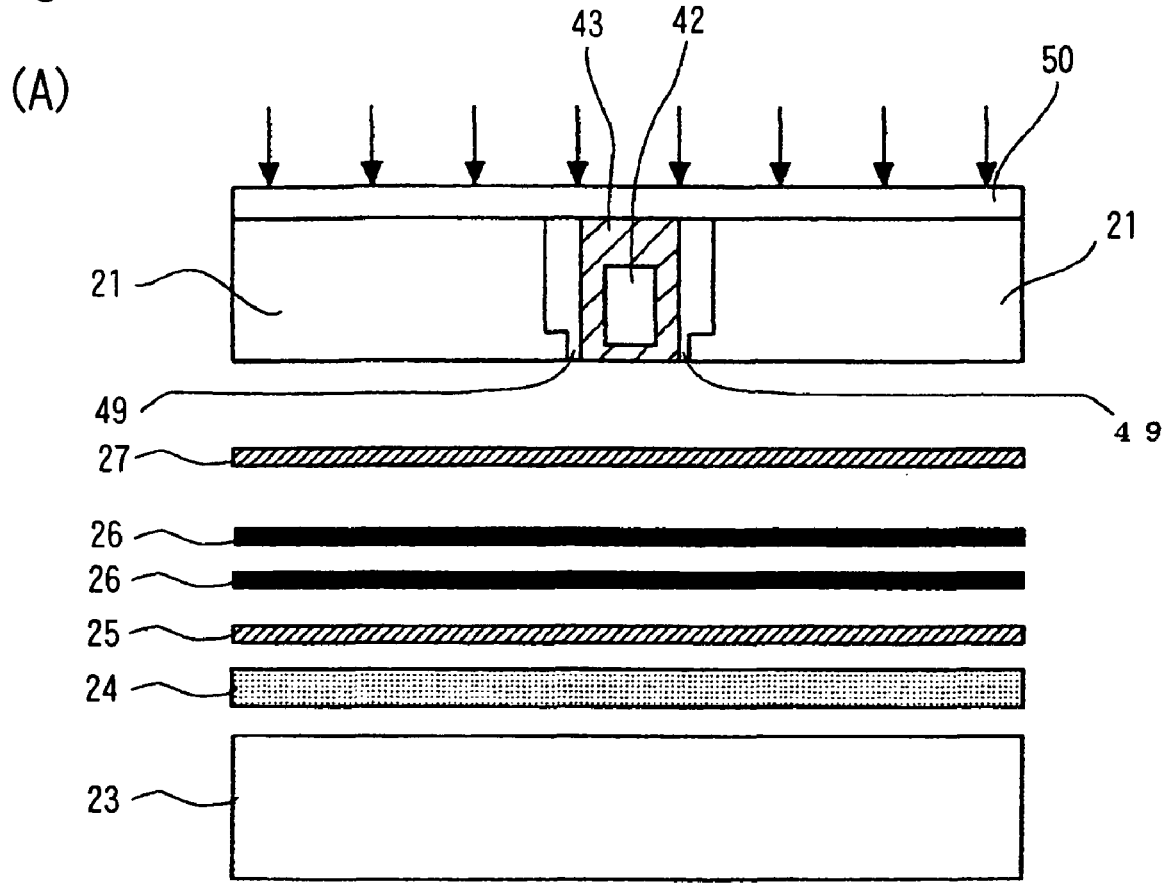
(B)
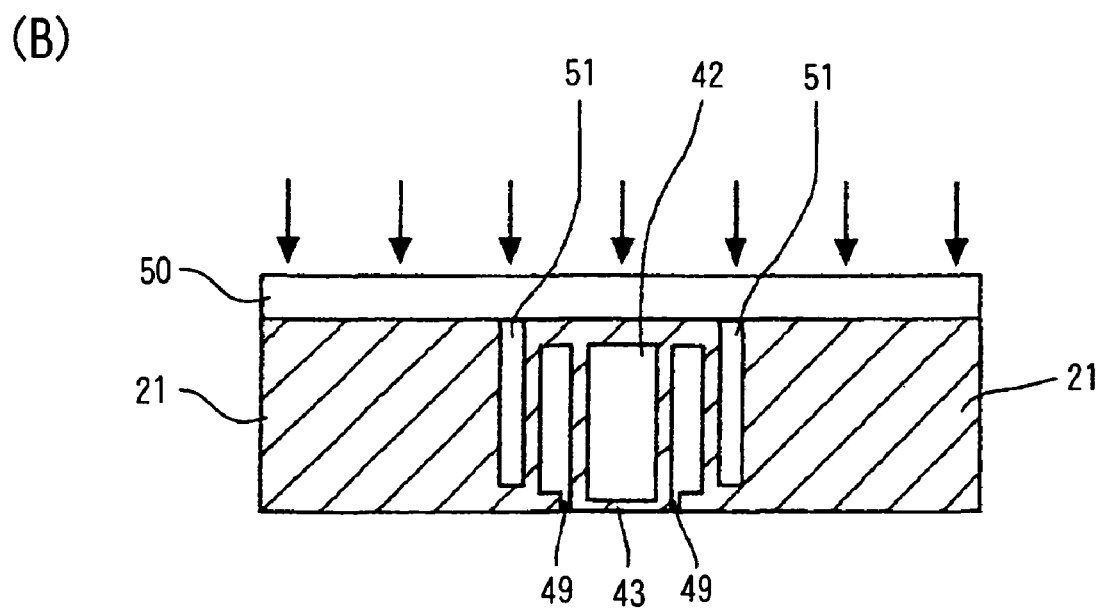

Fig. 15
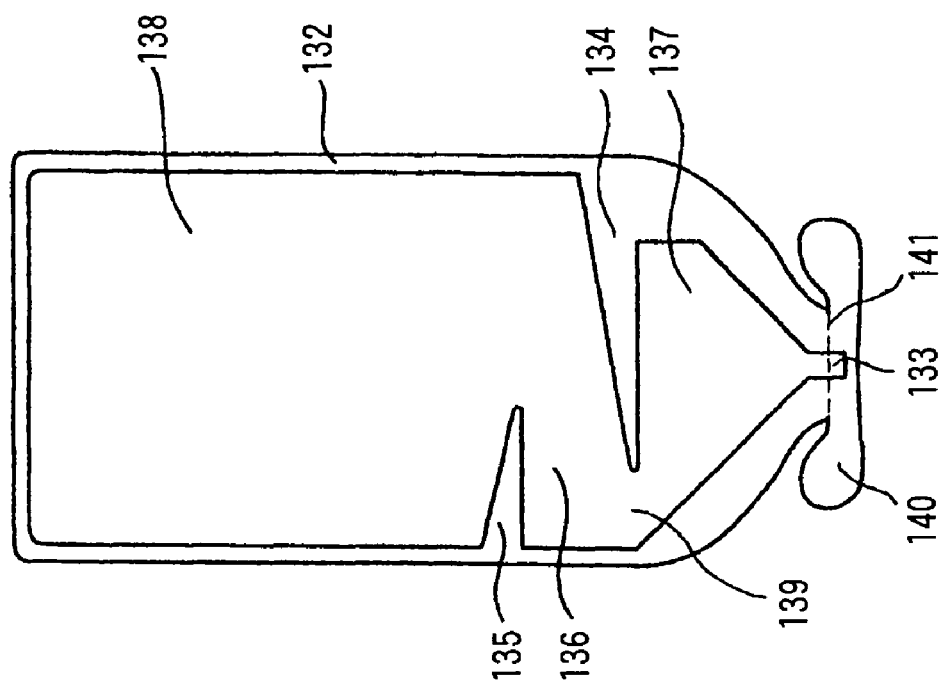
(A)
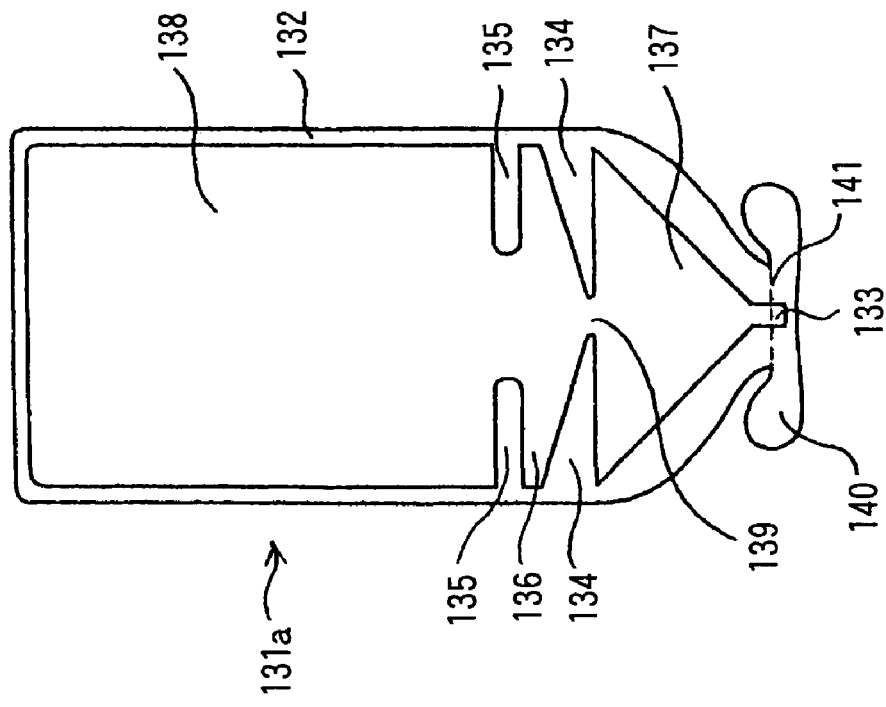
(B)

Fig. 20
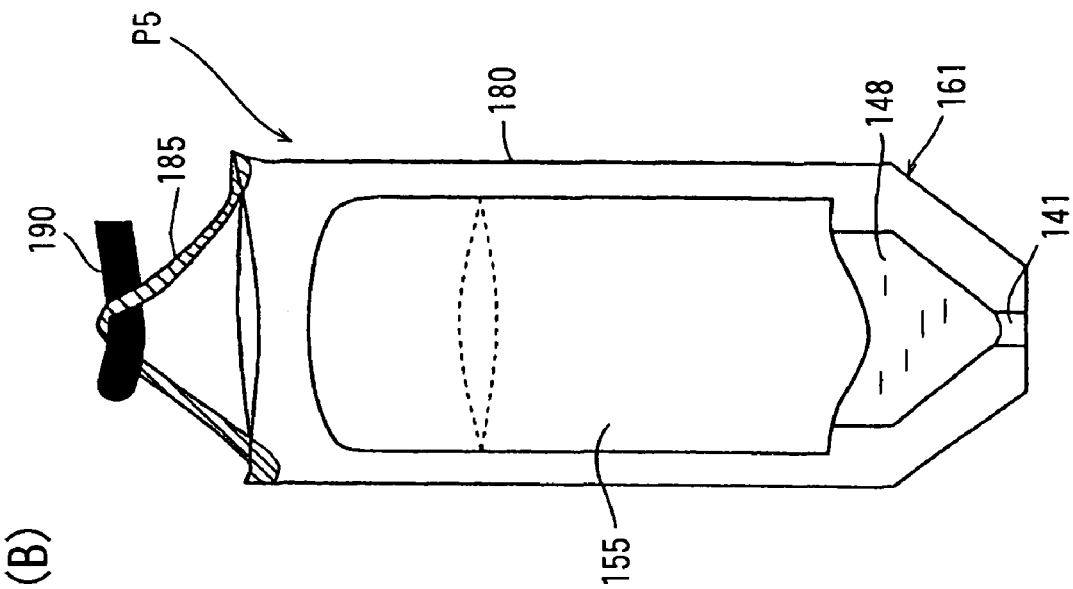
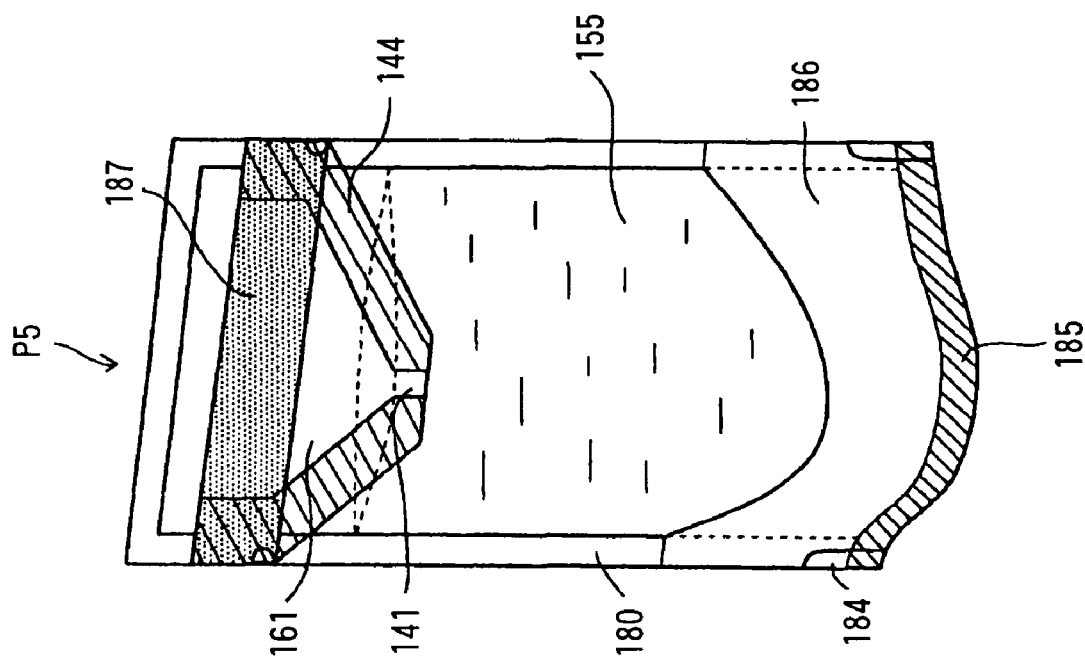

Fig. 21
(A)
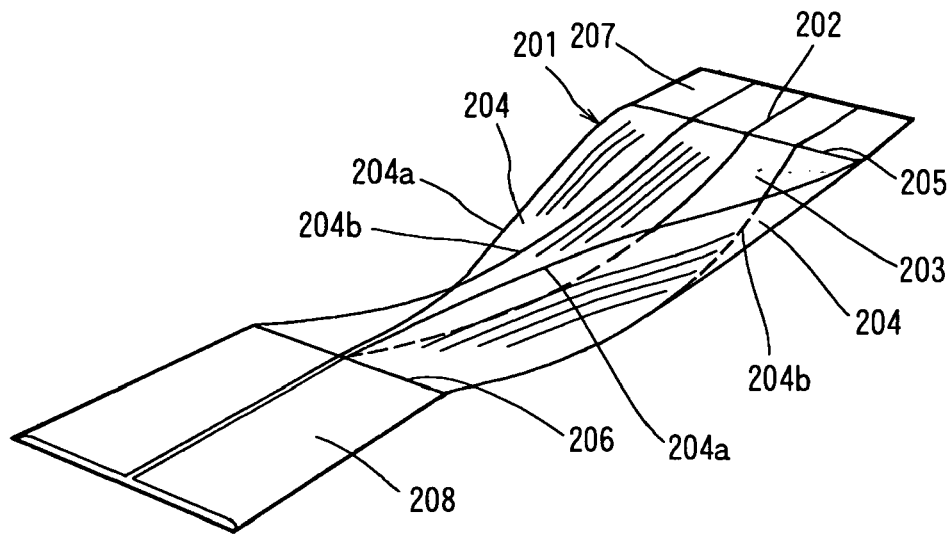
(B)
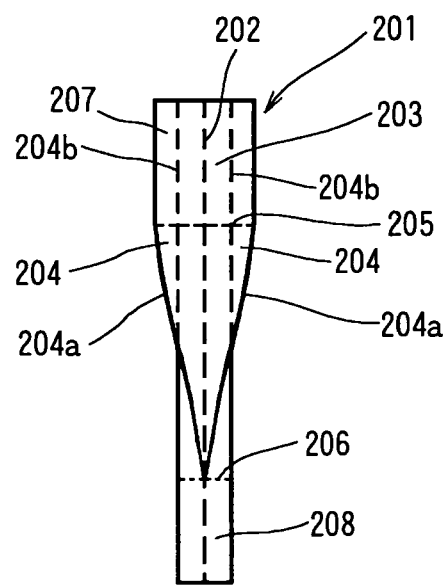
(C)
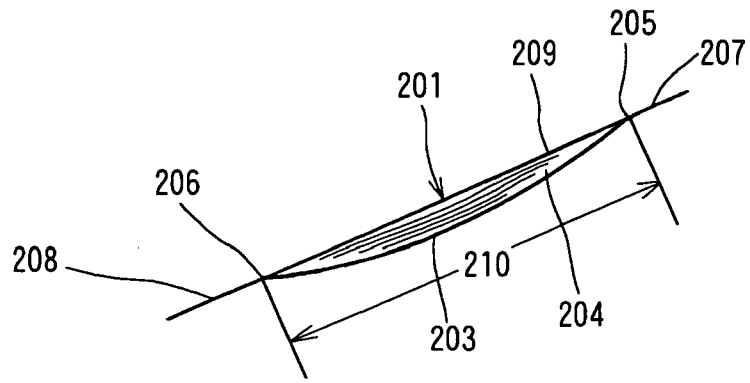

Fig. 22
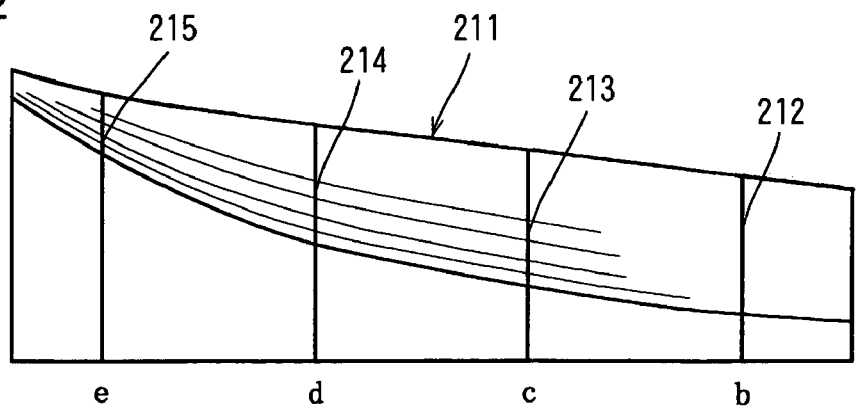
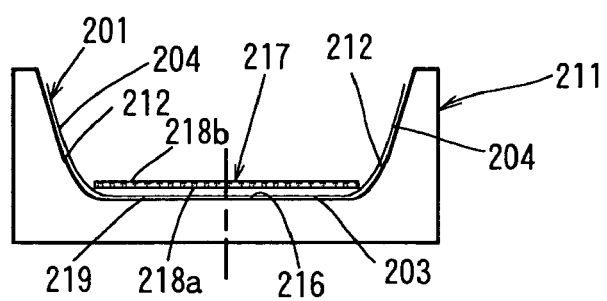
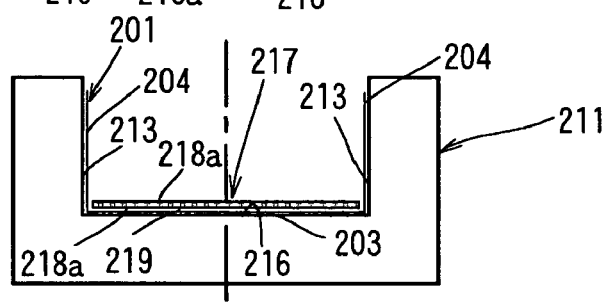
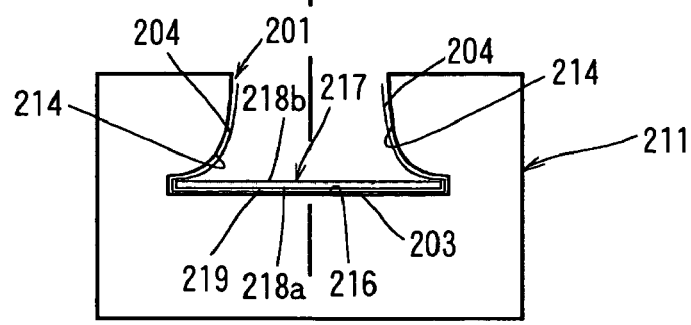
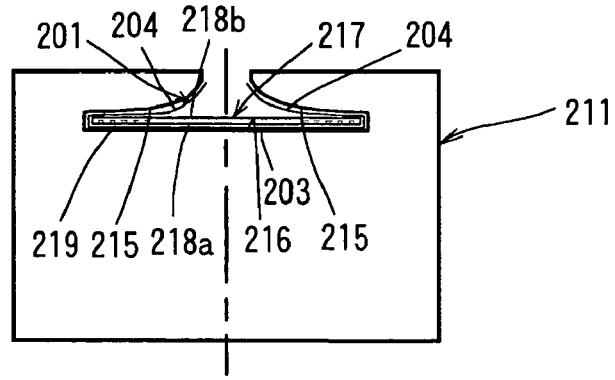

Fig. 23
(A)
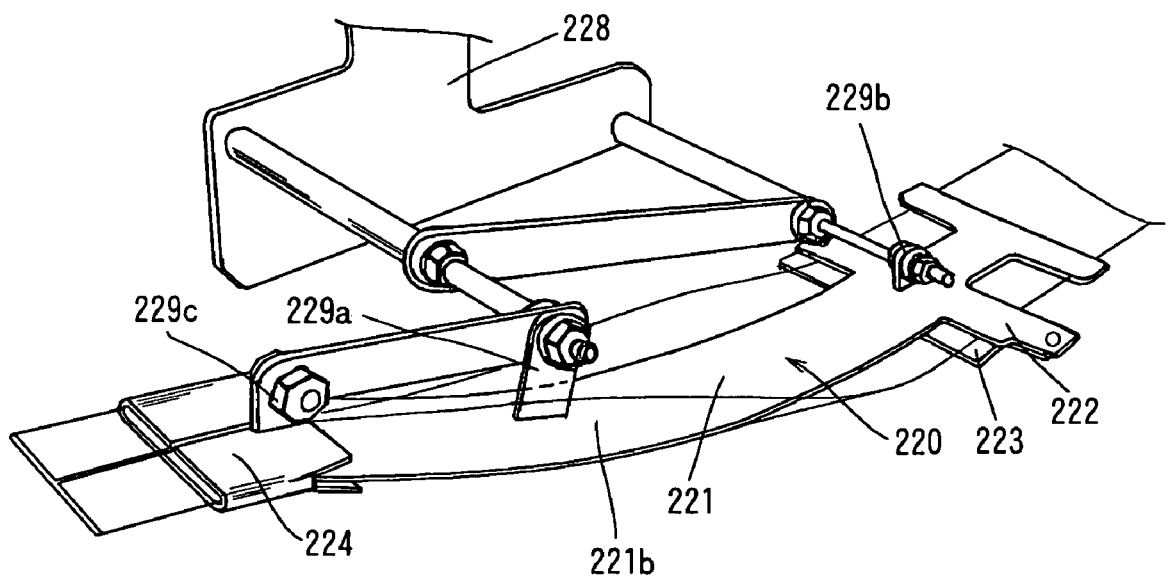
(B)
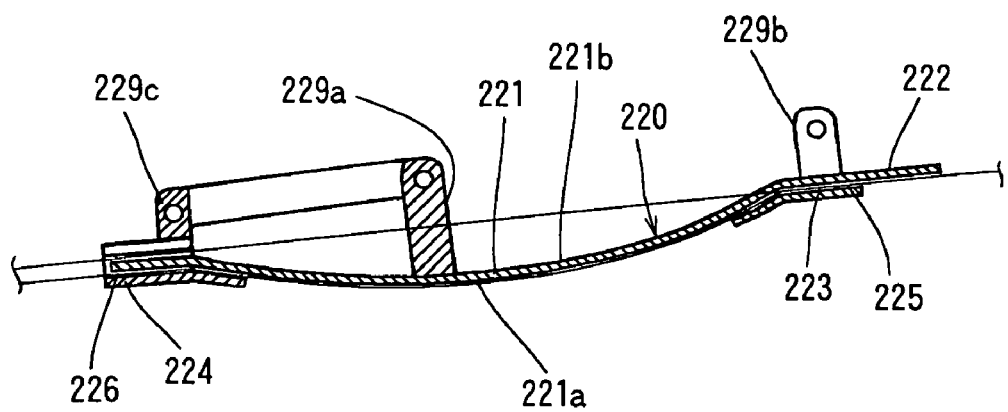

Fig. 24
(A)
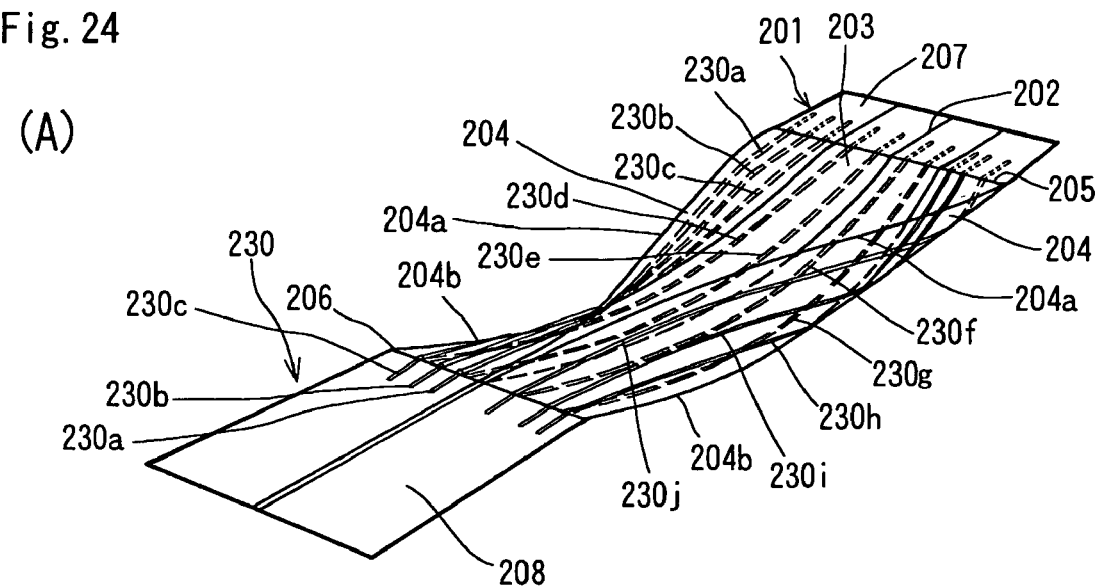
(B)
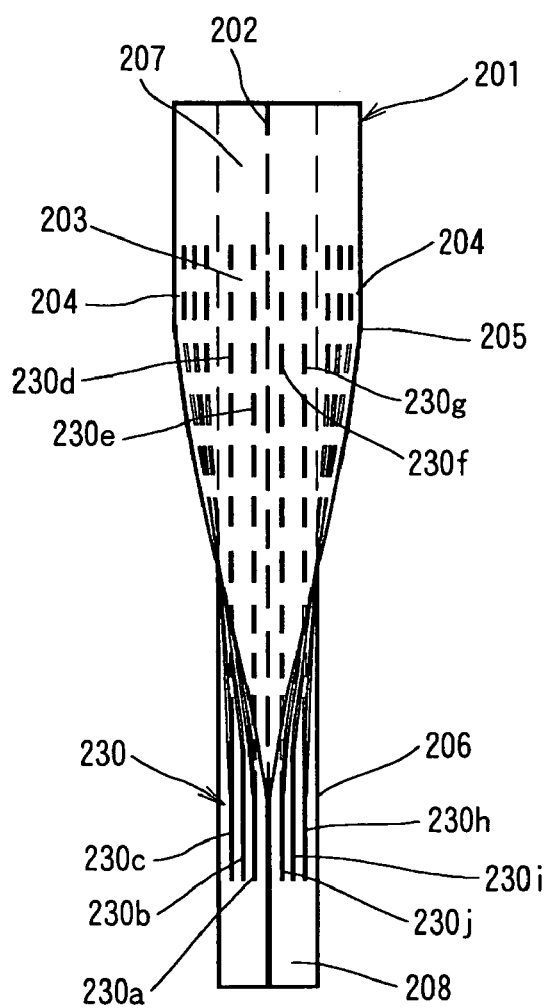

Fig. 25
(A)
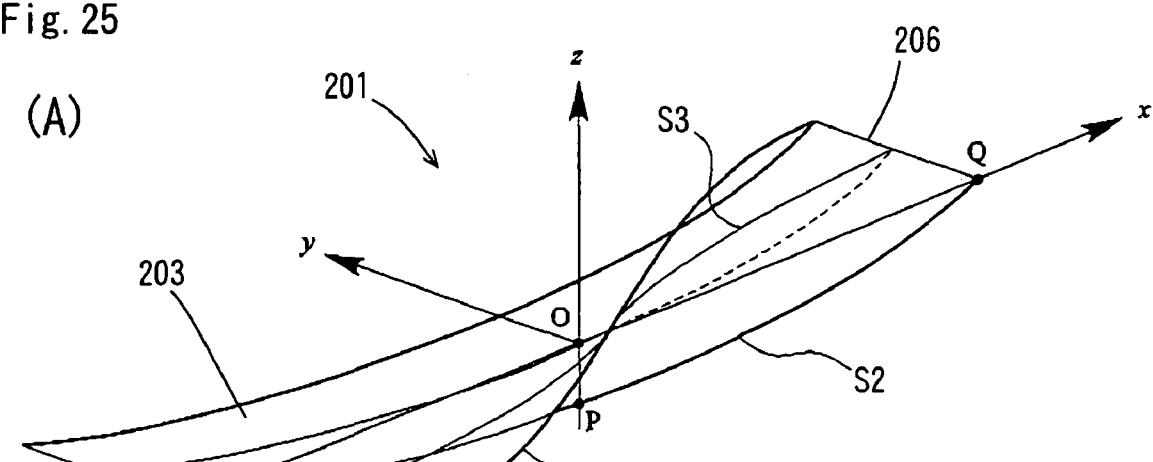
(B)
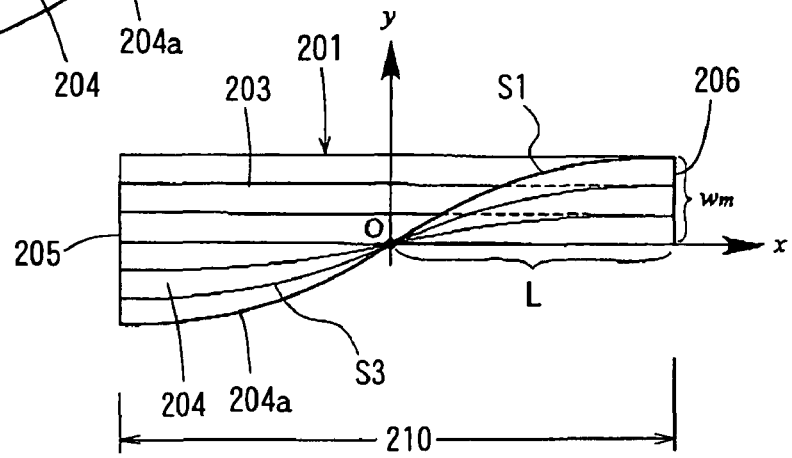
(C)
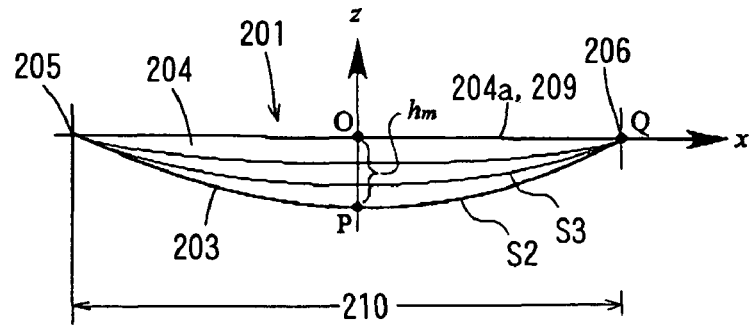

PRIOR ART
Fig. 28
(A)
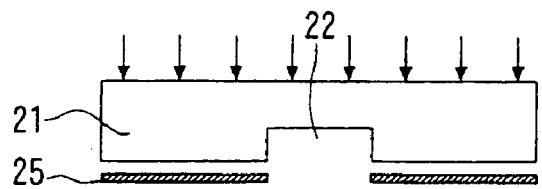
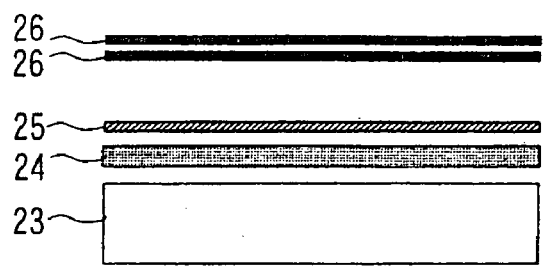
(B)
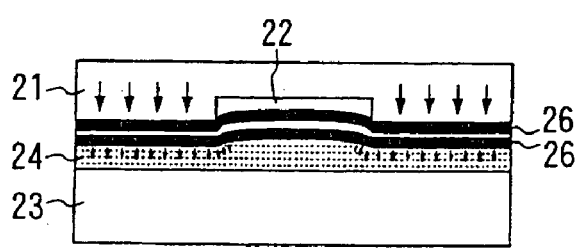
(C)
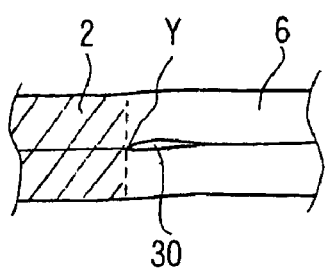
(D)
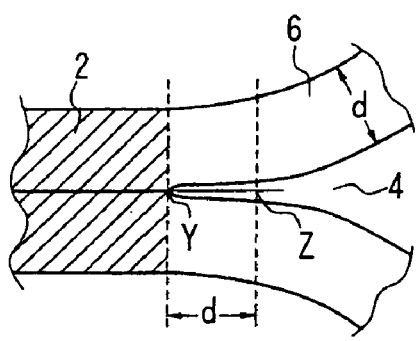
(E)
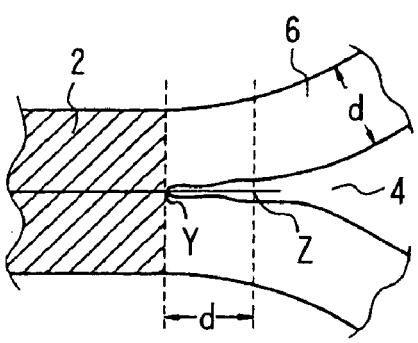

PACKAGING BAG WITH SELF-CLOSEABLE OUTFLOW PORT, AND METHOD OF MANUFACTURING THE PACKAGING BAG

TECHNICAL FIELD

The present invention relates to a pouch having a self-closable pouring spout which accommodates contents such as liquids or the like, and which prevents said contents from leaking out following sealing, and a method for manufacturing a pouch which has a self-closable pouring spout, a valve which partitions the interior or the pouch, or a branched part.

BACKGROUND ART

Liquid packaging pouches having a self-closable pouring spout formed by means of a flexible material such as a plastic film or the like, from which the liquid accommodated inside the pouch will not flow out once the spout has been closed, even if the pouch is suspended with the spout down, have been known in the past (for example, see Japanese Utility Model Application Laid-Open No. 62-93040 and the like). Furthermore, the self-closable spouts of these liquid packaging pouches are ordinarily formed by heat sealing plastic films, and the liquid accommodated inside the pouch is prevented from flowing out by forming the spout part into a V shape following closing.

FIG. 28 shows an outline of a conventional pouch having a self-closable spout and a manufacturing apparatus for the same. FIG. 28 (A) is a model diagram showing the essential parts of the pouch manufacturing apparatus, FIG. 28 (B) is a diagram illustrating the conditions of heat sealing of the pouch using the apparatus shown in FIG. 28 (A), FIG. 28 (C) is a model diagram showing the cross-sectional shape of a conventional pouch in a state in which the spout is closed, and FIG. 28 (D) is a model diagram showing the cross-sectional shape of a conventional pouch in a state in which the spout is open. In pouches that have a self-closable spout, the spout is conventionally formed as follows by heat sealing a plastic film: namely, as is seen in FIG. 28 (A), a non-pressing part 22 is disposed as a recessed hollow area that does not press against the plastic film in the heating part 21 of the heat sealing head that forms the spout, and an elastic pressing member 24 consisting of silicon rubber or the like, a glass cloth substrate 25 which is impregnated with Teflon, fired and coated on one side with a silicon type bonding agent, plastic films 26, 26 which constitute the pouch, and a glass cloth substrate 25 which is impregnated with Teflon, fired and coated on one side with a silicon type bonding agent, are successively placed on a pressing part 23 that faces the heating part 21 of the heat sealing head, the heat sealing head is closed, and the plastic films 26, 26 are heated and pressed by the heating part 21 and pressing part 23 so that these films are heat sealed, thus forming the spout.

In a conventional pouch manufacturing technique, as is seen in FIG. 28 (B), the elastic pressing member 24 is not pressed in the non-pressing part 22 of the heating part 21 of the heat sealing head during heat sealing; as a result, a heat sealing force is not uniformly applied in the boundary area between the heat-sealed part and the non-heat-sealed part. In the case of a conventional pouch with a self-closable spout that is manufactured in this way, as is shown in FIG. 28 (C), a very small gap 30 is formed in the unsealed state between the inside surfaces of the films 6 constituting the non-heat-sealed part 6 in the boundary area Y between the heat-sealed part 2 and non-heat-sealed part 6 forming the spout passage. In cases where a liquid with good wetting characteristics such that the wetting angle with the material forming the inside surfaces of the films is 90 degrees or less is accommodated inside the pouch, the following problem is encountered: namely if the pouch is suspended with the spout down after the spout 3 has been opened, contents such as the abovementioned liquid or the like leak out from the very small gap 30 as a result of the capillary phenomenon.

To describe this in greater detail, in the segment 5 (see FIG. 1) cut out from the spout 3 of the pouch perpendicular to the spout passage 4, as is shown FIGS. 28 (D) and 28 (E), the cross-sectional shape formed by the film inside surfaces is a curved shape that protrudes toward the outer surfaces (FIG. 28 (D)) or an irregular curved shape (FIG. 28 (E)) in the vicinity of the boundary area Y between the heat-sealed part 2 and the non-heat-sealed part 6. In the vicinity of the boundary area between the heat-sealed part and non-heat-sealed part of the spout passage, leakage of the liquid or the like occurs as a result of the presence of extremely small gaps as seen in FIG. 28 (c). Accordingly, in a conventional pouch, the occurrence of leakage of the contents such as a liquid or the like from the vicinity of the boundary area Y between the heat-sealed part 2 and non-heat-sealed part 6 of the spout passage 4 cannot be avoided.

Conventionally, meanwhile, a branched type pouch manufacturing method and apparatus have been proposed which allow the efficient continuous manufacture of various types of pouches such as branched self-standing pouches, pouches that have branched small compartments and the like, and that allow the continuous individual covering of the branched compartments with a packaging material that has barrier properties (Japanese Patent Application Laid-Open No. 11-70599). In this branched type pouch manufacturing method and apparatus, the pouches are continuously and automatically manufactured from a long body wall material in a state in which the body wall material feeding direction and the vertical direction of the pouch are perpendicular. A portion of the body wall material on at least one side is subjected to a first bend and a second bend along the feeding direction so that a pouch main body compartment, a first branched compartment and a second branched compartment are formed. The first branched compartment is used as a filling opening part, and the second branched compartment is used as a discharge opening part.

Furthermore, a packaging pouch which has a dispensing function is disclosed in Japanese Patent Application Laid-Open No. 11-193039. This packaging pouch is a pouch in which a conventionally used pouch container is provided with a constituent member consisting of a plastic film that has the function of a valve.

In the abovementioned Japanese Patent Application Laid-Open No. 11-70599, there is a disclosure regarding a manufacturing method for a branched type pouch; however, there is no disclosure regarding the continuous manufacture of a dispenser pouch with a dispensing function such as the abovementioned flat pouch, self-standing pouch or branched self-standing pouch, from a web-form packaging material. Furthermore, using conventionally known pouch manufacturing methods and apparatuses "as is", it is not possible to manufacture, in a continuous process, pouches with a partitioning function that allows the contents accommodated inside the pouch to pass through, such as a dispensing function or the like.

Furthermore, in the manufacture of standing pouches, gazette pouches and the like, as shown in Japanese Patent Application Laid-Open No. 9-188311, for example, a technique is used in which a relatively broad web used as a bottom member that is bonded to the body member is symmetrically folded back on both sides and taken up in two rows on both sides of the center line of the web by using a forming plate so that both side edges abut against each other on the center line in the longitudinal direction. By thus folding back the bottom member as a single web, it is possible to simplify the pouch making machine; furthermore, the problem caused by the difference in tension of the respective bottom members in a two-row pouch making machine manufacturing pouches using two bottom members, i.e., the difficulty of accurate feeding of the two bottom members with respect to the body member, can be solved.

In this method in which the web is folded back, the forming plate is respectively constructed from a triangular part formed by a plane, and a rectangular part that is connected at an angle to the rear part with respect to the direction of flow of the triangular part. Accordingly, in the portion of the web that is folded back while the web travels from the triangular part to the rectangular part, a difference is generated in the length of the pass line in accordance with the position that is occupied in the lateral direction. As a result, if no countermeasures are taken, the generation of slack in the web cannot be avoided in the folding-back process. In order to eliminate this slack, a fixed tension that is determined by the amount of elongation is caused to act on the web passing over the forming plate. Accordingly, the folding back of the web must be performed while causing the tension to act on the web.

However, tension control that performs a fine tension adjustment that is used to load various portions of the web with a fixed tension is required during this web folding-back process, so that the folding back itself is difficult in the case of materials with a small elongation. Furthermore, a technique has also been proposed in which folding back is accomplished by lining up numerous rolls instead of using a forming plate; however, in this method as well, the slack that is generated in the web is handled by stretching the web by means of tension, so that similar problems arise. If the tension acting on the web is not uniform, then slack and wrinkles arising from this slack occur in the web, and if the pouch is manufactured by performing sealing with such wrinkles left "as is", the manufactured pouch may have a distorted shape, and sealing may be incomplete so that the appearance and commercial value of the pouch deteriorate; in the worst case, the resulting product may be unacceptable as a pouch. Thus, the reason that slack is generated in the web in the folding-back process is as follows: namely, since differences that tend to be generated in the pass line passing through in the folding-back process in accordance with the position that is occupied in the lateral direction of the web are absorbed, the tension that acts on the web is non-uniform in the lateral direction of the web.

DISCLOSURE OF THE INVENTION

The present invention solves the abovementioned problems encountered in the prior art; it is an object of the present invention to provide a pouch having a pouring spout which can prevent the leakage in small amounts at a time of the contents such as a liquid or the like accommodated inside the pouch, even in cases where the pouch is suspended with the pouring spout down following the opening of the pouring spout, especially a pouch which has a self-closable pouring spout, and a method for manufacturing a pouch which has a self-closable pouring spout.

The cause of leakage of the liquid or the like accommodated inside the pouch is that there are very small gaps in the boundary area between the heat-sealed part and non-heat-sealed part of the pouring spout passage as seen in FIG. 28 (C). Accordingly, the present inventors discovered that the leakage of liquids and the like can be prevented even in cases where liquids and the like with good wetting characteristics are accommodated inside the pouch by using a construction which is devised so that the inside surfaces of the films constituting the non-heat-sealed part in the boundary area contact each other. This discovery led to the present invention.

In the present invention, the leakage in small amounts at a time of the contents such as a liquid or the like accommodated inside the pouch can be prevented, even in cases where the pouch is suspended with the pouring spout down following the opening of the pouring spout, by setting the cross-sectional shape of the self-closable pouring spout and the cross-sectional shape of the segment cut out from the pouring spout as the abovementioned specified shapes.

The pouch of the present invention is a pouch which is formed by heat sealing plastic films, this pouch being characterized in that the pouch comprises a self-closable pouring spout in which the inside surfaces of the films on the side of the non-heat-sealed part of the boundary area between the heat-sealed part and the non-heat-sealed part contact each other without any gaps in a closed state, and a metering chamber that communicates with the abovementioned self-closable pouring spout.

In this pouch, in the segment that is cut out from the abovementioned self-closable pouring spout perpendicular to the abovementioned pouring spout passage, the cross-sectional shape of the inside surfaces of the films that constitute the abovementioned non-heat-sealed part extending from the abovementioned boundary area between the abovementioned heat-sealed part and the abovementioned non-heat-sealed part of the abovementioned pouring spout passage toward the side of the abovementioned non-heat-sealed part as far as a point that is separated from the abovementioned boundary area by a distance that is equivalent to the thickness of the abovementioned films can be set as a shape ranging from a rectilinear shape to a shape that protrudes on the side of the inside surface. By setting the cross-sectional shape of the inside surfaces of the films in the non-heat-sealed part of the pouring spout passage as such a rectilinear shape or shape that protrudes on the side of the inside surface, it is possible to ensure that the inside surfaces of the films contact each other without any gap when the pouring spout is closed, thus ensuring that the leakage of the contents is prevented much more securely.

Furthermore, in this pouch, in the segment that is cut out from the abovementioned self-closable pouring spout perpendicular to the abovementioned pouring spout passage, the boundary area between the abovementioned heat-sealed part and the abovementioned non-heat-sealed part of the abovementioned pouring spout passage is used as a base point, and in regard to the cross-sectional shape of the inside surfaces of the abovementioned films extending facing each other from the base point toward the abovementioned non-heat-sealed part, the angle formed by tangents of the inside surfaces of both of the abovementioned films passing through the abovementioned base point can be set at 20 degrees or less. By setting the cross-sectional shape of the inside surfaces of the films in the non-heat-sealed part of the pouring spout passage at a tangent angle of 20 degrees or less, it is possible to ensure that the inside surfaces of the films contact each other without any gap when the pouring spout is closed, thus ensuring that the leakage of the contents is prevented much more securely.

Furthermore, in this pouch, the abovementioned metering chamber can be demarcated so that communication with the accommodating compartment of the abovementioned pouch is possible by means of a film valve. In this case, the abovementioned film valve can also be disposed in a branched part formed by folding back a portion of the abovementioned pouch.

The method of the present invention for manufacturing a pouch which comprises a self-closable pouring spout is characterized in that when a pouch is manufactured in which plastic films are heat sealed, and a self-closable pouring spout is formed by the heat-sealed part and non-heat-sealed part, heat sealing is performed with a uniform pressure applied to the abovementioned heat-sealed part and the abovementioned non-heat-sealed part in the boundary area between these parts.

By applying a uniform pressure to the heat-sealed part and non-heat-sealed part of the self-closable pouring spout in the boundary area between these parts, it is possible to obtain more reliably a closed state in which the inside surfaces of the films forming the portion on the side of the non-heat-sealed part of the boundary area between the heat-sealed part and non-heat-sealed part of the pouring spout passage contact each other with no any gap.

In the abovementioned pouch manufacturing method, the abovementioned non-heat-sealed part of the abovementioned pouring spout passage can be formed by using a heat sealing head which has a non-heating pressing member in the position corresponding to the abovementioned non-heat-sealed part, and leaving this non-heat-sealed part without heat sealing by means of this non-heating pressing member when the abovementioned plastic films are heat sealed by pressing and heating. The plastic films are not heat sealed when these films are pressed by the non-heating pressing member, and thus form a non-heat-sealed part; however, as a result of this pressing, a contact state without gaps can be securely obtained in the non-heat-sealed part when the pouring spout is closed.

Furthermore, in a method for manufacturing a pouch such as a dispenser pouch, there are problems that need to be solved from the standpoint of establishing a method in which a body member and a partitioning member that partitions the interior of the pouch so that the contents can pass through are continuously fed as web-form packaging materials, and a pouch that has a partitioning function that partitions the pouch so that the contents accommodated inside the pouch can pass through, such as a dispensing function or the like, is automatically and continuously manufactured from these web-form packaging materials.

It is an object of the present invention to make it possible, in a pouch manufacturing method which continuously manufactures a pouch from a web-form body member in a state in which the vertical direction crosses the conveying direction of the body member, to manufacture a pouch with a content movement restriction function inexpensively and in large quantities, without any need for human intervention, by automatically and continuously manufacturing a pouch that has a movement restricting function with respect to the contents accommodated inside the pouch, such as a dispensing function or the like, from web-form packaging materials.

In order to achieve the abovementioned object, the present invention is a pouch manufacturing method in which a pouch is continuously manufactured from a web-form body member, this method being characterized in that a web-form valve member in which both surfaces can be joined by welding, and at least one surface can be tightly sealed, is conveyed in accordance with the conveying of the abovementioned body member in order to partition the interior of the abovementioned pouch, and, in order to allow the passage of the contents accommodated in the abovementioned pouch in the lateral direction along the abovementioned valve member, the abovementioned valve member is joined by welding in a state in which this valve member is caused to contact a sealing-preventing member on the other surface of the valve member, and this valve member is sandwiched between the abovementioned body members, so that this valve member is joined by being tightly welded to the abovementioned body member on the side of the abovementioned one surface.

In this pouch manufacturing method, pouches are continuously formed in accordance with the conveying of the web-form body member, and in this case, the valve member that is conveyed in accordance with the conveying of the body member is attached by being welded to the body member. Since both surfaces of the valve member are weldable, if no countermeasures are taken, the valve member will be welded to the partner members on both sides of the valve member (i.e., the body member or the valve member itself) when the valve member is welded to the body member, so that passage of the contents becomes difficult, and so that double sealing is performed in a direction that blocks the passage contents accommodated in the pouch. In this pouch manufacturing method, the valve member is tightly welded to the body member on one side of the valve member, and at the time of this welding, the valve member is placed in a state of contact with a sealing-preventing member on the other side of the valve member; accordingly, the valve member is tightly welded to the body member on one side so that there is no peeling of the valve member from the body member, and the area in which the sealing-preventing member is interposed between the valve member and partner member (body member or valve member itself) is prevented from being welded on the other side of the valve member, so that a passage is ensured, or so that flow in such a passage is ensured by preventing constriction on the back surface side of the passage; as a result, passage of the contents is permitted on either side of the valve member. Accordingly, a valve member which allows passage of the contents can be mounted in the pouches while these pouches are continuously manufactured.

Furthermore, in a continuous pouch manufacturing method for manufacturing pouches such as pouches in which a branched part is formed by folding back the web-form body member, it is extremely difficult to achieve precise control of the tension that is applied to the portion of the running web that is in the process of being folded back, and thus to eliminate the non-uniformity in the lateral direction the causes the generation of slack in the web. Furthermore, a precise tension application mechanism is large in size and also leads to an increase in the cost of the apparatus. Accordingly, noting the causes of this generation of slack, it is desirable to make it possible to fold back the web without applying any tension other than the minimum tension required in order to feed the web, in order to eliminate in advance the action of such non-uniform tension in the lateral direction of the web.

Accordingly, it is an object of the present invention to provide a method for continuously manufacturing pouches in which branched parts are formed by folding back a web-form body member, this method being a method for manufacturing pouches with a good appearance and commercial value which is devised so that in cases where the web is folded back toward the center line in the web feeding direction from at least one side of the web, favorable feeding back of the web without the application of any tension other than the minimum tension required for the feeding of the web is made possible, so that the generation of slack in the web and wrinkles based on such slack can be prevented, and so that the manufacture of pouches with a distorted shape and the occurrence of incomplete sealing can be prevented.

The pouch manufacturing method of the present invention is a method for manufacturing pouches in which a branched part is formed in the pouch by folding back at least one side part of the web-form body member on a fold-back line that runs along the feeding direction of this body member, wherein the abovementioned body member is guided by a guide so that the pass line length of the portion of the abovementioned body member that occupies an arbitrary position in the lateral direction of said body member passing through is substantially fixed from the initiation of fold-back to the completion of fold-back in the fold-back process of the abovementioned body member.

In this pouch manufacturing method, at least one side of the web-form body member is guides by a guide so that the pass line length of the portion of the abovementioned body member that occupies an arbitrary position in the lateral direction of the web passing through is substantially fixed from the initiation of fold-back to the completion of fold-back in the fold-back process of the abovementioned body member. Accordingly, when the web is folded back from at least one side of the web at the fold-back line extending in the feeding direction of the web, the pass line length of the portion occupying an arbitrary position in the lateral direction of the web is substantially fixed in the fold-back process, so that slack caused by differences in the pass line length is not generated in the web, and the web can be naturally folded back without applying any special tension for the purpose of removing slack in addition to the tension that is used for feeding [of the web]. Pouches with branched parts manufactured from such a web can be cleanly manufactured without producing any defective products caused by slack or wrinkles.

BRIEF DESCRIPTION OF THE DRAWINGS

FIGS. 1(A)-(E) show diagrams which illustrate the pouring spout of the pouch of the present invention;

FIGS. 3(A) and (B) show model diagrams illustrating other examples of the pouch manufacturing method of the present invention;

FIGS. 4(A) and (B) show model diagrams illustrating another example of the pouch manufacturing method of the present invention;

FIGS. 6(A) and (B) show model diagrams which illustrate still other examples of the pouch manufacturing method of the present invention;

FIGS. 15(A) and (B) are diagrams showing one example of a flat type pouch constituting a concrete example of the pouch of the present invention;

FIGS. 20(A) and (B) are diagrams showing one example in which the pouch of the present invention is applied to a branched/stand-up type dispenser pouch that has suspending means;

FIGS. 21(A)-(C) are diagrams showing a configuration of web fold-back according to the web fold-back method and apparatus of the present invention;

FIGS. 22(A)-(E) are diagrams showing one embodiment of the web fold-back apparatus of the present invention;

FIGS. 23(A) and (B) are diagrams showing another embodiment of the web fold-back apparatus of the present invention;

FIGS. 24(A) and (B) are diagrams showing still another embodiment of the web fold-back apparatus of the present invention;

FIGS. 25(A)-(C) are diagrams illustrating the pass line shape calculation method in the web fold-back apparatus of the present invention;

FIGS. 28(A)-(E) are model diagrams showing a conventional apparatus for manufacturing pouches that have a self-closable pouring spout.

BEST MODE FOR CARRYING OUT THE INVENTION

Figure 2:
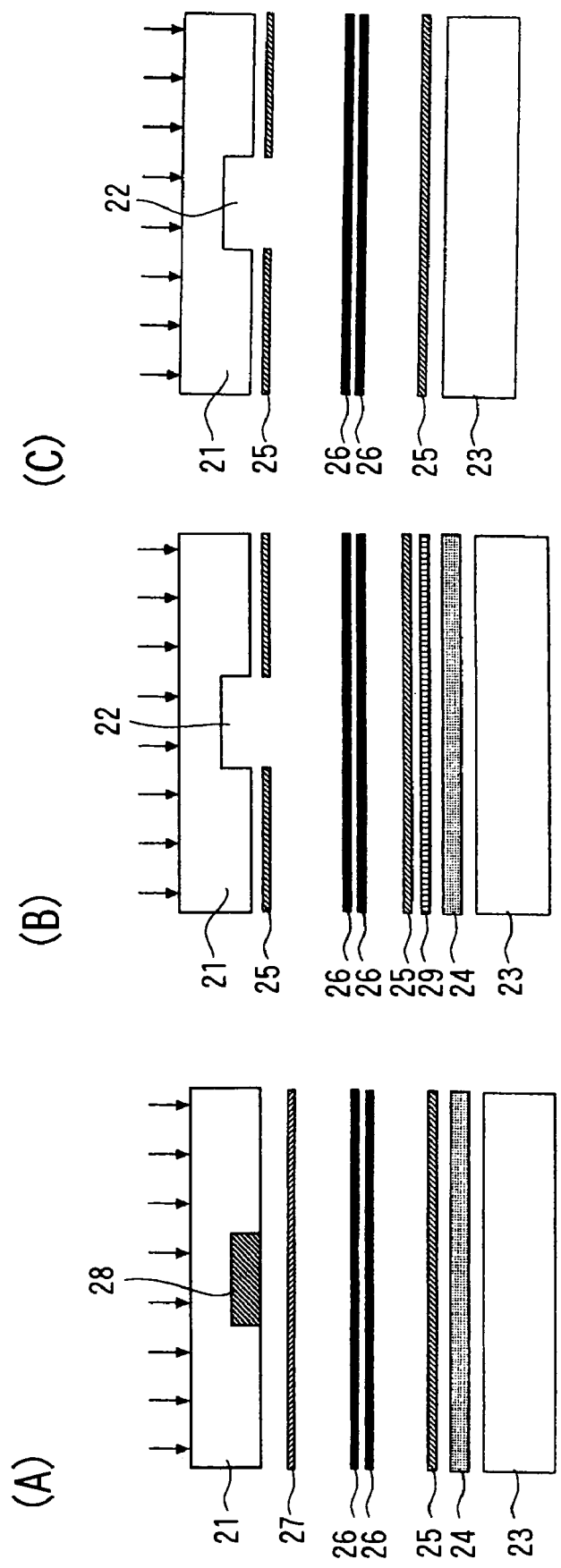
FIGS. 2(A)-(C) are model diagrams which show one example of the pouch manufacturing method of the present invention.

Embodiments of the present invention will be described below with reference to the attached figures. FIG. 1 shows diagrams illustrating a pouring spout having the self-closing function of the pouch of the present invention. FIG. 1 (A) is a plan view of the vicinity of the pouring spout, FIG. 1 (B) is a sectional view showing the cross-sectional shape of the passage in a state in which the pouring spout shown in FIG. 1 (A) is closed, FIG. 1 (C) is an enlarged sectional view showing an enlargement of the portion X of the pouring spout passage shown in FIG. 1 (B), and FIGS. 1 (D) and 1 (E) are model type sectional views showing the cross-sectional shape of the segment that is cut out from the pouring spout perpendicular to the pouring spout passage when the pouch shown in FIG. 1 (A) is in an open state.

In the pouch 1 of the present invention, as is shown in FIG. 1 (A), a self-closable pouring spout (hereafter referred to simply as a "pouring spout") 3 is formed by means of a heat-sealed part 2 and a non-heat-sealed part 6 which are formed by partially heat sealing plastic films. As is shown in FIG. 1 (B), and in FIG. 1 (C) which is an enlargement of FIG. 1 (B), one of the characterizing features of the present invention is that the inside surfaces of the films constituting the portion of the boundary region Y between the heat-sealed part 2 and non-heat-sealed part 6 of the pouring spout passage 4 that is located on the side of the non-heat-sealed part 6 contact each other so that there are no gaps in a state in which heat sealing has not yet been performed.

Another characterizing feature of the pouch 1 is that in the segment 5 that is cut out from the pouring spout 3 of the bag 1 perpendicular to the pouring spout passage 4, the cross-sectional shape formed by the facing inside surfaces of the films in the range extending on the side of the non-heat-sealed part 6 from the boundary area Y between the heat-sealed part 2 and non-heat-sealed part 6 of the pouring spout passage 4 to a point Z separated from the boundary area Y by a distance equivalent to the thickness d of the films forming the non-heat-sealed part 6 is formed as a rectilinear shape (FIG. 1 (D)) or a curved shape that protrudes on the side of the inside surface (FIG. 1 (E)). As is seen from FIGS. 1 (D) and 1 (E), in addition to cases where the inside surfaces of the films forming the front surface and back surface of the pouch both have a rectilinear shape or both have a curved shape that protrudes on the side of the inside surface, one film may have a rectilinear shape while the other film has a curved shape that protrudes on the side of the inside surface.

In the pouch 1, as is seen from FIG. 1 (A), the cross-sectional shape of the segment 5 that is cut out from the pouring spout 3 is defined as the shape formed by the inside surfaces of the films that is seen when the cross section of a segment 5 with a width of 5 to 50 μm acquired by slicing the passage 4 of the pouring spout 3 of the pouch 1 in a direction perpendicular to this passage is observed in a non-pressed state under an optical microscope.

The cross-sectional shape of the boundary area Y of the pouring spout 3 of the pouch 1 is in a state in which the inside surfaces of the films constituting the portion of the boundary area Y between the heat-sealed part 2 and non-heat-sealed part 6 of the pouring spout passage 4 located on the side of the non-heat-sealed part 6 adhere tightly [to each other] as shown in FIG. 1 (C) when the pouch 1 is manufactured by heat sealing in an unclosed state. However, when the segment 5 cut out from the pouring spout 3 is observed in a non-pressed state using an optical microscope, the cross-sectional shape of the boundary area Y of the pouring spout 3 is open on the side of the non-heat-sealed part 6 of the boundary area Y as shown in FIGS. 1 (D) and 1 (E).

FIG. 2 is a model diagram showing one example of a method for manufacturing pouches that have a self-closable pouring spout according to the present invention.

In the embodiment shown in FIG. 2 (A), a detachable non-heating pressing member 28 is disposed in a region corresponding to the non-heat-sealed part 6 of the pouring spout passage 4 in the heating part 21 of the part of the heat sealing head that forms the pouring spout 3 of the pouch 1. The non-heating pressing member 28 is constructed from a resin such as a polyacetal, polyamide, polyimide, polyamidoimide, polyether imide, polyether ether ketone (PEEK), phenol resin, melamine resin, polyphenylene sulfide (PPS), polybutylene terephthalate (PBT), polyethylene terephthalte (PET), epoxy resin, brominated epoxy resin, tetrafluoroethylene polymer (PTFE), trifluorochloroethylene polymer, tetrafluoroethylene-hexafluoropropylene copolymer (FEP), tetrafluoroethylene-perfluoroalkoxyethylene copolymer (PFA), tetrafluoroethylene-ethylene copolymer (ETFE) or the like, a liquid crystal polymer, a reinforced resin obtained by filling the respective resins mentioned above with glass fibers, carbon fibers, or an inorganic powder such as alumina, silica or the like, or a ceramic. Since the temperature is elevated by the heat sealing of the plastic films, the non-heating pressing member 28 is removed from the heating part 21 following heat sealing, and a portion of the non-heating pressing member 28 in which the temperature is not elevated is mounted on the heating part 21 and used, or else the pressing member 28 is again mounted on the heating part 21 and used after being cooled. An elastic pressing member 24 consisting of silicone rubber or the like, a glass cloth substrate 25 impregnated with Teflon, fired and coated on one side with a silicone rubber bonding agent, plastic films 26, 26 that form the pouch 1, and a glass cloth substrate 27 with a Teflon sheet layer disposed on the surface are successively placed on the surface of the pressing part 23 facing the heating part 21 of the heat sealing head. The plastic films 26, 26 are clamped by the heating part 21 and pressing part 23, the heat sealing head is closed, and the plastic films 26, 26 are heat sealed by being heated and pressed, thus forming the pouring spout 3.

In this example, since a freely detachable non-heating pressing member 28 is disposed on the heating part 21 of the heat sealing head, the portions of the plastic films 26, 26 corresponding to the non-heating pressing member 28 are not elevated to the temperature required for heat sealing; accordingly, these portions are not heat sealed, and therefore form the non-heat-sealed part 6 of the pouring spout passage 4. As a result of the provision of this non-heating pressing member 28, a uniform pressure is applied to the heat-sealed part 2 and non-heat-sealed part 6 of the pouring spout 3 in the boundary area between these parts; accordingly, as is seen from FIG. 1 (B), the inside surfaces of the films that constitute the portion of the boundary area between the heat-sealed part 2 and non-heat-sealed part 6 of the pouring spout passage 4 that is located on the side of the non-heat-sealed part 6 contact each other with no gap in an unclosed state.

Furthermore, as is seen from FIG. 1 (D) or 1 (E), the cross-sectional shape of the segment that is cut out from the pouring spout 3 constitutes a rectilinear shape or smooth curved shape that protrudes on the side of the inside surface, and the angle α at which tangents taking the boundary area Y between the heat-sealed part 2 and non-heat-sealed part 6 as a base point intersect is also 20 degrees or less. Accordingly, in the pouch 1, there is no leakage of the contents such as a liquid or the like from the boundary area Y, as there is in a pouch manufactured by the prior art.

FIG. 2 (B) is a model diagram showing another example of the method of the present invention for manufacturing a pouch that has a self-closable pouring spout. This example differs from the pouch manufacturing method shown in FIG. 2 (A) as follows: namely, in the heating part 21 of the portion of the heat sealing head that forms the pouring spout 3 of the pouch 1, a non-pressing part 22 is disposed as a hollow part in the position corresponding to the non-heat-sealed part 6 of the pouring spout passage 4, and a thin metal plate 29 consisting of aluminum or the like is interposed between the elastic pressing member 24 and the glass cloth substrate 25; furthermore, this glass cloth substrate 25 which is impregnated with Teflon, fired and coated on one side with a silicon rubber bonding agent is interposed between the plastic film 26 and heating part 21 instead of the glass cloth substrate 27 which has a Teflon sheet layer disposed on the surface. The other structures are the same. The pouring spout 3 is formed by clamping the plastic films 26, 26 by means of the heating part 21 and pressing part 23, closing the heat sealing head, and heat sealing the plastic films 26, 26 by heating and pressing. In this case, for example, the thin metal plate 29 can be formed from an aluminum plate with a thickness of approximately 0.1 ㎜ to approximately 0.3 ㎜; however, a plate of the optimal material and thickness is selected and used in accordance with conditions such as the pressure during heat sealing and the like.

In this example, a thin metal plate 29 consisting of aluminum or the like is placed on top of an elastic pressing member 24 consisting of silicone rubber or the like; consequently, when heat sealing is performed by closing the heat sealing head and heating and pressing the plastic films 26, 26 by means of the heating part 21 and pressing part 23, the same pressure as in the other parts (heat-sealed part 2) is applied to the elastic pressing member 24 in the non-pressing part 22 of the heating part 21 as well. Accordingly, the heat-sealed part 2 and non-heat-sealed part 6 of the pouring spout 3 of the pouch 1 are subjected to a substantially uniform pressure in the boundary area between these parts as well, so that the inside surfaces of the films constituting the portion of the boundary area Y between the heat-sealed part 2 and non-heat-sealed part 6 of the pouring spout passage 4 that is located on the side of the non-heat-sealed part 6 contact each other with no gap in an unclosed state, as is shown in FIG. 1 (B). Furthermore, the cross-sectional shape of the segment that is cut out from the pouring spout 3 is similar to that in the case of the example shown in FIG. 2 (A), so that the leakage of the contents such as a liquid or the like from the boundary area Y is similarly prevented.

In the pouch manufacturing method shown in FIG. 2 (B), the elastic pressing member 24 and thin metal plate 29 can be omitted. An example of this is shown in FIG. 2 (C). Since the elastic pressing member 24 used in the prior art shown in FIGS. 28 (A) and 28 (B) is not used in this example, it is necessary to improve the planar precision of the heating part 21 and pressing part 23 of the heat sealing head, and to employ a method that uniformly presses the plastic films 26, 26, in order to form the cross-sectional shape of the pouring spout 3 and the cross-sectional shape of the segment 5 that is cut out from the pouring spout 3 as the desired shapes.

Furthermore, in these examples, the number and material of the glass cloth substrates 25 and 27 that are interposed between the plastic films 26, 26 that form the pouch 1 and the heating part 21 or pressing part 23 of the heat sealing head can be appropriately selected, or these parts can be omitted, in accordance with the material, thickness and the like of the plastic films 26, 26 that form the pouch 1.

FIG. 3 shows model diagrams that illustrate other examples of the method of the present invention for manufacturing a pouch that has a self-closable pouring spout; FIG. 3 (A) is a model diagram which shows an example in which a cooler is disposed in the heat sealing head, and FIG. 3 (B) is a model diagram which shows an example in which a heat exchanger is further disposed in the heat sealing head.

In the example shown in FIG. 3 (A), in the heat sealing head that is used to form the pouring spout 3 of the pouch 1, a cooling part 43 is disposed between the heating parts 21, 21 in a state which is such that there is no step in the heat sealing surface; this is done in order to form the non-heat-sealed part 6 of the pouring spout passage 4. A flow passage 42 that is used to allow the passage of a coolant is formed inside the cooling part 43, and the respective side surfaces of the cooling part 43 make contact at the respective lower ends of the heating parts 21 of the heat sealing head. This cooling part 43 is constructed from a plastic or ceramic that is superior in terms of heat insulating properties and heat resistance. Examples of materials that are suitable for use in the construction of the cooling part 43 include resins such as polyacetals (POM), polyamides (PA), polybutylene terephthalates (PBT), polyethylene terephthalates (PET), polyphenylene sulfides (PPS), polyether ether ketones (PEEK), polyether nitriles (PEN), polysulfones (PSF), polyether sulfones (PES), polyarylates (PAR), polyimides (PI), polyamidoimides (PAI), polyether imides (PEI), phenol resins, melamine resins, epoxy resins, brominated epoxy resins, tetrafluoroethylene polymers (PTFE), tetrafluoroethylene-hexafluoropropylene copolymers (FEP), tetrafluoroethylene-perfluoroalkoxyethylene copolymers (PFA), tetrafluoroethylene-ethylene copolymers (ETFE) and the like, liquid crystal polymers, resins obtained by foaming the respective resins described above, or resins reinforced by filling the respective resins described above with glass fibers, carbon fibers or an inorganic powder such as alumina, silica or the like.

In order to obtain a balance of heat insulating properties, heat resistance and strength, the cooling part 43 may also be constructed from a plurality of resins. Such a plurality of resins can be formed in multiple layers parallel to the flow passage 42, or can be formed into a construction in which different resins are partially co-present. An elastic pressing member 24 consisting of silicone rubber or the like, a glass cloth substrate 25 impregnated with Teflon, fired and coated on one side with a silicone type bonding agent, and a glass cloth substrate 27 which has a Teflon sheet layer 27 disposed on the surface are successively places on the pressing part 23 facing the heating part 21 and cooling part 43 of the heat sealing head in the same configuration as in the example shown in FIG. 2 (A) with respect to the plastic films 26, 26. With the plastic films 26, 26 clamped by the heating part 21 and pressing part 23, the heat sealing head is closed, and the plastic films 26, 26 are heat sealed by being heated and pressed, thus forming a pouring spout 3.

In this case, the cross-sectional shape of the flow passage 42 is designed so that an appropriate cooling state suited to the desired shape of the pouring spout is obtained. Furthermore, for example, water or ammonia can be used as the coolant that passes through the flow passage 42; however, an optimal coolant can be selected and used in accordance with conditions such as the temperature during heat sealing and the like.

In this example, since a cooling part 43 is disposed between the heating parts 21, 21 of the heat sealing head, the portions of the plastic films 26, 26 that are pressed by the cooling part 43 do not reach the temperature required for heat sealing; accordingly, these portions form the non-heat-sealed part 6 of the pouring spout passage 4 in the pouch 1. Since there is no step in the heat sealing surface between the heating parts 21, 21 and cooling part 43 of the heat sealing head, the heat-sealed part 2 and non-heat-sealed part 6 of the pouring spout 3 are uniformly pressed in the boundary area between these parts as well, so that the inside surfaces of the films that form the portion of the boundary area Y between the heat-sealed part 2 and non-heat-sealed part 6 of the pouring spout passage 4 that is located on the side of the non-heat-sealed part 6 contact each other with no gap in an unclosed state as shown in FIG. 1 (B). Furthermore, the cross-sectional shape of the segment that is cut out from the pouring spout 3 is similar to that seen in the case of the respective examples shown in FIG.

2, so that the leakage of the contents such as a liquid or the like from the boundary area Y is similarly prevented.

As is shown in FIG. 3 (B), a heat exchanger such as a heating pipe 44 or the like can be used in the cooling part 43. The heating pipe 44 is embedded in the cooling part 43, and the upper side of the heating pipe 44 is cooled in the flow passage 42 through which the coolant passes. In this case, heat exchange is performed between the top and bottom of the heating pipe 44, so that the cooling part 43 can be efficiently cooled. The portions of the plastic films 26, 26 that are pressed by the cooling part 43 do not reach the temperature required for heat sealing, and therefore form the non-heat-sealed part 6 of the pouring spout passage 4 in the pouch 1.

FIG. 4 shows model diagrams illustrating another example of the method of the present invention for manufacturing a pouch that has a self-closable pouring spout. FIG. 4 (A) is a diagram showing the state prior to the closing of the heat sealing head, and FIG. 4 (B) is a diagram showing a state in which the heat sealing head is closed.

In this example, in the heat sealing head that is used to form the pouring spout 3 of the pouch 1, a cooling part 43 is disposed in a position between the heating parts 21, 21 in a state in which this cooling part 43 is driven toward the pressing part 23 by a spring 48 in order to form the non-heat-sealed part 6 of the pouring spout passage 4 (in the unloaded state, as is shown in FIG. 4 (A), a portion of the cooling part 43 protrudes from the pressing surface). A flow passage 42 that is used to allow a coolant to pass through is formed inside the cooling part 43, and the cooling part 43 is disposed in a state in which the respective side surfaces [of the cooling part 43] contact the respective heating parts 21. As is shown in FIG. 4 (B), it is possible to apply a uniform pressure to the heat-sealed part 2 and non-heat-sealed part 6 of the pouring spout 3 by adjusting the force of the spring 48 disposed in the cooling part 43. The respective members 24, 25 and 27 are successively placed in the same configuration as in the example shown in FIG. 3 (A) with respect to the plastic films 26, 26 on the pressing part 23 that is disposed facing the heating parts 21 and cooling part 43 of the heat sealing head so that a pouring spout 3 is formed by the closing of the heat sealing head.

For example, water or ammonia can be used as the coolant that passes through the flow passage 42; however, an appropriate coolant can be selected and used in accordance with conditions such as the temperature at the time of heat sealing and the like.

Furthermore, various types of springs such as coil springs, plate springs or the like can be used as the spring 48; however, it would also be possible to use an elastic member (e.g., various types of rubber, elastic plastics, foamed plastics or the like) instead of such springs.

In this example, as in the example shown in FIG. 3 (A), a cooling part 43 is disposed between the heating parts 21, 21 of the heat sealing head; accordingly, the portions of the plastic films 26, 26 that are pressed by the cooling part 43 do not reach the temperature required for heat sealing, so that the non-heat-sealed part 6 of the pouring spout passage 4 is formed. If the pouring spout 3 is formed by such a method, the inside surfaces of the films that form the portion of the boundary area Y between the heat-sealed part 2 and non-heat-sealed part 6 of the pouring spout passage 4 that is located on the side of the non-heat-sealed part 6 contact each other with no gap in an unclosed state (as shown in FIG. 1 (B)). Furthermore, the cross-sectional shape of the segment that is cut out from the pouring spout 3 is similar to that seen in the case of the respective examples shown in FIG. 2, so that the leakage of the contents such as a liquid or the like from the boundary area Y can be similarly prevented.

Moreover, in regard to the construction of the cooling part 43, it would also be possible to use a heat exchanger such as a heating pipe 44 or the like in addition to installing a flow passage 42 through which a coolant flows, in the same manner as in the example shown in FIG. 3 (B).

Figure 5:
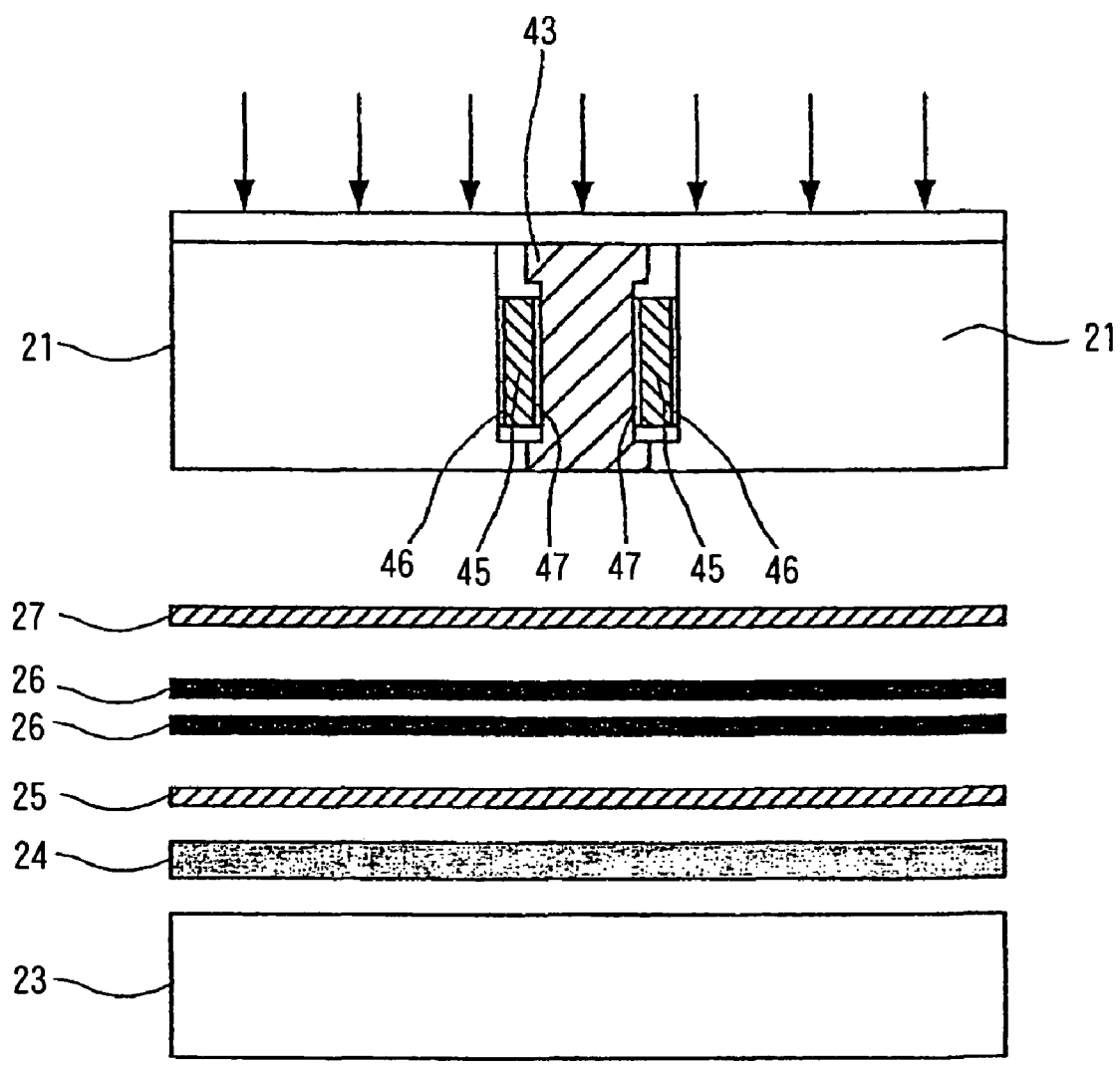
FIG. 5 is a model diagram which shows another example of the pouch manufacturing method of the present invention.

FIG. 5 is a model diagram showing another example of the method of the present invention for manufacturing a pouch that has a self-closable pouring spout.

In this example, in the heat sealing head that is used to form the pouring spout 3 of the pouch 1, a cooling part 43 is disposed between the heating parts 21, 21, and a Peltier element 45 is disposed between the heating part 21 and the cooling part 43, in order to form the non-heat-sealed part 6 of the pouring spout passage 4. These parts are disposed so that the surface of the heating part 21 that faces the cooling part 43 and the heat-generating surface 46 of the Peltier element 45 are in contact, and so that the surface of the cooling part 43 that faces the heating part 21 and the heat-absorbing surface 47 of the Peltier element 45. At the heat sealing surface, the mutual side surfaces of the cooling part 43 and heating part 21 are in contact, and a state is produced in which there is no step part. As in the respective examples shown in FIG. 2, the cooling part 43 is constructed from a plastic or ceramic that is superior in terms of adiabatic properties and heat resistance.

The cooling part 43 may also be constructed from a plurality of resins in order to obtain a balance of adiabatic properties, heat resistance and strength. This plurality of resins can be formed in multiple layers parallel to the flow passage 42, or can be formed into a construction in which different resins are partially co-present. Respective members 24, 25 and 27 are placed (in the same configuration as in the respective examples shown in FIG. 2 with respect to the plastic films 26, 26) on the pressing part 23 that is disposed facing the heating parts 21 and cooling part 43 of the heat sealing head, and the pouring spout 3 is formed by closing the heat sealing head.

In this example, when current flows through the Peltier element 45, the temperature of the heat-generating surface 46 is elevated so that the heating parts 21 are heated. In cases where the temperature of the heating parts 21 does not reach the temperature that is required in order to heat seal the plastic films that constitute the pouch 1, the temperature that is required in order to form the heat-sealed part 2 can be obtained by using an appropriate heater in combination. Meanwhile, the temperature of the cooling part 43 that contacts the heat-absorbing surface 47 is lowered, so that the temperature that is required for heat sealing is not reached; accordingly, the non-heat-sealed part 6 of the pouring spout passage 4 is formed. At this heat sealing surface, a state is produced in which there are no steps between the heating parts 21, 21 and the cooling part 43; consequently, the heat-sealed part 2 and non-heat-sealed part 6 of the pouring spout 3 are also uniformly pressed in the boundary area between these parts. As a result, the inside surfaces of the films that form the portion of the boundary area Y between the heat-sealed part 2 and non-heat-sealed part 6 of the pouring spout passage 4 that is located on the side of the non-heat-sealed part 6 contact each other with no gap in an unclosed state (as shown in FIG. 1 (B)). Furthermore, the cross-sectional shape of the segment that is cut out from the pouring spout 3 is similar to that seen in the case of the respective examples shown in FIG. 2, so that the leakage of the contents such as a liquid or the like from the boundary area Y can be similarly prevented.

FIG. 6 shows model diagrams illustrating other examples of the method of the present invention for manufacturing a pouch which has a self-closable pouring spout. FIG. 6 (A) shows an example in which gaps 49 are formed between the heating parts 21 and the cooling part 43 of the heat sealing head, and FIG. 6 (B) shows still another example that differs from the example shown in FIG. 6 (A).

The example of the manufacturing method shown in FIG. 6 (A) is a manufacturing method in which gaps 49 are formed between the heating parts 21 of the heat sealing head and the cooling part 43 in which a flow passage 42 that is used to allow the passage of a coolant is formed in the example shown in FIG. 3 (A). On the side of the surface parts that contact the plastic film 26, it is desirable that the gaps 49 be formed with a dimension that is sufficiently small so that the heat-sealed plastic film 26 does not bite in and undergo deformation (ordinarily approximately 0.01 to 1 mm); furthermore, on the interior side, it is desirable that the gaps be formed with a large dimension in order to prevent the movement of heat from the heating parts 21 to the cooling part 43.

In the example shown in FIG. 3 (A), since the heating parts 21 and cooling part 43 are in contact, so that the amount of heat that moves from the heating parts 21 to the cooling part 43 is large, sufficient heat sealing is performed in the heating parts 21. In order to avoid heat sealing of the plastic films 26, 26 by the cooling part 43, it is necessary to use a material with a small thermal conductivity, such as a plastic or ceramic that is superior in terms of adiabatic properties, as the material that constitutes the cooling part 43. On the other hand, in the example shown in FIG. 6 (A), since gaps 49 are formed between the heating parts 21 and cooling part 43, the movement of heat from the heating parts 21 to the cooling part 43 can be suppressed, so that the cooling part 43 can be constructed from a metal such as an aluminum alloy or the like in the same manner as the heating parts 21. In cases where the cooling part 43 is constructed from a metal, working is easier than in the case of a plastic or ceramic; furthermore, the durability is also improved. Accordingly, costs can be lowered, and the productivity can be improved.

A heat insulating member 50 is disposed on the upper parts of the heating parts 21 and cooling part 43 of the heat sealing head. Respective members 24, 25 and 27 are placed for the plastic films 26, 26 on the pressing part 23 which is disposed facing the heating parts 21 and cooling part 43 of the heat sealing head, and the pouring spout 3 is formed by closing the heat sealing head.

In the example shown in FIG. 6 (A), the portions of the plastic films 26, 26 that are pressed by the cooling part 43 do not reach the temperature that is required for heat sealing; accordingly, the non-heat-sealed part 6 of the pouring spout passage 4 is formed by these portions of the plastic films 26, 26. If the pouring spout 3 is formed using such a method, the inside surfaces of the films that form the portion of the boundary area Y between the heat-sealed part 2 and non-heat-sealed part 6 of the pouring spout passage 4 that is located on the side of the non-heat-sealed part 6 contact each other with no gap in an unclosed state (as shown in FIG. 1 (B)). Furthermore, as a result of the cross-sectional shape of the segment that is cut out from the pouring spout 3, the leakage of the contents such as a liquid or the like from the boundary area Y is also prevented, as in the other examples.

Furthermore, in the example shown in FIG. 6 (A) as well, it would also be possible to use a heat exchanger such as a heating pipe 44 or the like in addition to forming a flow passage 42 that allows the coolant to flow through as the construction of the cooling part 43 in the same manner as in the example shown in FIG. 3 (B). Furthermore, the cooling part 43 shown in FIG. 4 may also be devised so that gaps 49 are formed between the heating parts 21 and cooling part 43 of the heat sealing head in an apparatus installed via an elastic material 48.

In the example shown in FIG. 6 (A), it would also be possible to allow the heating parts 21 and cooling part 43 to contact each other directly without forming gaps 49. In this case, since the amount of heat that moves from the heating parts 21 to the cooling part 43 is large, sufficient heat sealing is performed in the heating parts 21. Furthermore, in a case where no heat exchanger is installed, it is desirable to install the flow passage 42 closer to the pressing surfaces than in the case shown in FIG. 3 (B), in order to prevent elevation of the temperature of the surfaces that press the plastic film 26.

FIG. 6 (B) is a model diagram showing another example of the method of the present invention for manufacturing a pouch which has a self-closable pouring spout.

This example is an example in which the heating parts 21 and cooling part 43 of the heat sealing head in the example shown in FIG. 6 (A) are integrally constructed from a single member made of (for example) a metal. As a result of the heating parts 21 and cooling part 43 being integrally constructed, the following merits are obtained: namely, the assembly of the heat sealing head is facilitated, and control of the head height can be simplified.

In cases where the heating parts 21 and cooling part 23 are integrally constructed from a metal material, the amount of heat that moves from the heating parts 21 to the cooling part 43 is large; accordingly, a larger heater must be use in order to maintain the surfaces of the heating parts 21 at the temperature that is required for heat sealing. In this case, in order to suppress the movement of heat from the heating parts 21 to the cooling part 43, it is desirable to reduce the cross-sectional area of the heat transmission path from the heating parts 21 to the cooling part 43 by forming grooves 51, and to lengthen this path, so that the heating/cooling efficiency is improved. The dimensions, shape and number of the grooves 51 may be appropriately set.

The pouch manufacturing methods described in the respective examples above may be appropriately used to manufacture pouches that have a self-closable pouring spout 3 following sealing.

Furthermore, these manufacturing methods can also be used to manufacture pouches that have a pouring spout used to extract the contents of the pouch such as refill pouches. In this case, it is possible to reduce the distortion, irregularities and the like that are generated in the boundary area between the heat-sealed part and non-heat-sealed part in the case of conventional methods of the type shown for example in FIGS. 28 (D) and 28 (E), so that pouches with a superior external appearance and high commercial value can be manufactured.

A single-layer film consisting of a thermoplastic resin which has heat sealing properties, or a laminated film which has a layer construction of two or more layers in which a thermoplastic resin film which has such heat sealing properties is used as the inside layer of the pouch, and other films are laminated on this film, can be used as the plastic film 26 that forms the pouch 1 with a pouring spout 3.

For instance, examples of thermoplastic resin films that have heat sealing properties include thermoplastic resins, e.g., polyolefins such as polypropylenes, propylene-ethylene copolymers, crystalline polybutenes-1, crystalline 4-methylpentyne-1, low-, medium- or high-density polyethylenes, linear low-density polyethylenes, ethylene-vinyl acetate copolymers (EVA), ethylene-acrylic acid copolymers (EAA), ethylene-ethyl acrylate copolymers (EEA), ionic-crosslinked olefin copolymers (ionomers) and the like; aromatic vinyl copolymers such as polystyrenes, styrene-butadiene copolymers and the like; halogenated vinyl polymers such as polyvinyl chlorides, vinylidene chloride resins and the like; nitrile polymers such as acrylonitrile-styrene copolymers, acrylonitrile-styrene-butadiene copolymers and the like; polyamides such as nylone 6, nylon 66, para- or meta-xylylene adipamide and the like; polyesters such as polyethylene terephthalates, polybutylene terephthalates, polytetramethylene terephthalates, polytetramethylene terephthalates, poly-1,4-cyclohexanedimethylene terephthalates, polyethylene naphthalates and the like; various types of polycarbonates; and polyacetals such as polyoxymethylenes and the like.

Especially desirable materials include olefin type resins such as low-density polyethylenes, linear low-density polyethylenes, medium-density polyethylenes, high-density polyethylenes, polypropylenes, propylene-ethylene copolymers, ethylene-vinyl acetate copolymers, olefin resins graft-modified with ethylene type unsaturated carboxylic acids or anhydrides and the like, ionomer resins, polyamide and co-polyamide resins with a relatively low melting point or softening point, polyester and co-polyester resins and the like.

In cases where a laminated film is used as the plastic film 26 that constitutes the pouch, a laminated film is used in which the abovementioned thermoplastic resin film with heat sealing properties is used as the inside layer of the pouch, and other films are laminated with this film, with bonding agent layers interposed if necessary.

An adhesive resin selected from a set consisting of polyethyleneimine resins, alkyl titanate resins, polyester-isocyanate type resins, urethane resins, epoxy resins, polyether type resins, olefin type resins onto which polar groups have been introduced and the like is used as the material that forms the bonding agent layers.

There are no particular restrictions on films that are laminated with the heat sealing resin; any film ordinarily used in packaging pouches may be used. In regard to materials that are suitable for use in such films, any of the materials used as the abovementioned heat sealing resins may be used; however, it is desirable to select resins that have a higher melting point than the resin used in the inside layer.

Furthermore, films in which one or more of the abovementioned plastic films are pasted to a metal foil such as aluminum or the like, paper, cellophane or the like may also be used as the abovementioned other films. Especially in the case of contents requiring barrier properties, it is desirable to use laminated films that contain resin layers consisting of a polyvinylidene chloride resin, EVA saponification product, nylon, ring-form olefin copolymer or the like, resin layers that have a metal oxide vacuum evaporated film such as aluminum, silicon oxide or the like, resin layers that contain clay minerals, or metal foils such as aluminum or the like.

In order to endow the film that forms the pouch with adiabatic properties, rigidity and the like, films consisting of various types of foamed synthetic resins may also be used; furthermore, films consisting of various types of synthetic resins with which glass fibers or inorganic substances such as alumina, silica, titanium oxide, calcium oxide, carbon, talc or the like are mixed may also be used.

Examples of laminated film layer constructions that are suitable for forming the pouch of the present invention include biaxially drawn polyethylene terephthalate (PET: outer layer)/undrawn linear low-density polyethylene (LLDPE: inner layer), biaxially drawn nylon (outer layer)/LLDPE (inner layer), biaxially drawn PET (outer layer)/aluminum foil (intermediate layer)/LLDPE (inner layer), biaxially drawn nylon (outer layer)/aluminum foil (intermediate layer)/LLDPE (inner layer), biaxially drawn PET (outer layer)/biaxially drawn nylon (intermediate layer)/LLDPE (inner layer), biaxially drawn PET (outer layer)/aluminum foil (intermediate layer)/biaxially drawn nylon (intermediate layer)/LLDPE (inner layer) and the like.

Furthermore, in applications requiring high temperature treatments such as heating and pressing treatments or the like, laminated films using undrawn polypropylene (PP) as the inner layer, such as biaxially drawn PET (outer layer)/aluminum foil (intermediate layer)/undrawn PP (inner layer), biaxially drawn PET (outer layer)/biaxially drawn nylon (intermediate layer)/aluminum foil (intermediate layer)/undrawn PP (inner layer), biaxially drawn PET (outer layer)/undrawn PP (inner layer), biaxially drawn nylon (outer layer)/undrawn PP (inner layer), biaxially drawn nylon (outer layer)/aluminum foil (intermediate layer)/undrawn PP (inner layer), inorganic oxide vacuum evaporated biaxially drawn PET (outer layer)/undrawn PP (inner layer), inorganic oxide vacuum evaporated biaxially drawn nylon (outer layer)/undrawn PP (inner layer) and the like, can be used. Bonding agent layers selected from the abovementioned adhesive resins are disposed between the respective layers of these laminated films.

The layer construction of the plastic film can be selected in accordance with the properties of the contents filling the pouch. Manufacture of the plastic film can be accomplished by an ordinary method such as the casting method, T die method, calender method, inflation method or the like. Furthermore, the manufacture of a laminated film can be accomplished by ordinary methods such as the dry lamination of films molded beforehand, coating on a substrate film, molten co-extrusion or the like.

Figure 7:
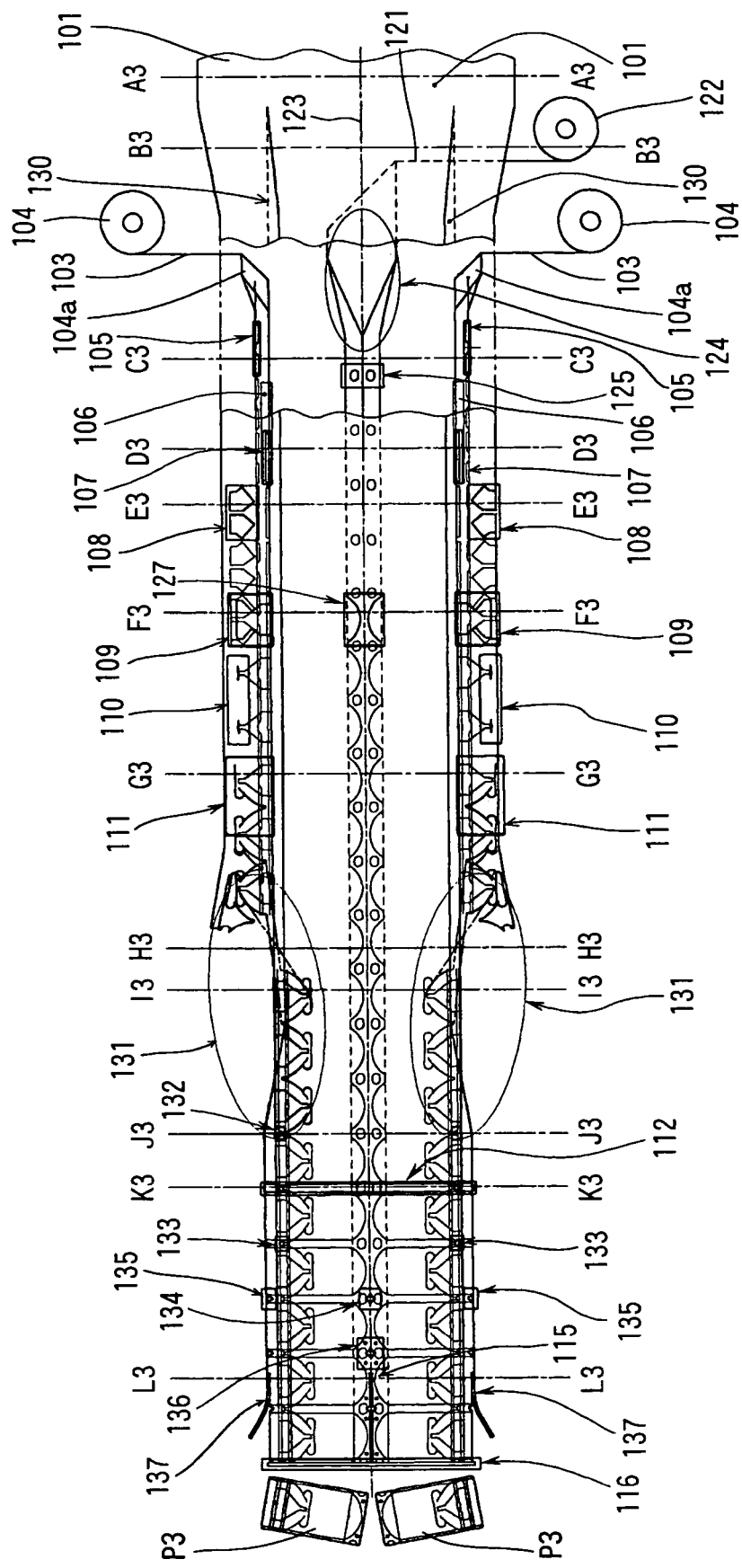
FIG. 7 is a plan view which shows a schematic representation of one example of a manufacturing process for a branched/self-standing pouch as the pouch of the present invention.
Figure 8:
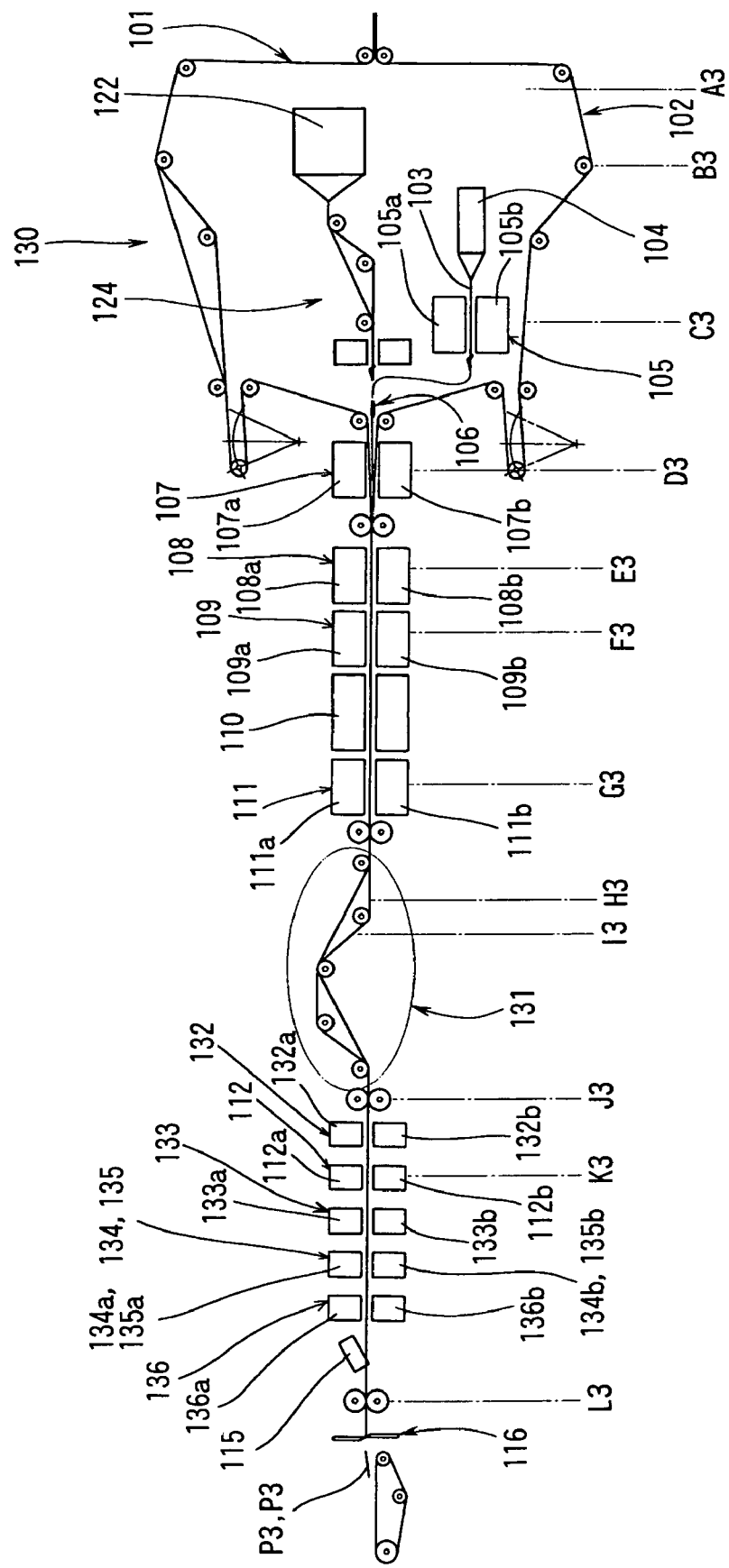
FIG. 8 is a side view of the pouch manufacturing process shown in FIG. 7.
Figure 9:
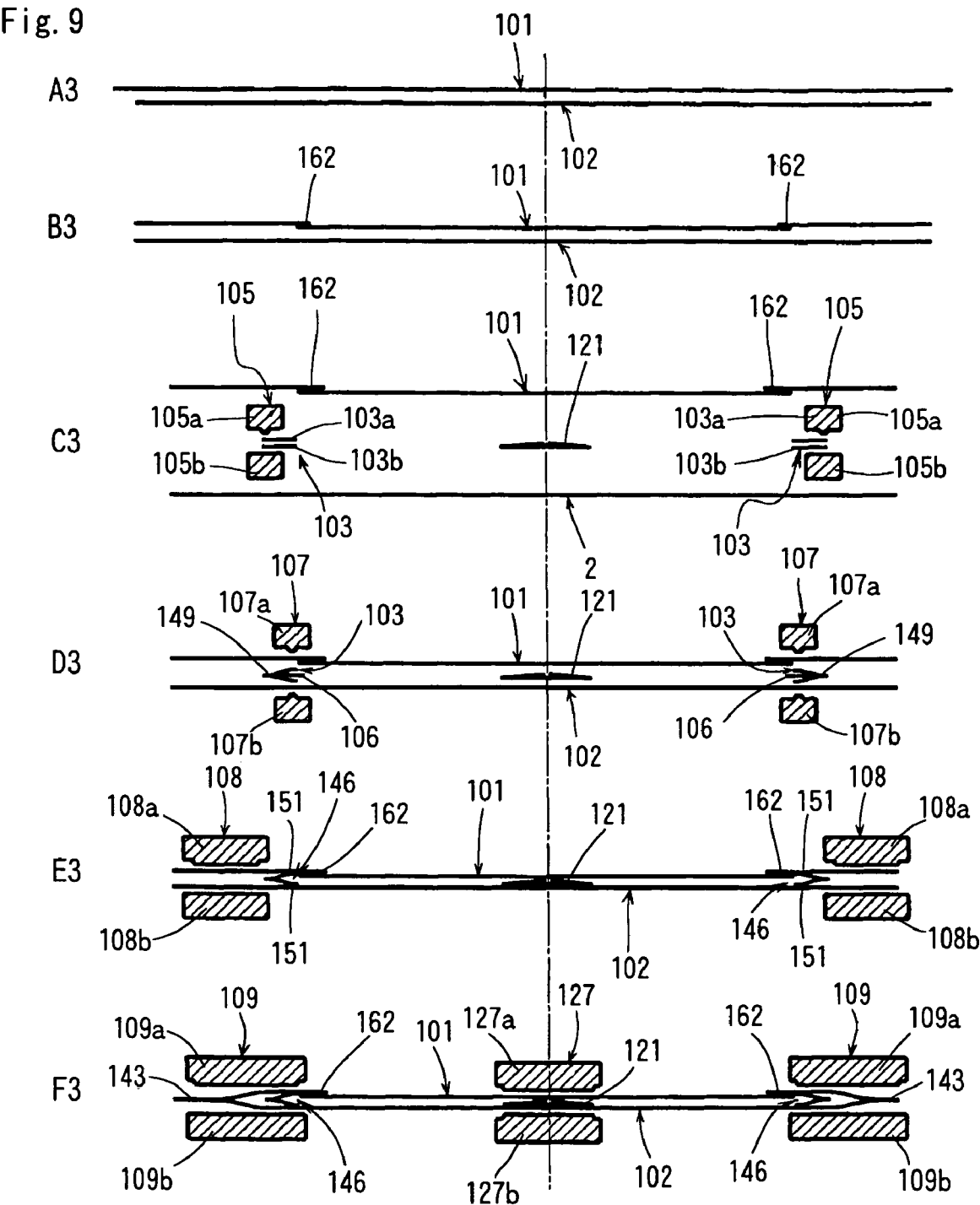
FIG. 9 shows cross-sectional views respectively cut along a plurality of positions (positions A3 through F3) as the pouch manufacturing process shown in FIG. 7 progresses.
Figure 10:
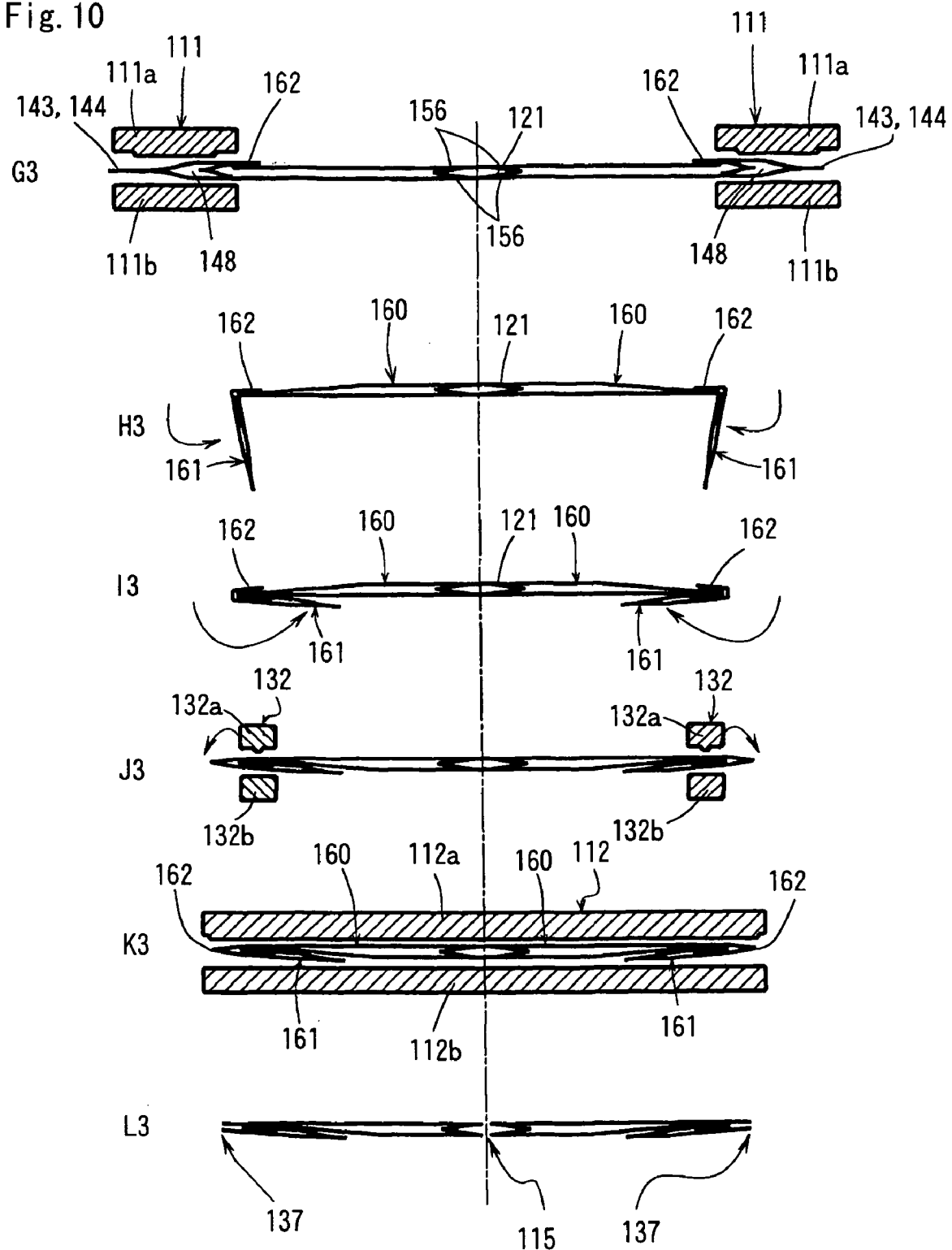
FIG. 10 shows cross-sectional views respectively cut along a plurality of positions (positions G3 through L3) as the pouch manufacturing process shown in FIG. 7 progresses.

The method used to manufacture a pouch, especially a dispenser pouch equipped with a dispensing function, will be described below. The manufacturing process shown in FIGS. 7 through 10 is a manufacturing process for manufacturing a pouch, especially a self-standing pouch with a branched chamber, as a packaging bag. FIG. 7 is a plan view showing a schematic representation of one example of the pouch manufacturing process that is used in cases where the pouch is formed as a self-standing pouch with a branched chamber. FIG. 8 is a side view of the pouch manufacturing process shown in FIG. 7. FIGS. 9 and 10 are cross-sectional views respectively cut at a plurality of positions (positions A3 through F3, and positions G3 through L3) along the progression of the pouch manufacturing process shown in FIG. 7. Branched self-standing pouches (hereafter referred to simply as "pouches" except in specified cases) P3 can be continuously manufactured by mutually sealing a pair of web-form body members 101, 102 that are supplied side by side above and below, and a pair of valve member films (hereafter referred to simply as "valve members") 103, 103 that are supplied in a configuration in which these valve members are clamped between the pouch body members 101 and 102. In this manufacturing process, pouches P3, P3 that have the same structure are manufactured on the left and right in the direction of progression of the process in two rows positioned side by side with the top-bottom direction reversed. In the state in which pouch manufacture is completed, the body members 101 and 102 are packaging members that form the body part of each pouch P3, and the valve members 103 are partitioning members that partition the interior of the pouch P3 in the state in which pouch manufacture is completed so that a valve passage that allows the passage of the contents through the interior of the pouch P3 can be formed. Furthermore, the respective tools that are formed during the manufacturing process are shown n FIG. 18; these respective tools will be described later with reference to FIG. 18.

The upper and lower body members 101 and 102 are paid out parallel to each other in the position A3; in the position B3, as a process that is peculiar to the pouch P3, the formation of a folded-back part 162 used for the branched part 161 is initiated by a branch forming part 130 in a position near the end portion of the upper body member 101.

The valve members 103 which are fed out from a partitioning member supply mechanism that includes valve member rolls 104 disposed to the side and corresponding pay-out means are web-form members that are thermally weldable on both sides, and the running upper-side body member 101 and lower-side body member 102 are temporarily mounted inside spaces that are greatly separated from each other. After the valve members 103 are symmetrically folded back and superimposed with the center lines in the longitudinal direction as the fold-back lines, these valve members 103 are cut in two along the fold-back lines, and are thus formed into a pair of narrow web-form valve members 103*a* and 103*b*. In the position C3, the pair of valve members 103*a* and 103*b* are sealed to each other by a valve member sealer 105 consisting of a pair of sealing heads 105*a* and 105*b*, so that a valve seal 149 is formed in the region on the outside in the lateral direction of the web; here, a portion is left unsealed so that a valve passage 150 is formed between the pair of valve members 103*a* and 103*b*.

Next, the valve members 103*a* and 103*b* are clamped and superimposed between the facing body members 101 and 102; simultaneously, a sealing preventing member 106 is inserted between the valve members 103*a* and 103*b*. In the position D3, the superimposed body members 101 and 102 and pair of valve members 103*a* and 103*b* are pressed and heated by a valve-body sealer 107 used as a body-partitioning sealer consisting of a pair of sealing heads 107*a* and 107*b*. In this case, the respective valve members 103*a* and 103*b* are both welded to the respectively corresponding body members 101 or 102 on the inside in the lateral direction of the web, so that a valve-body seal 151 is formed. Both of the valve members 103*a* and 103*b* are heated and pressed by the valve-body sealer 107; in this case, however, since the sealing preventing member 106 is interposed, the facing surfaces of the valve members 103*a* and 103*b* are not thermally welded to each other. The top-bottom direction of the manufactured pouches P3 is oriented perpendicular to the conveying direction of the body members 101 and 102 and valve members 103, and the region in which the valve seal 149 is formed is disposed along this conveying direction, so that the sealing preventing member 106 can be disposed along the conveying direction without interfering with the vale seal 149 that constitutes the already-sealed portion of the valve members 103, thus making it possible to perform valve-body sealing 151 during continuous pouch manufacture.

In the position D3, the pair of valve members 103*a* and 103*b* between which the sealing preventing member 106 has been inserted are thermally welded to the body members 101 and 102 by the valve-body sealer 107; here, the valve-body seal 151 between the valve member 103*a* and the upper-side body member 101 is formed further to the outside than the folded part 162, so that a valve 146 is formed.

The web-form bottom member 121 is paid out from a bottom member roll 122 in synchronization with the pay-out of the body members 101 and 102, and is fed into the space between the upper and lower pair of opened body members 101 and 102; this bottom member 121 is supplied in the same direction as the feeding direction of the body members 101 and 102 in a state in which the center line 123 of the bottom member 121 is caused to coincide with the lateral-direction center lines of the body members 101 and 102. In parallel with the folding back, division and valve member sealing treatment of the valve members 103, the bottom member 121 is folded back to a state in which both end parts in the lateral direction are caused to abut against the center line 123, and is folded back upward by a fold-back forming part 124; this folding back is substantially completed in the position C3 where the sealing of the valve members 103*a* and 103*b* to each other is performed. Immediately after the position C3, punch holes 157 are formed by a bottom member punch 125 in the folded-back bottom member 121 in a state straddling the bottom part corners of two pouches that are adjacent in the direction of progression of the process, and adjacent to the bottom part corners of two pouches that are adjacent to each other on the left and right.

A blocking plate 126 that prevents thermal welding between the folded-back bottom member 121 and lower-side body member 102 begins to be inserted between the folded-back bottom member 121 and lower-side body member from the position D3 where the valve-body seal 151 is formed. The blocking plate 126 is cantilever-supported on the frame (not shown in the figures) of the apparatus on the upstream side of the position B2, and is wider than the folded-back bottom member 121; this is constructed as a long plate that extends downstream in the feeding direction of the bottom member 121 and body member 102 as far as the position F3 where the pouring spout periphery sealers 109, 109 are disposed. The blocking plate 126 is formed with a thickness of 5 mm or less so that the bottom member 121 is allowed to run smoothly. A bottom sealer 127 which thermally welds the bottom member 121 to the upper-side body member 101 is disposed in the position F3. The bottom sealer 127 consists of heat sealing heads 127*a* and 127*b* that perform pressing and heating in a configuration in which the bottom member 121 is clamped from the outside by the pair of body members 101 and 102. A bottom seal 153 that has a curved seal outline is formed between the bottom member 121 and the upper-side body member 101; between the bottom member 121 and the lower-side body member 102, on the other hand, no bottom seal is formed, since the blocking plate 126 is inserted. Accordingly, a filling opening 140 is left for filling with the contents in an after-stage filling process.

In the position E3 downstream from the position D3, a pouring spout sealer 108 consisting of a pair of sealing heads 108*a* and 108*b* is disposed above and below both end parts of the body members 101 and 102 so that this sealer can be raised and lowered; this pouring spout sealer 108 seals the body members 101 and 102 so that a pouring spout 141 is left. The pouring spout sealer 108 forms a pouring spout seal 143 in which the body members 101 and 102 are welded to each other with an outline that leaves a non-heat-sealed part that forms the pouring spout 141 communicating between the inside and outside in the body members 101 and 102 in regions located further to the outside in the lateral direction than the position of the heat sealing of the body members 101 and 102 and valve member 103. In the position F3 which is downstream from the position E3, a pouring spout periphery sealer 109 is disposed above and below both end parts of the body members 101 and 102 so that this sealer can move upward and downward. The pouring spout periphery sealer 109 also consists of a pair of sealing heads 109*a* and 109*b*, and welds the body members 101 and 102 to each other so that there is a partial overlap and connection with the valve-body seal 151 and pouring spout seal 143, thus forming a pouring spout periphery seal 144. Since the outlet side of the pouring spout 141 is sealed by the pouring spout periphery seal 144, a metering chamber 148 that can accommodate the contents prior to dispensing is formed by the pair of body members 101 and 102 in which the pouring spout periphery seal is formed and the valve member 103 that is welded to the body members 101 and 102 by the valve-body seal 151. Subsequently, on the outlet side of the pouring spout 141 in the body members 101 and 102 in a position prior to the shift to the position G3, an easy opening working process 110 is provided in which weakened worked parts used to facilitate opening are formed in the outer surfaces of the body members 101 and 102 so as to cut across the pouring spout 141 and connect with both ends of the cut 145.

Furthermore, in the position E3 in which the pouring spout seal 143 is formed by the pouring spout sealer 108, and the position F3 in which the pouring spout periphery seal 144 formed by the pouring spout periphery sealer (109) and the bottom seal 156 are formed, the respective seals are mutual seals of the upper and lower body members 101 and 102; these seals are also formed in portions that form branches parts 161 further to the outside than the folded part 162. In the pouch P3, the filling opening 140 is formed by separate means in an after-process. When the bottom seal 156 is formed in the position F3, the upper and lower body members 101 and 102 and the bottom member 121 are completely sealed.

A pouring spout mold release cutter 111 consisting of a pair of mold release cutter parts 111*a* and 111*b* that are disposed above and below both end parts of the respective body members 101 and 102 so that these cutter parts can move upward and downward is disposed in the position G3 that is located downstream from the position F3. The pouring spout mold release cutter 111 performs mold release of the body members 101 and 102 on which the pouring spout periphery seal 144 has been formed, thus determining the external shape of the metering chamber 148, and also forms a tab 144*a* and cut 145.

Following the formation of the pouring spout periphery seal 144 and bottom seal 156 at the position F3, easy opening working around the pouring spout 141 is performed in the process 110. Furthermore, after mold release of the periphery of the pouring spout is performed by the pouring spout mold release cutter 111 in the position G3 so that a branched part 161 is formed in each pouch, folding back of the branched part 161 is performed by the fold-back molding part 131 via the position H3 and position 13. In the position J3 where the folding back of the branched part 161 is completed, the filling opening fold-back in which the folded part 162 is folded back toward the outside in the lateral direction is completed, and a temporary fastening punch hole treatment of the branched part is performed by a branched part temporary fastening punch 132 between pouches that are adjacent in the pouch feeding direction. The branched part temporary fastening punch 132 consists of a punch 132*a* and a punch receiver 132*b* that is disposed facing this punch 132*a*.

In the position K3 which is located immediately downstream from the position J3, a lateral sealer 112 extending in a direction that cuts across the body members 101 and 102 is disposed above and below the body members 101 and 102. The lateral sealer 112 consists of a pair of sealing heads 112*a* and 112*b* that can move upward and downward, and forms a lateral seal 142 that welds both body members 101 and 102 in a state of continuous connection to the pouring spout periphery seal 144 at both ends, straddling the portions of the body members 101 and 102 that form two pouches P3 and P3 that are adjacent in the feeding direction. In the portions where the bottom member 121 is present, the lateral sealer 112 presses and heats the body members 101 and 102 in a state in which the bottom member 121 is clamped. A lateral seal 142 is formed by the lateral sealer 112 in the cross-sectional region excluding the portions where the branched part temporary fastening punch hole treatment is performed. The lateral seal 142 is formed once across the two rows between the two pouches P3, P3 that are adjacent to each other in the feeding direction of the packaging material.

After the position K3, temporary fastening spot sealing 163 is performed by a spot sealer 133 on the portions where the branched part temporary fastening punch hole treatment is performed. The spot sealer 133 consists of sealing heads 133*a* and 133*b*. Subsequently, bottom corner punching 134 is performed between the punch holes 157 formed in the bottom member 121 by the bottom member punch 125, and a filling opening corner punch treatment that forms rounding in the corner parts of the filling opening is performed on the folded part 162 by the filling opening corner punch 135. Subsequently, furthermore, a suspension hole formation treatment is performed by a suspension hole punch 136 that forms a suspension hole 158 in the area of the bottom seal 156. The bottom corner punch 134, filling opening corner punch 135 and suspension hole punch 136 each consist of a punch 134*a*, 135*a*, 136*a* and a punch receiver 134*b*, 135*b*, 136*b* that is disposed facing this punch. In the immediately following position L3, the tip end portion of the folded part 162 is cut away by a cutter 137, so that the filling opening 140 is opened, and the pouches in two rows are cut by a central slitter 115 along the center lines of the body members 101 and 102, i.e., along the center line 123 in a state in which the folded-back end portions of the bottom member 121 are caused to abut against each other, thus separating the left and right pouches P3, P3. Subsequently, furthermore, a cutting treatment is successively performed by a cutter 116 in the lateral direction from the manufactured pouches P3.

Figure 11:
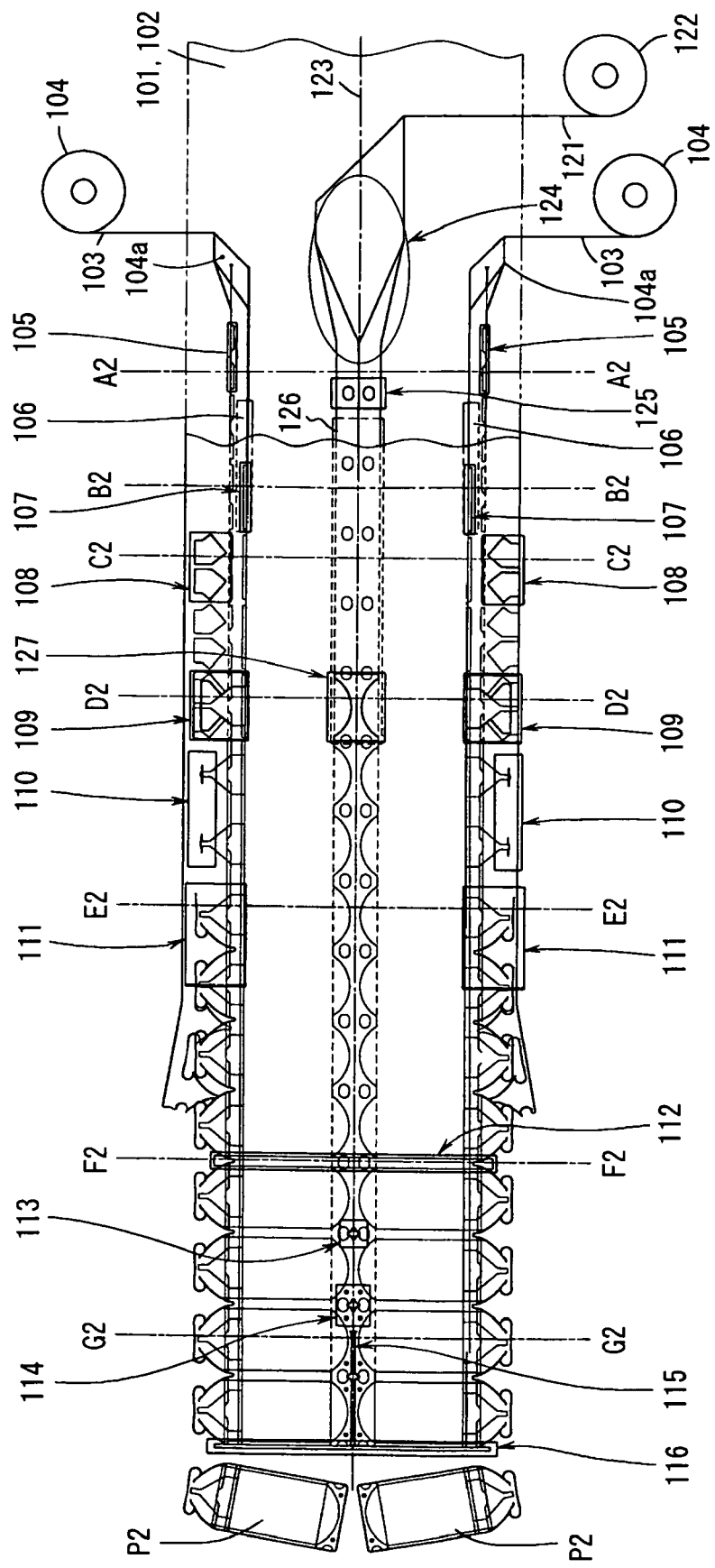
FIG. 11 is a plan view which shows a schematic representation of one example of a manufacturing process for a self-standing pouch as the pouch of the present invention.

The process of the present invention for manufacturing a branched self-standing pouch is shown in FIGS. 7 through 10. However, by omitting the incorporation of the formation of a folded part 162 for the branched part 161 by the branch forming part 130 in a position near the end portion of the upper-side body member 101 and the folding back of this branched part 161 by the fold-back molding part 131, it is possible to obtain a manufacturing process for manufacturing pouches as pouches that are self-standing but not branched in two rows in which the top-bottom direction is respectively oriented in a perpendicular direction on both sides of the direction in which the process progresses in the same manner as in the case of branched self-standing pouches. FIG. 11 shows a plan view which gives a schematic representation of one example of a manufacturing process for such self-standing pouches. In FIG. 11, common mechanisms and parts other than the position symbols are labeled with the same symbols as in the case of the manufacturing process for branched self-standing pouches shown in FIG. 7, and a duplicate description is omitted. Furthermore, in this self-standing pouch, the non-thermally-welded portion that is left as a result of the use of a blocking plate 126 during the formation of the bottom seal 156 is formed as a filling opening 140; in the position F2, both lateral side portions of the filling opening 140 are sealed by the lateral sealer 112. In the position G2, suspension hole punches that form suspension holes 152, 152 on both sides of the parts corresponding to the respective filling openings 140 can be disposed for each of the two self-standing pouches that are adjacent on the left and right in two rows.

Figure 12:
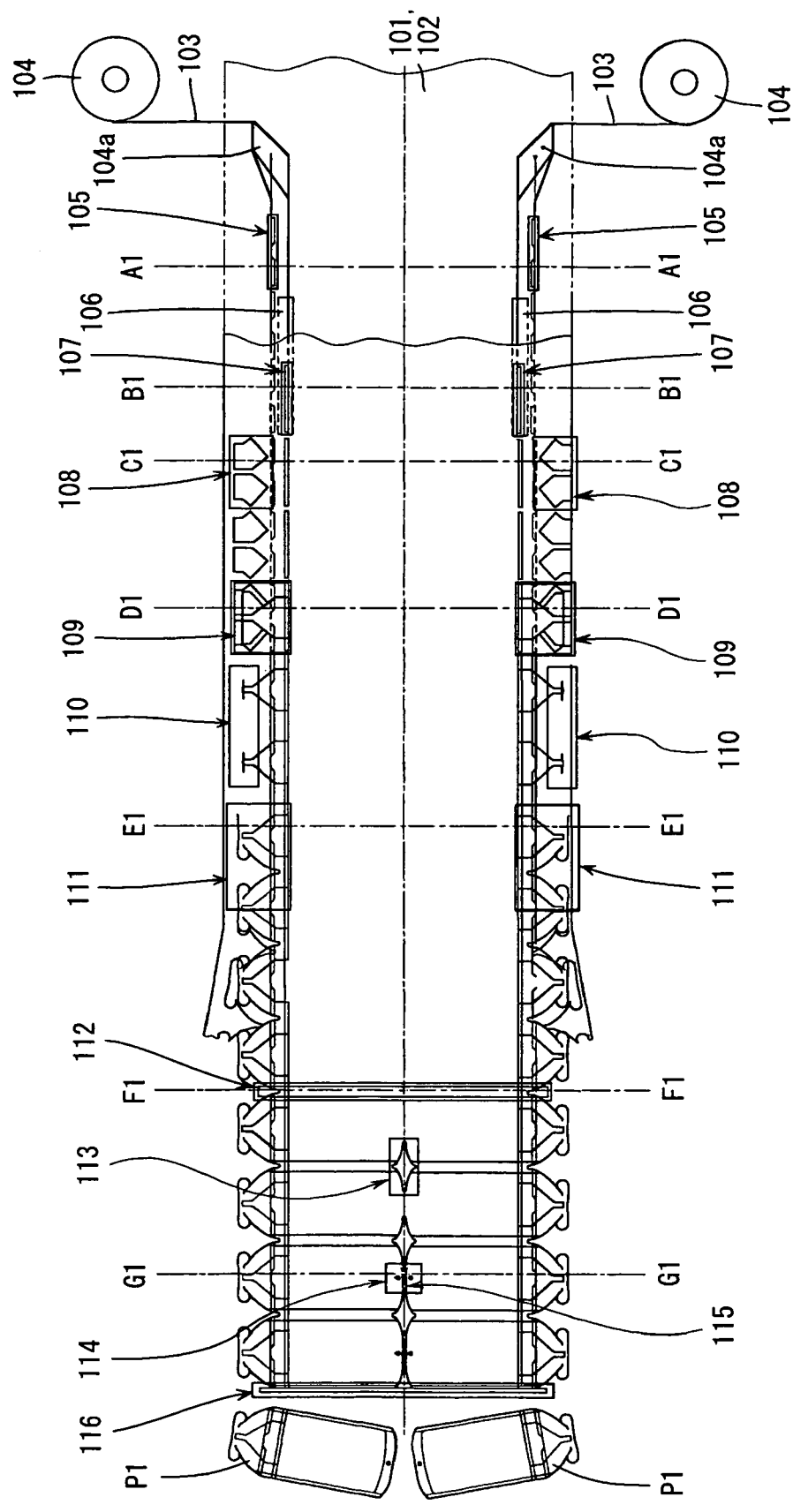
FIG. 12 is a plan view which shows a schematic representation of one example of a manufacturing process for a flat type pouch as the pouch of the present invention.

Furthermore, by omitting the incorporation of the bottom member 121 into the body members 101 and 102, it is possible to obtain a manufacturing process for manufacturing pouches as simple flat pouches that are not self-standing in two rows in which the top-bottom direction is respectively oriented in a perpendicular direction on both sides of the direction in which the process progresses in the same manner as in the case of branched self-standing pouches. FIG. 12 shows a plan view which gives a schematic representation of one example of a manufacturing process for such flat pouches. In FIG. 12 as well, common mechanisms and parts other than the position symbols are labeled with the same symbols as in the case of the manufacturing process for branched self-standing pouches shown in FIG. 7, and a duplicate description is omitted. Immediately following the position F1, rounding is formed in the corners around the filling openings 140 of four flat pouches that are adjacent on the front and back and on the left and right by bottom corner punches, and immediately after this, in positions surrounding the punch holes formed by the bottom corner punches, suspension holes 158 are formed by suspension hole punches in each of the four adjacent pouches. The suspension holes 158 can be formed as one hole in the center of each flat pouch.

Figure 13:
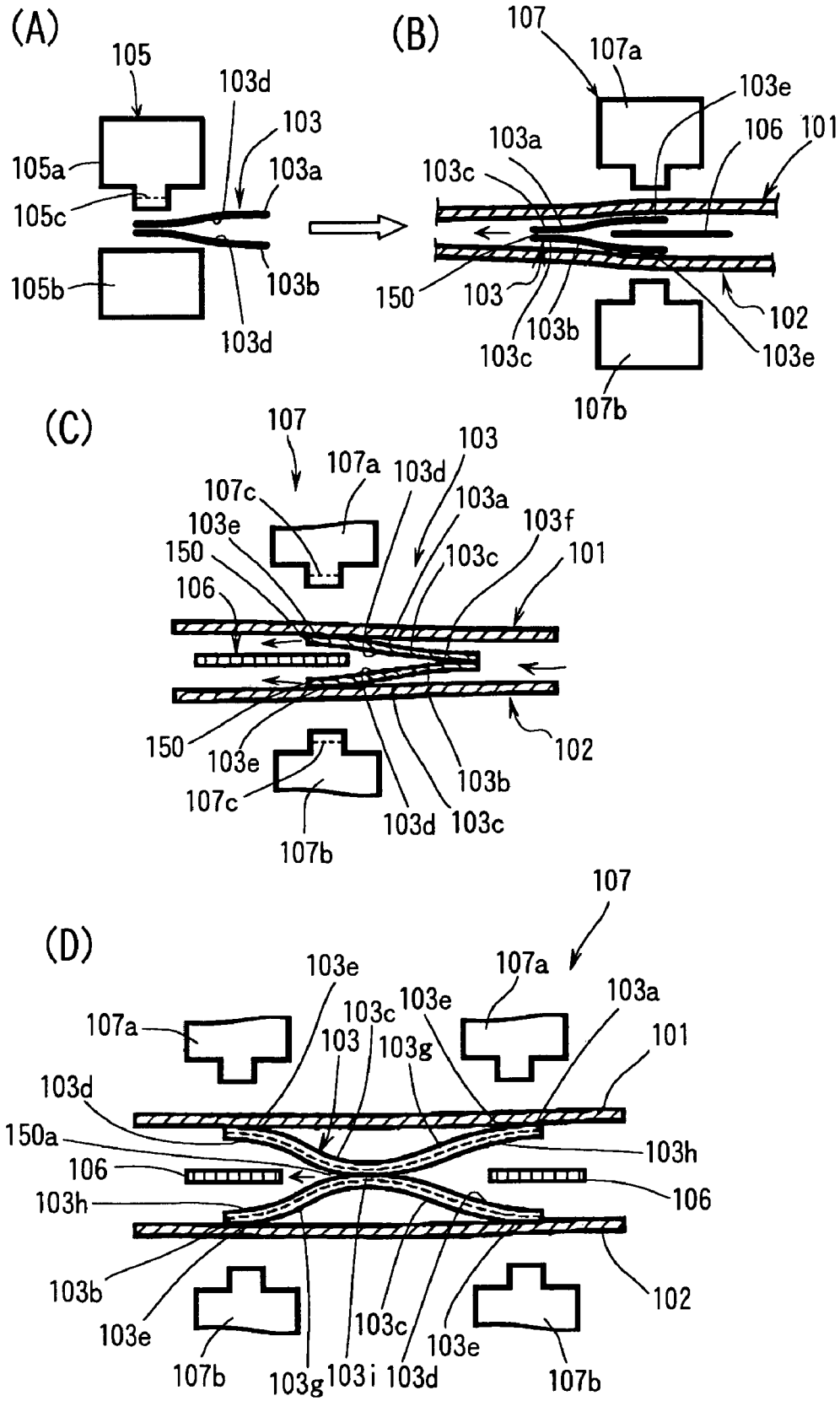
FIGS. 13(A)-(D) are schematic diagrams showing an embodiment of a pouch manufacturing method using a partitioning material consisting of two valve member films in the pouch manufacturing method and apparatus of the present invention.

An outline of an embodiment of a manufacturing method for pouches in which partitioning members are constructed from a pair of valve members 103a, 103b is shown in FIG. 13. FIG. 13 (A) is a sectional view which shows an outline of the welding of the valve members to each other, FIG. 13 (B) is a sectional view which shows an outline of the welding of the valve members to the body members, FIG. 13 (C) is a sectional view which shows an embodiment using another welding configuration, and FIG. 13 (D) is a sectional view which shows an embodiment using still another welding configuration. Both surfaces of the valve members 103a and 103b are tightly heat-sealable; specifically, these are film elements consisting of tight sealing layers so that tight welding is possible. As is shown in FIG. 13 (A), prior to the thermal welding to the body members 101 and 102, both surfaces 103d, 103d on the other sides of the valve members 103a and 103b near the other sides in the lateral direction are pressed and heated between the heat sealing heads 105a and 105b of the valve sealer 105 in a state in which the pair of valve members 103a and 103b are caused to face each other, so that the portions that are pressed and heated are tightly thermally welded as valve seals 149 (see FIG. 16). The portion that is left as a non-welded part without being pressed and heated by the non-sealer part 105c of the heat sealing head 105a is formed as a valve passage 150 that allow the contents to pass through. The valve sealer 105 is disposed on the upstream side of the body-partition sealer 107 described later.

Furthermore, as is shown in FIG. 13 (B), the pair of valve members 103a and 103b in which the valve passage 150 has been formed near the other sides of the valve members 103a and 103b in the lateral direction are disposed between the pair of body members 101 and 102, and are clamped, pressed and heated by the heat sealing heads 107a and 107b which are the sealer parts of the valve-body sealer 107 from the outsides of the body members 101 and 102 near one side of each of the valve members 103a and 103b in the lateral direction, so that one of the side surfaces 103c, 103c facing toward the outside on each of the valve members 103a and 103b is thermally welded to the inside surface of the body member 101 or 102 in the portions that are pressed and heated, thus forming tightly welded parts 103e, 103e. Since a sealing preventing member 106 is interposed and disposed between the valve members 103a and 103b in at least the range corresponding to the tightly welded parts 103e, 103e, the thermal welding of the facing other side surfaces 103d, 103d of the two valve members 103a and 103b to each other is prevented. Accordingly, the flow of the contents passing through the valve passage 150 and the space between the pair of valve member films is ensured, so that there is virtually no cessation of the function of the valve passage 150. In order to cause smooth running of the valve members 103, the sealing preventing member 106 is formed with a thickness of 5 mm or less, and a Teflon (registered trademark) tape is pasted to the surface of this member 106. In a state in which the pouch is filled with the contents, the tightly welded parts 103e, 103e are separated from each other with the areas near the other sides in the lateral direction acting as supporting points, so that the space between the body members 101 and 102 can be widened, thus making it possible to ensure a sufficient capacity inside the pouch.

Furthermore, as is shown in FIG. 13 (C), the valve members 103a and 103b in which both surfaces consist of tight sealing layers are disposed between the body members 101 and 102 with the other side surfaces 103d, 103d that face toward the inside near one side in the lateral direction welded to each other beforehand as closed members 103f without any non-welded parts, and with the valve members 103 thus obtained being used as partitioning members. The body-partition sealer 107 is constructed by disposing sealing heads 107a and 107b as sealer parts that weld the valve members 103 and body members 101 and 102 near the other sides of the valve members 103a and 103b in the lateral direction. As a result of the body members 101 and 102 being heated and pressed by the sealing heads 107a and 107b with the valve members 103 clamped in between, tightly welded parts 103e, 103e are formed between the valve members 103 and body members 101 and 102. Since a non-sealer part 107c is disposed on the sealing heads 107a and 107b, a valve passage 150 that remains as a non-welded part can be formed in the tightly welded parts 103e, 103e between one of the side surfaces 103c, 103c of each of the valve members 103 and the body members 101 and 102, and the contents can pass from one side to the other side through this valve passage 150. Furthermore, a valve sealer which welds the valve members 103a and 103b to the mutually facing surfaces without non-welded parts can be disposed on the upstream side of the body-partition sealer 107. Since a sealing preventing member 106 is interposed between the valve members 103a and 103b so that the valve members 103a and 103b are not welded in the areas corresponding to the tightly welded parts 103e, 103e, the valve members 103a and 103b do not constrain the back surfaces of the valve passage 150 through which the contents pass between the body members 101 and 102, so that the passage of the contents through the valve passage 150 is not hindered. In a state in which the pouch is filled with the contents, the tightly welded parts 103e, 103e are separated from each other with the closed members 103f near the other sides in the lateral direction acting as supporting points, so that the space between the body members 101 and 102 can be widened, thus making it possible to ensure a sufficient capacity inside the pouch.

Furthermore, as is shown in FIG. 13 (D), the valve members 103a and 103b can be formed as multi-layer films which each have a tight sealing layer 103g on the side of at least one side surface 103c, 103c, and which have an easy peeling layer 103h, 103h with a welded strength that allows easy peeling on the side of the other side surface 103d, 103d. An easily peeled welded part 103i is formed in different positions in the lateral direction, e.g., in the central region in the lateral direction, on the valve members 103a and 103b by welding the easy peeling layers 103h, 103h to each other beforehand. The above-mentioned body-partition sealer 107 comprises two sealer parts consisting of sealing heads 107a and 107b that are respectively disposed on both sides of the valve members 103 in the lateral direction, and tightly welded parts 103e, 103e in which the valve members 103a and 103b and body members 101 and 102 are tightly welded are formed on both sides of the easily peeled welded part 103*i* in the lateral direction by pressing and heating the valve members 103*a* and 103*b* in a state in which these valve members are clamped between the body members 101 and 102. The easy-stripping welding of the easy peeling layers 103*h*, 103*h* to each other can be performed beforehand prior to the tight welding with the body members 101 and 102; in regard to the manufacturing apparatus, it is desirable to dispose the sealer used for easy-stopping welding on the upstream side of the body-partition sealer 107. In the stage immediately following manufacture, the compartments on both sides of the valve members 103 are completely separated, so that the pouch can prevent movement of the contents between the compartments prior to use. The easily peeled welded part 103*i* can easily be peeled by the internal pressure which is elevated when the pouch is pressed in the use state, and when this is peeled, a passage 150*a* that allows the passage of the contents is formed. In a state in which the pouch is filled with such contents, the tightly welded parts 103*e*, 103*e* are separated from each other with the easily peeled welded part 103*i* near the center acting as a supporting point, so that the space between the body members 101 and 102 can be widened, thus making it possible to ensure a sufficient capacity inside the pouch.

Figure 14:
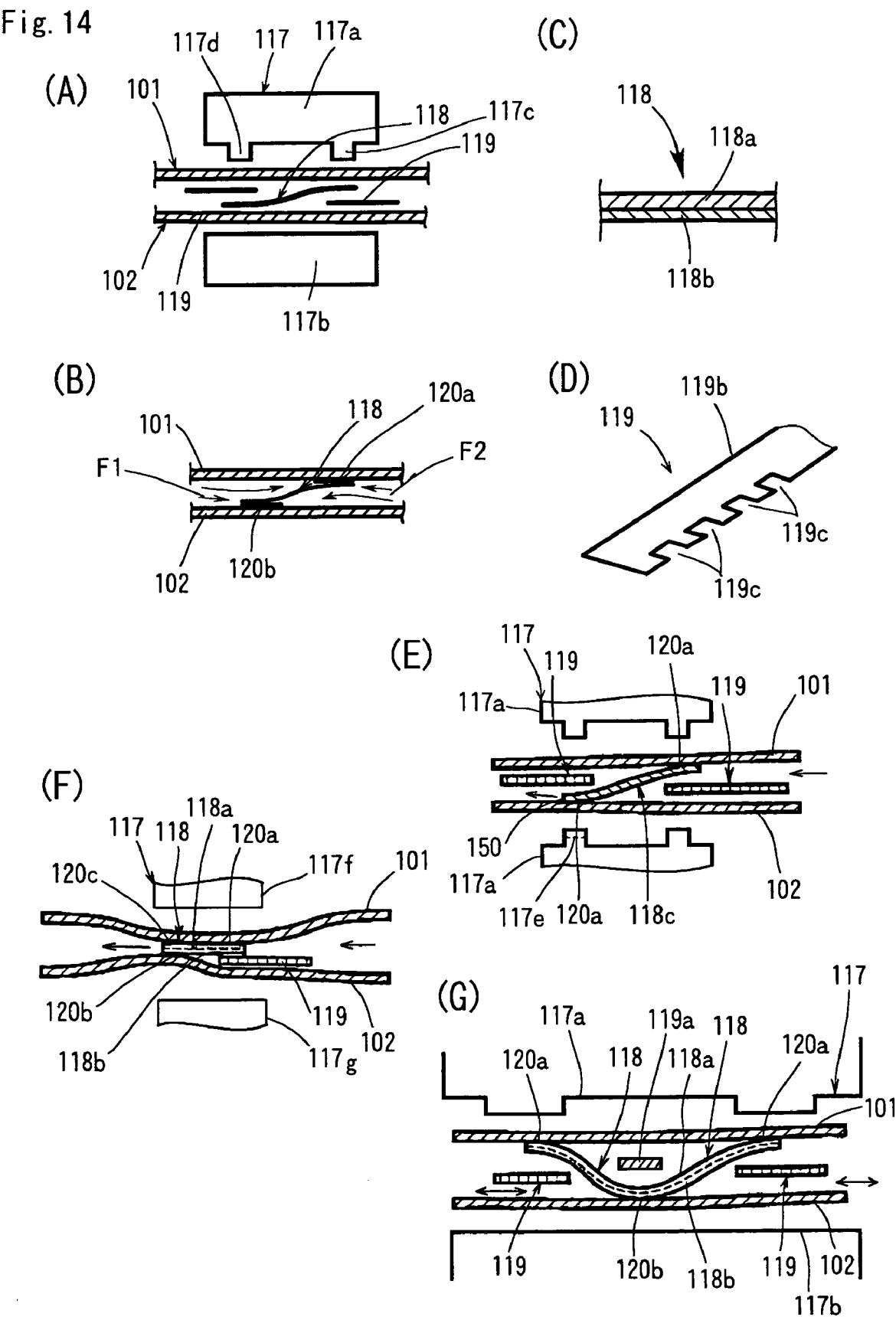
FIGS. 14(A)-(G) are schematic diagrams showing an example in which a single valve member used in the pouch manufacturing method of the present invention is welded to the body member.

FIG. 14 shows a schematic representation of an example in which a single valve member used in the pouch manufacturing method of the present invention is welded to the body members. As is shown in FIG. 14 (C), the valve member 118 is a single web-form multi-layer film in which one surface side is formed as a tightly sealed layer 118*a* and the other surface side is formed as an easy peeling layer 118*b*. The pouch itself using the valve member 118 is as will be shown later in FIG. 19; as is shown in FIG. 14 (A), the valve member 118 which has a multi-layer structure is disposed in a state in which this member is clamped between a pair of body members 101 and 102, and a sealing preventing member 119 and auxiliary sealing preventing member 119 are disposed between the valve member 118 and the respective body members 101 and 102 with the positions of these preventing members being shift in the lateral direction of the web. In this state, the members are pressed and heated by the heat sealing heads 117*a* and 117*b* of the valve-body sealer 117 from the outsides of the pair of body members 101 and 102. The valve-body sealer 117 comprises two sealer parts 117*c* and 117*d* that are spaced in the lateral direction of the valve member 118.

As is shown in FIG. 14 (B), the valve member 118 and respective body members 101 and 102 are thermally welded on the side on which the sealing preventing members 119 are not installed; double heat sealing is not performed in the direction cutting across the direction of passage of the contents. Here, a tightly welded part 120*a* which is formed as a result of the tight sealing layer 118*a* being welded to the body member 101 by the sealer part 117*c*, and an easily peeled welded part 120*b* which is formed as a result of the easy peeling layer 118*b* being welded to the body member 102 by the sealer part 117*d*, are formed so that these parts are spaced in the lateral direction of the valve member 118. On the side where the tightly welded part 120*a* is formed, a strong sealing strength is obtained, and the seal is not easily peeled even if a pressure F1 acts on the interior of the pouch. On the side where the easily peeled welded part 120*b* is formed, the sealing strength is weak, and the seal is easily peeled if a pressure F2 is applied to the interior of the pouch, as when the pouch is crushed. Accordingly, the contents can move through the passage that is formed between the peeled easy peeling layer 118*b* and the body member 102.

Furthermore, as is shown in FIG. 14 (D), easy peeling characteristics can be realized to an even greater degree by constructing the sealing preventing member 119 on the said of the easy peeling layer 118*b* in a shape which is such that the indentations and projections 119*c* enter and exit, so that the easily peeled welded part 120*b* is formed in a shape that causes a concentration of stress to occur. The valve member 118 and the respective body members 101 and 102 can be sealed while being conveyed as web-form packaging members inside the apparatus in which the sealing preventing member 119 and auxiliary sealing preventing member 119*a* are incorporated, so that pouches such as the pouches P3 or the like can be automatically and continuously manufactured. Furthermore, since the tightly welded part 120*a* and easily peeled welded part 120*b* are formed so that these parts are spaced in the lateral direction of the valve member 118, the body members 101 and 102 can also be spread in the position where the valve member 118 is disposed, so that a sufficient amount of filling can be ensured inside the pouch.

FIG. 14 (E) shows an outline of a pouch manufacturing method using a valve member 118*c* which is a single film in which both surfaces consist of tight sealing layers. Since both surfaces of the valve member 118*c* are tight sealing layers, tightly welded parts 120*a*, 120*a* formed by tight welding are disposed in different positions in the lateral direction of the valve member 118*c*. In the respective tightly welded parts 120*a*, the welded side of the valve member 118*c* is one side, and the non-welded side is the other side. The body-partition sealer 117 comprises two sealer parts that perform tight welding of the valve member 118*c* and body members 101 and 102 in correspondence with the tightly welded parts 120*a*, 120*a* formed in different positions in the lateral direction of the valve member 118*c*. In the same manner as in the example shown in FIG. 13 (C), a passage that allows the contents to pass through can be formed as a valve passage 150 that has the function of a back-flow check valve by performing tight welding in one tightly welded part 120*a*, and leaving a non-welded part between the between the valve member 118 and the body member 102. In order to form the valve passage 150, it is desirable that one sealer part 117*a* comprise a non-sealer part 117*e* that leaves a non-welded part in the tightly welded part 120*a*. Since a sealing preventing member 119 is interposed between the valve member 118*c* and body member 101 in correspondence with the tightly welded part 118*e* where the valve passage 150 is formed, the back surface side of the valve passage 150 is not constrained by the body member 101, so that the passage of the contents is not hindered. Since a sealing preventing member 119 is interposed on the side of the body member 102 in correspondence with the other tightly welded part 120*a*, communication of the contents between the valve member 118*c* and the body member 102 is not hindered. Furthermore, since spreading of the body members 101 and 102 is allowed, a sufficient amount of filling can be ensured as in the example shown in FIG. 14 (A). The pressure inside the pouch acts in the manner of a wedge to cause peeling of the tight welding with respect to the tightly welded parts 120*a*, 120*a* on both sides of the valve member 118*c*; it is desirable that a sufficient peeling strength be provided.

FIGS. 14 (F) and 14 (G) show an outline of a pouch manufacturing method in which the valve member 118 is the single multi-layer film shown in FIG. 14 (C), and the valve member 118 is also utilized as a simple partitioning member that demarcates the interior of the pouch into a plurality of compartments, i.e., two or more compartments. In the example shown in FIG. 14 (F), an easily peeled welded part 120*b* formed by the welding of the easy peeling layer 118*b* to the body member 102 is formed directly adjacent in the lateral direction to the tightly welded part 120*a* formed by the welding of the tight sealing layer 118a to the body member 101. A tightly welded part 120c formed by the tight sealing layer 118a corresponding to the easily peeled welded part 120b is formed as a continuation of the tightly welded part 120a. The body-partition sealer 117 comprises single sealer parts 117f and 117g having a width that is continuous in the lateral direction of the valve member 118 in correspondence with the easily peeled welded part 120b and tightly welded part 120a, 120c, and a sealing preventing member 119 can be interposed and disposed between the body member 102 only in the range corresponding to the tightly welded part 120a on the side of the easy peeling layer 118b. As a result of the action of the body-partition sealer 117, tightly welded parts 120a and 120c are continuously formed on the valve member 118 on the side of the tight sealing layer 118a, and since a sealing preventing member 119 is interposed and disposed in the range corresponding to the tightly welded part 120a on the side of the easy peeling layer 118b, there is no welding in this range, and an easily peeled welded part 120b is formed in the range in which the sealing preventing member 119 is not interposed. The easily peeled welded part 120b can easily be peeled by the elevated internal pressure of the contents when the pouch is crushed, and the contents can move through the passage formed between the easy peeling layer 118b and the body member 102.

The example shown in FIG. 14 (G) is still another example of a pouch manufacturing method using the single valve member 118 consisting of a multi-layer film that is shown in FIG. 14 (C). Here, two tightly welded parts 120a, 120a that are spaced in the lateral direction of the valve member 118 are formed, and an easily peeled welded part 120b is formed between the two tightly welded parts 120a, 120a. The body-partition sealer 117 may have the same structure as that shown in FIG. 14 (A). In the respective tightly welded parts 120a, the sealing preventing member 119 is interposed between the body member 102 in conformity with the sealer part 117c (117d) on the side of the easy peeling layer 118b; accordingly, when the body-partition sealer 117 operates, the valve member 118 is tightly welded to the body member 101 on the side of the tight sealing layer 118a, but cannot be welded to the body member 102 on the side of the easy peeling layer 118b. It is desirable that the easily peeled welded part 120b between the two tightly welded parts 120a, 120a be formed beforehand prior to the welding effected by the body-partition sealer 117; however, this may also be performed at the same time as the welding by the body-partition sealer 117. In this case, the auxiliary sealing preventing member 119a may be interposed between the body member 101 on the side of the tight sealing layer 118a correspondingly to the easily peeled welded part 120b. The easily peeled welded part 120b can be peeled by the internal pressure which is elevated when the pouch is crushed, so that the contents can move through the passage that is formed between the peeled easy peeling layer 118b and the body member 102.

The pouch manufacturing method of the present invention was described on the basis of various types of pouches P1 through P3 having a dispensing function. However, the present invention is not limited to these types of pouches; it is clear that the present invention can also be applied to the manufacture of flat pouches that have branched parts. Furthermore, the partition is not limited to valves alone; the present invention can also be applied to the manufacture of pouches in which partitioning that restricts the movement of the contents is performed, e.g., pouches in which a plurality of different types of contents are initially partitioned and packaged separately, but are mixed immediately prior to use, as in the case of dressings. Furthermore, welding was described using heat sealing, i.e., thermal welding, as an example; however, welding by ultrasound or other systems is also possible.

Next, concrete examples of the pouch of the present invention will be described; however, the following concrete examples do not limit the present invention.

FIG. 15 shows examples in which the pouch of the present invention is applied to a flat pouch. FIG. 15 (A) is a front view showing one example of such a pouch, and FIG. 15 (B) is a front view showing another example. In the example shown in FIG. 15 (A), when the edge parts 132 of plastic films are heat sealed to form a pouch 131a that has a self-closable pouring spout 133, the plastic films are heat sealed across the lateral direction of the pouch 131a so as to form first demarcating parts 134, 134 and second demarcating parts 135, 135, thus demarcating the interior of the pouch into an accommodating compartment 138, a buffering compartment 136 that communicates with the accommodating compartment 138, and a metering chamber 137 that is connected with the pouring spout 133 in the upper part of the pouring spout 133 (i.e., on the side of the interior part of the pouch). In order to remove contents such as a liquid or the like from the pouch 131a, a handle 140 disposed on the tip end portion of the pouch is grasped with the fingers, and the tip end portion of the pouring spout 133 is opened along an easy opening worked part 141 such as a perforated line or the like; then, the metering chamber 137 is pressed with the hand or with an implement, and the contents such as liquid or the like are poured out. In this case, the contents such as a liquid or the like will tend to flow back into the accommodating compartment 138 from the metering chamber 137; however, such back flow can be prevented for the most part by the first demarcating parts 134, 134 which have the function of a check valve. Furthermore, a laminated film in which a biaxially drawn nylon film with a thickness of 15 μm and a linear low-density polyethylene film with a thickness of 130 μm are laminated from the outer layer using a urethane type bonding agent is used as the material of the pouch main body (thickness of bonding agent layer: 4 μm).

In the pouch 131a, second demarcating parts 135, 135 are formed by heat sealing on the upper parts of the first demarcating parts 134, 134, so that a buffering compartment 136 is formed between the metering chamber 137 and the accommodating compartment 138; accordingly, even if the contents such as a liquid or the like tend to flow back from the metering chamber 137 when dispensed, this back flow is absorbed by the buffering compartment 136, so that the contents can be prevented from flowing back directly into the accommodating compartment 138. Furthermore, since a narrow liquid passage 139 is constructed in the pouch 131a by the first demarcating parts 134, 134, the occurrence of flattening deformation in the vicinity of the liquid passage 139 can be prevented by the buffering compartment 136.

In the pouch 131b shown in FIG. 15 (B), first demarcating parts 134, 134 and second demarcating parts 135, 135 are respectively formed toward the central part of the pouch from both sides of the pouch; in the pouch 131b, the first demarcating parts 134 are constructed by heat sealing from one side of the pouch toward the opposite side of the pouch, and the second demarcating parts 135 are formed on the opposite side from the first demarcating parts 134. As a result of this demarcation, the interior of the pouch is demarcated into an accommodating compartment 138, a buffering compartment 136 that communicates with the accommodating compartment 138, and a metering chamber 137 that is connected to the pouring spout 133. The remaining construction and method of use of the pouch 131b are similar to those of the pouch 131a shown in FIG. 15 (A).

In the flat pouches 131a and 131b shown in the abovementioned FIGS. 15 (A) and 15 (B), examples were described in which the interiors of the pouches 131a and 131b were demarcated into an accommodating compartment 138, a buffering compartment 136 and a metering chamber 137 by forming first demarcating parts 134 and second demarcating parts 135. However, it goes without saying that it would also be possible to form only the first demarcating parts 134 in the pouch, thus demarcating the pouch into two parts, i.e., an accommodating compartment 138 and a metering chamber 137. Furthermore, the dimensions and shapes of the first demarcating parts 134 and second demarcating parts 135 can be appropriately selected in accordance with the contents such as a liquid or the like that are accommodated inside the pouch, and the dimensions, materials and the like of the pouch.

Figure 16:
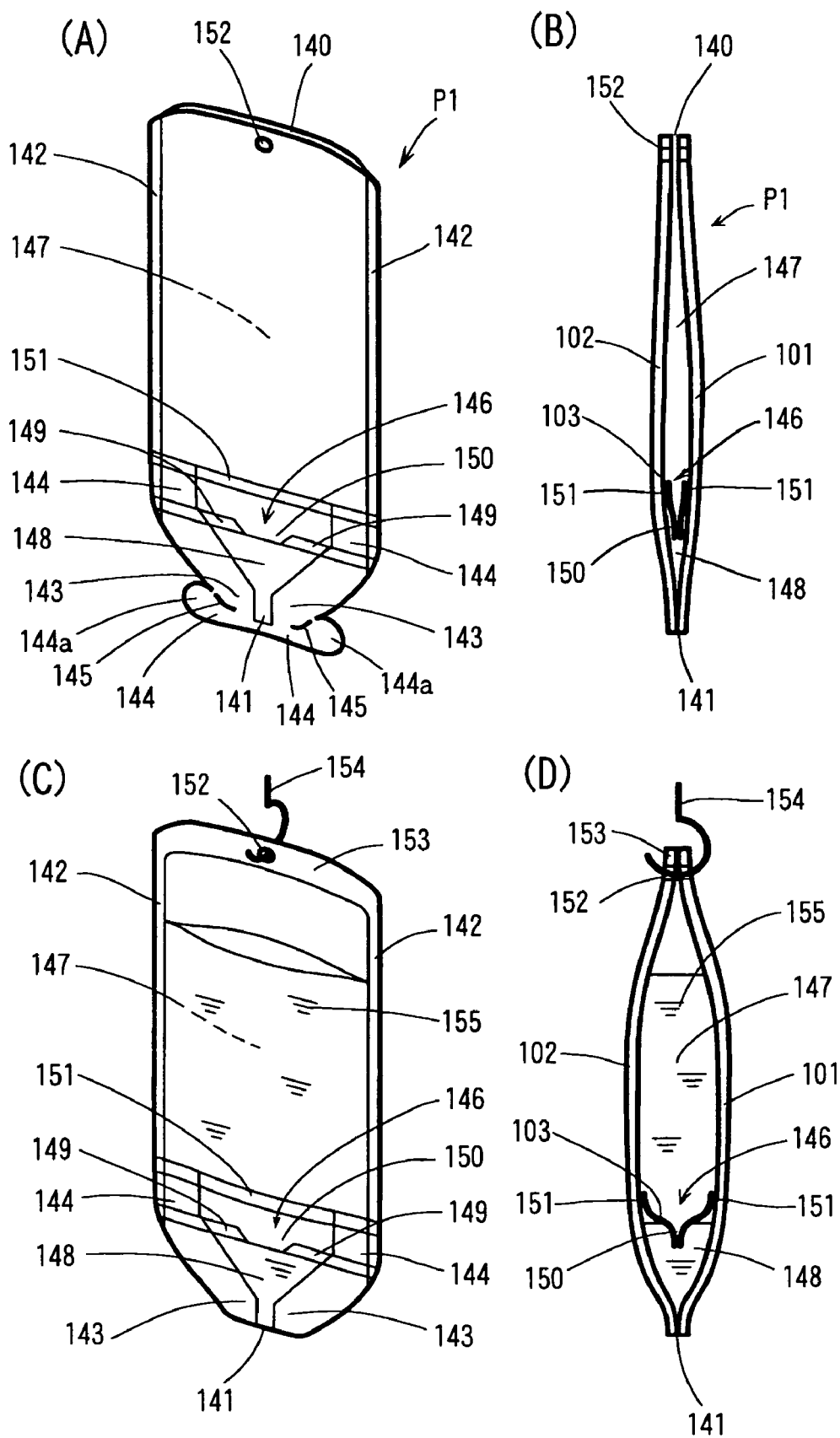
FIGS. 16(A)-(D) are diagrams showing one example of a flat type dispenser pouch constituting a concrete example of the pouch of the present invention.

FIG. 16 shows another example of a flat type dispenser pouch (hereafter abbreviated to "flat pouch") that has a self-closable pouring spout. FIG. 16 (A) shows an overall perspective view of the flat pouch, FIG. 16 (B) shows a longitudinal sectional view, FIG. 16 (C) is a perspective view showing the conditions of use of the flat pouch after filling, and FIG. 16 (D) shows a longitudinal sectional view of the flat pouch shown in FIG. 16 (C). The flat pouch P1 shown in FIG. 16 is a pouch in which the end portions (at one end, the upper end portions in the figure considering filling) of a pair of facing body members 101 and 102 are formed into a filling opening 140, and the other end portions (the lower end portions in the figure) are pasted together as a pouring spout 141; here, the pouch is formed with a lateral seal 142 and an end portion seal 153 respectively formed on both side edge portions and one end edge portion of the pouch. As is shown in FIG. 16 (A), the pouring spout 141 is formed by leaving this as an unsealed portion when the pouring spout seal 143 is formed in the lower end peripheral edge portion, and the outlet side of the pouring spout 141 is closed off by a pouring spout periphery seal 144 that further seals the periphery of the pouring spout seal 143. In the pouring spout periphery seal 144, a cut 145 used for easy opening is formed on an extension line on both sides of the pouring spout 141. By cutting the handle 144a along the cut 145 (see FIGS. 16 (C) and 16 (D)), the contents (especially liquid form contents) can be poured out from the pouring spout 141 appearing on the outside. During the molding of the pouring spout seal 143, the pouring spout 141 can be formed as a self-closable pouring spout in the same manner as the pouring spouts 33 of the pouches 31a and 31b shown in FIGS. 15 (A) and 15 (B), thus forming the pouring spout so that there is no leakage of the contents 155 under their own weight.

Slightly below the center of the flat pouch P1, a valve 146 is formed which partitions the body members 101 and 102 into an upper accommodating compartment 147 and a lower metering chamber 148. The valve 146 is formed by overlapping two film valve members 103, and allows the passage of the contents 155 only from the accommodating compartment 147 into the metering chamber 148; this is a back flow preventing valve that acts to prevent back flow. When the valve seal 149 that welds the opposite surfaces of the two valve members 103 is formed, a valve passage 150 is formed by leaving a non-welded part as a non-sealed part. The valve 146 is attached to the body members 101 and 102 by valve-body seals 151 that weld the outside surfaces of the two valve members 103 to the inside surfaces of the body members 101 and 102. Suspension holes 152 are formed in the upper end portions of the body members 101 and 102, and after the pouch is filled with the contents 155, an end portion seal 153 is formed by welding the upper end portions for a width that includes the suspension holes 152. The flat pouch P1 can be suspended and held, and supplied for use, by engaging a hanger 154 in the suspension holes 152.

When the flat pouch P1 is thus suspended, the contents 155 inside the accommodating compartment 147 move under their own weight into the metering chamber 148 via the valve 146. Then, when the pressure inside the metering chamber 148 balances the pressure inside the accommodating compartment 147, the movement of the contents 155 stops so that the contents are stabilized. Furthermore, even if the flat pouch P1 is not suspended, the contents 155 inside the accommodating compartment 147 can be caused to move into the metering chamber 148 via the valve 146 by increasing the internal pressure by pressing the accommodating compartment 147 with the hand or the like. When the metering chamber 148 is pressed, the contents 155 inside the metering chamber 148 are prevented from returning to the accommodating compartment 147 by the valve 146; accordingly, the contents 155 can be dispensed a small amount at a time via the pouring spout 141.

Figure 17:
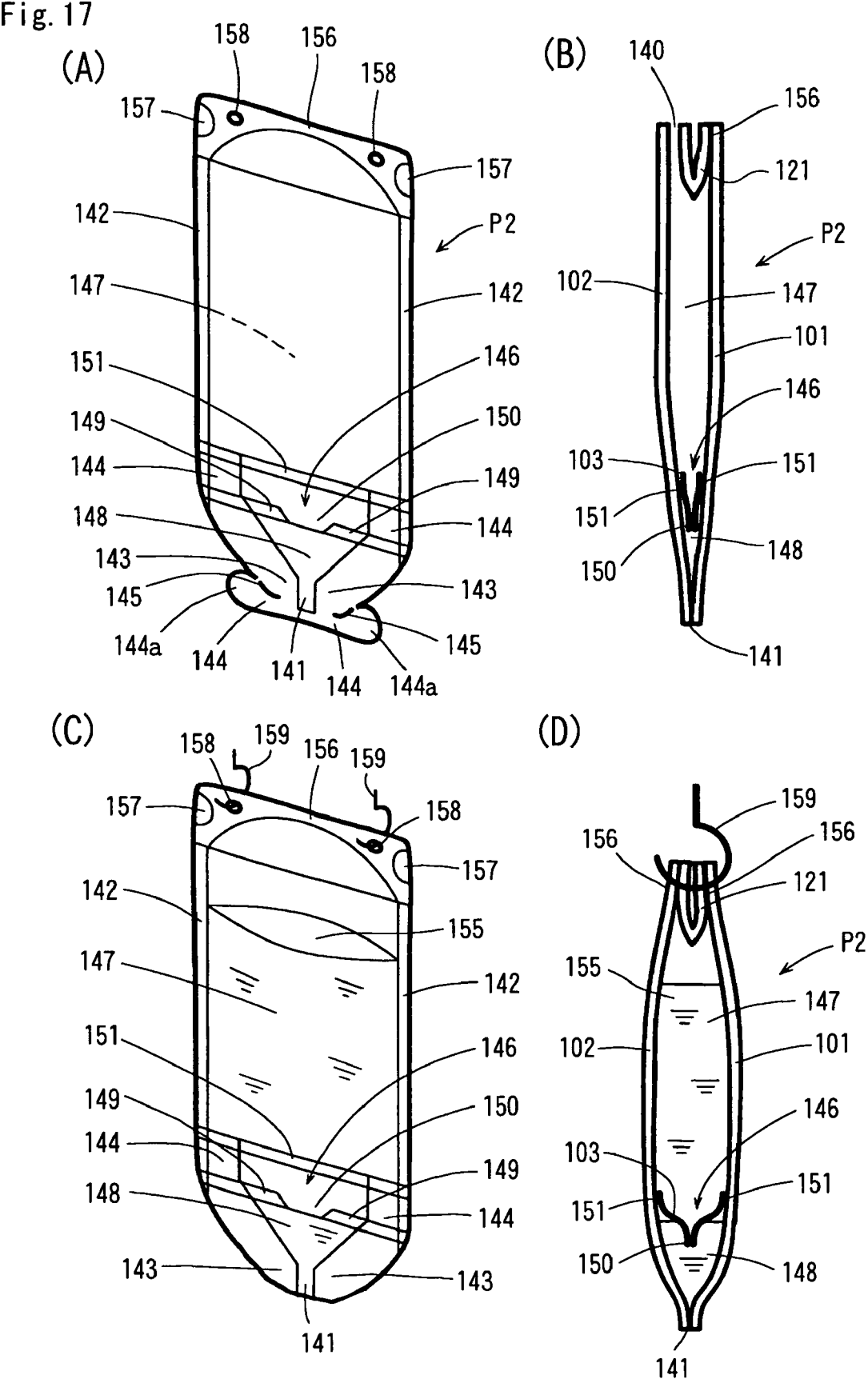
FIGS. 17(A)-(D) are diagrams showing one example of a stand-up type dispenser pouch constituting a concrete example of the pouch of the present invention.

FIG. 17 shows one example of a stand-up type dispenser pouch (hereafter abbreviated to "self-standing pouch") constituting a concrete example of the present invention. FIG. 17 (A) is a perspective view showing one example of the self-standing pouch, FIG. 17 (B) is a longitudinal sectional view of the same, FIG. 17 (C) is a perspective view showing the conditions of use, and FIG. 17 (D) is a longitudinal sectional view of FIG. 17 (C). The self-standing pouch P2 has a construction with a pouring spout 141 similar to that of the flat pouch P1 shown in FIG. 16, except that a folded-back bottom member 21 is inserted and sealed; accordingly, the same parts are labeled with the same symbols, and a redundant description is omitted. In the self-standing pouch P2, as is shown in FIG. 17 (B), the bottom member 121 is welded to the body member 101, but is in an unsealed state with respect to the body member 102, so that a filling opening 140 is formed. After the pouch is filled with the contents 155 via this filling opening 140, the bottom member 121 and body member 102 are welded so that the opening is closed by a bottom seal 156. In regard to the self-standing pouch P2, top and bottom are reversed from the state shown in FIG. 17, so that the pouches can be circulated and displayed in a self-standing state. Considering the pressure resistance of the bottom part in the case of the self-standing state, the bottom seal 156 is treated so as to have a recessed outline as shown in FIG. 17 (A). Furthermore, substantially semicircular bottom member punch holes 157 are formed in both corners of the bottom member 121, and a suspension hole 158 used to attach a hanger 159 is formed in the bottom part.

Figure 18:
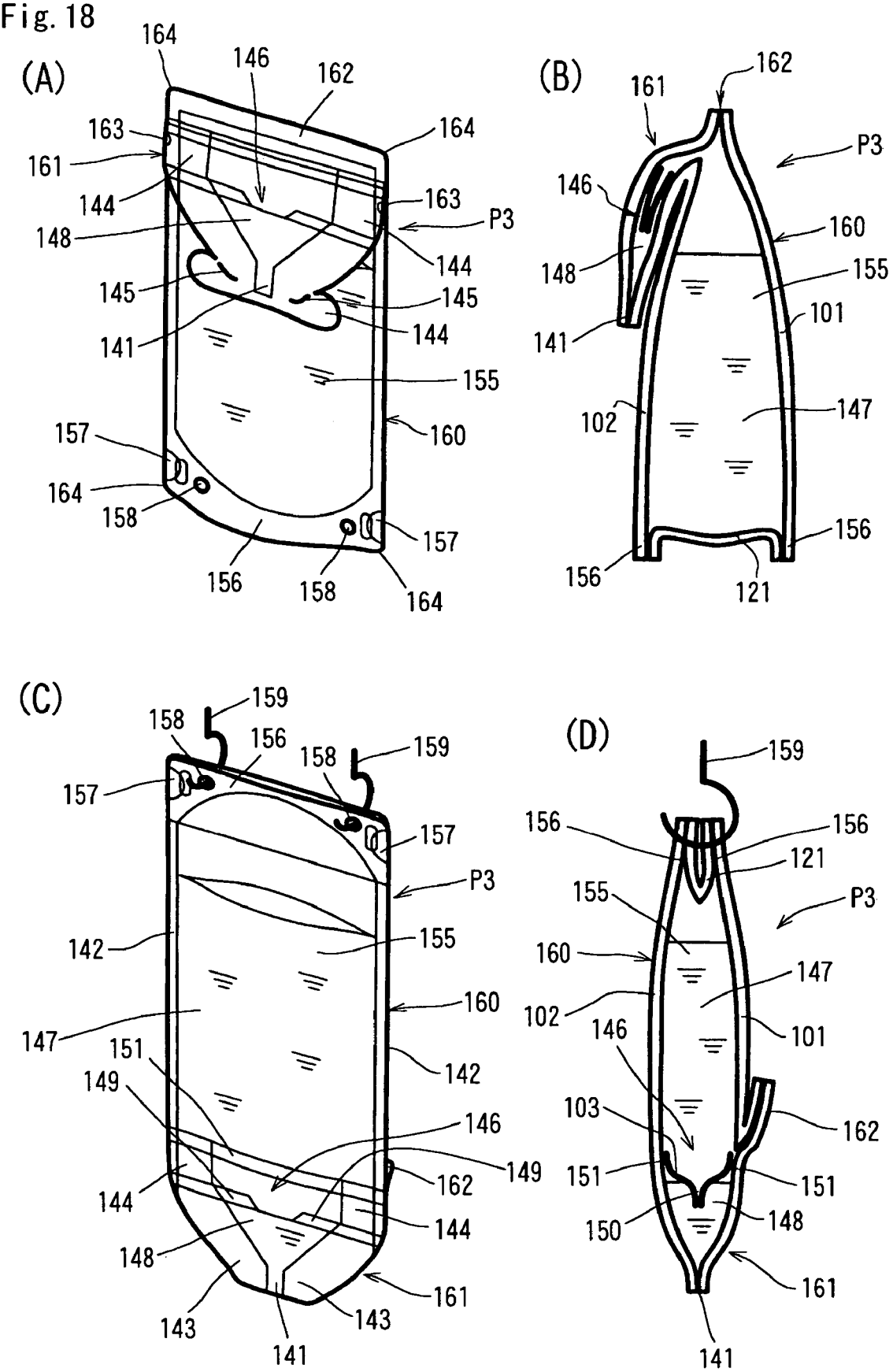
FIGS. 18(A)-(D) are diagrams showing one example of a branched/stand-up type dispenser pouch constituting a concrete example of the pouch of the present invention.

FIG. 18 shows one example of stand-up type dispenser pouch with a branched chamber (hereafter abbreviated to "branched self-standing pouch") constituting a concrete example of the pouch of the present invention. The branched self-standing pouch can be manufactured by the manufacturing method shown in FIGS. 7 through 10; FIG. 18 shows a schematic representation of a case in which this is applied to the heat sealing of the valve member in the branched part to the body members. FIG. 18 (A) is a perspective view of the branched self-standing pouch showing the state following the filling of the pouch with the contents but prior to use, FIG. 18 (B) is a longitudinal sectional view, FIG. 18 (C) is a perspective view showing the subsequent conditions of use, and FIG. 18 (D) is a longitudinal sectional view of FIG. 18 (C). The branched self-standing pouch P3 consists of a pouch main body part 160 in which an accommodating compartment 147 is constructed inside an interior part formed from body members 101 and 102 and a bottom member 121, and a branched part 161 that branches from and is connected to the pouch main body part 160. The structure other than the structure relating to the branched part 161 is the same as the structure of the self-standing pouch P2 shown in FIG. 17; accordingly, members and parts that have the same functions are labeled with the same symbols, and a redundant description is omitted. The branched part 161 is formed with the cooperative action of the valve member 103 and a portion of the body member 102 on the tip of a folded part 162 formed by folding back a portion of the body member 101, and has a structure which has a valve 146 and a metering chamber 148 inside. In the filled state shown in FIGS. 18 (A) and 18 (B), the branched part 161 is temporarily fastened in a suspended state along the pouch main body part 160 by a temporary fastening spot seal 163. During the use of the branched self-standing pouch P3, as is shown in FIGS. 18 (C) and 18 (D), after the temporary fastening spot seal 163 is peeled, the branched part 161 is folded back so that the pouring spout 141 is closed, and the pouch is placed in a suspended state by means of a hanger 159. As in the case of the flat pouch P1 (FIG. 16) and self-standing pouch P2 (FIG. 17), an operation in which the contents 155 are dispensed a small amount at a time can be performed in the ordinary manner from the downward-facing pouring spout 141. The folded part 162 is the part that forms an opened filling opening as a result of the body member 101 being cut at the time of filling with the contents 155; following the filling of the pouch with the contents 155, this part is tightly sealed by being thermally welded, and assumes a state that protrudes from the body member 101 in the suspended state. Furthermore, for reasons of safety, the four corner parts 164 of the pouch are rounded by punch working.

The branched self-standing pouch P4 is tightly sealed by heat sealing the top part 162 of the pouch after the interior of the pouch P3 is filled with the contents from this top part 162 of the pouch. In the branched self-standing pouch P3, a branched part 161 which has a metering chamber 148 and a pouring spout 141 at the tip end is formed by stretching the side walls of the pouch to the outside in a position lower than the top part 162 of the pouch.

The valve 146 disposed inside the branched part 161 is formed by overlapping two film valve members 103; instead of this, however, it would also be possible to demarcate the branched self-standing pouch P3 into an accommodating compartment 147 and a metering chamber 148 by heat sealing the upper end portion and lower end portion of a single film valve to the body members 101 and 102 in mutually different positions. This branched self-standing pouch is shown in FIG. 19, and will be described in detail later.

Furthermore, in regard to the valve 146 that is disposed inside the branched part 161, it would also be possible to form this valve as an inverted V back flow preventing valve in which the up-down orientation is reversed. In this case, the valve members 103 are tightly sealed to each other along their entire width. Furthermore, in the welding of the respective valve members 103 and the body members 101 and 102, the contents can pass through the partitioning member via a valve passage formed between the body members 101 and 102 and the respective valve members 103 by forming a portion in the lateral direction of the pouch as an unwelded part or as an easily peelable welded part.

Figure 19:
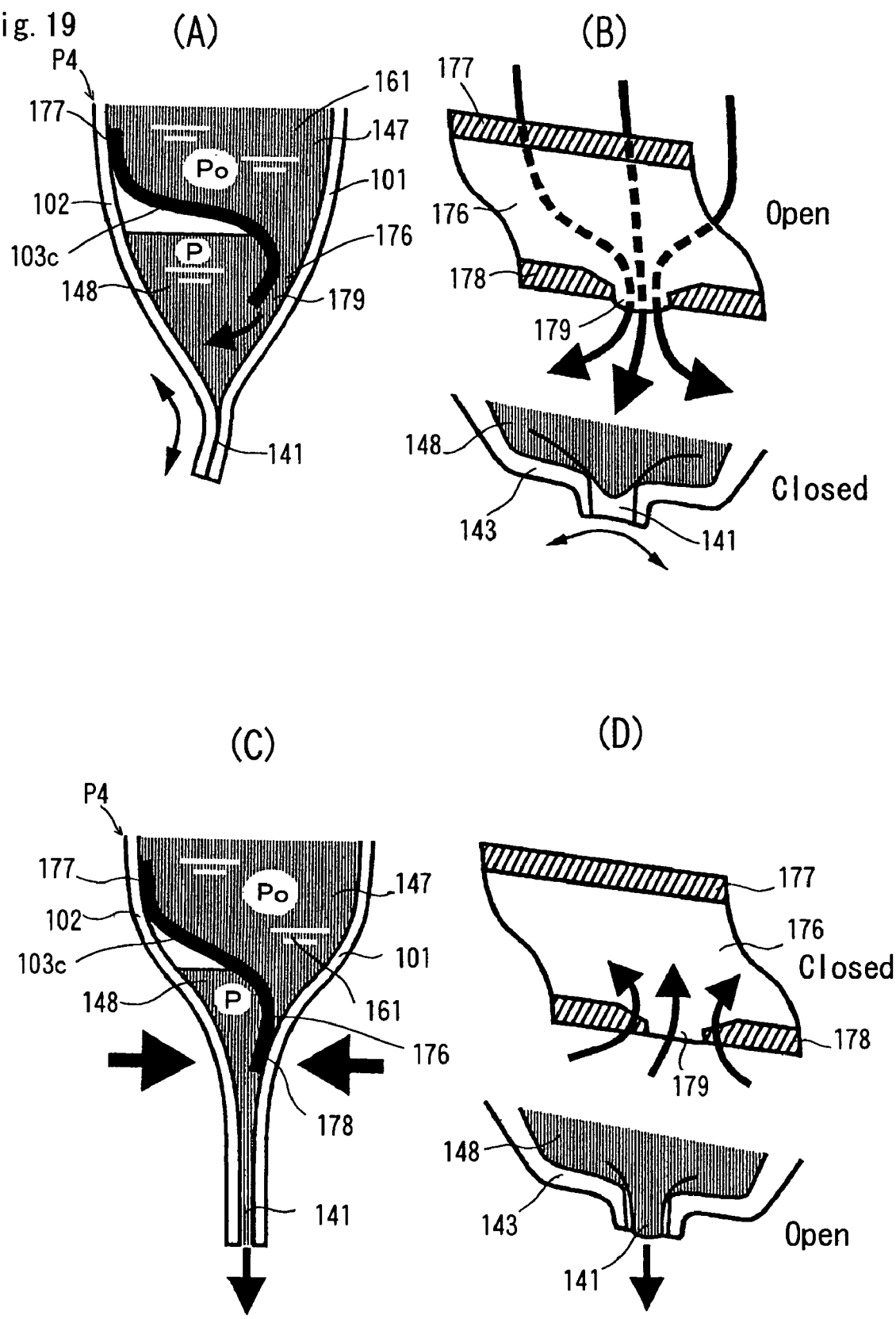
FIGS. 19(A)-(D) are partial enlarged views of one example of a pouch using a valve constituting another embodiment of the present invention.

FIG. 19 shows partial enlarged model diagrams of the metering chamber and the pouring spout in the use state of a branched self-standing pouch using a single film valve. FIGS. 19 (A) and (B) are diagrams showing a state in which the valve is open and the pouring spout is closed, while FIGS. 19 (C) and (D) are diagrams showing a state in which the valve is closed and the pouring spout is open. In the branched self-standing pouch P4 shown in FIG. 19, the upper end portion 177 of a valve 176 consisting of a single film valve member 103c is heat-sealed (preferably tightly sealed) to the body member 102 on one side, while the lower end portion 178 is heat sealed to the body member 101 on the other side, so that the valve as a whole is disposed in an "S" configuration. A valve passage 169 that causes the accommodating compartment 147 and metering chamber 148 to communicate is formed by forming an unsealed part in the central part of the lower end portion of the valve 176. In regard to this unsealed part, this part may be formed as an easy peeling part which is sealed to such an extent that there is no communication prior to the initiation of use. The easy peeling lower end portion 178 is peeled by the pressure of the contents 155 which is elevated inside the accommodating compartment 147 when the pouch main body 160 is pressed from the outside, and the contents 155 can be fed into the metering chamber 148 via the valve passage 179 that is thus formed. The valve passage 179 has a wedge shape, and as the effect of preventing back flow; accordingly, there is no back flow into the accommodating compartment 147 from the metering chamber 148, and this valve has the same function as that of a back flow preventing valve. Conversely, even if the metering chamber 148 is pressed, the tightly sealed upper end portion 177 is not peeled.

For example, when the pouch P4 is stood upright (in order to use the pouch P4) by causing an engaging hole 158 formed in the bottom part of the pouch to engage with an engaging tool such as a hook 159 or the like in the same manners as in FIG. 18 (D), the contents flow into the branched part 161 and pass through the valve passage 179 of the valve 176 so that the metering chamber 148 is filled as shown in FIGS. 19 (A) and 19 (B). In this case, $P \leq Po$, where Po is the internal pressure of the accommodating compartment 147, and P is the internal pressure of the metering chamber 148. Furthermore, since the packaging members that construct the pouch P4 are bent into a V shape by the pressure of the liquid-form contents along the pouring spout seal 143 in the connecting part between the pouring spout 141 and the metering chamber 148, so that the opposite walls that form the pouring spout 141 are caused to adhere tightly to each other, the pouring spout 141 can be endowed with self-closing properties even after the tip end portion of the pouring spout 141 is closed by adjusting the length and width of the pouring spout 141, so that the contents 155 such as a liquid or the like do not flow out.

In order to remove the contents 155 such as a liquid or the like from the pouch P4, the metering chamber 148 is pressed by hand or by means of an implement after the tip end portion of the pouring spout 141 is opened as shown in FIGS. 19 (C) and 19 (D). In this case, since the fold in the pouring spout 141 is eliminated, the pouring spout 141 is opened, and the contents 155 such as a liquid or the like are dispensed. Here, $P > Po$, so that the contents such as a liquid or the like tend to flow back into the accommodating compartment 147 from the metering chamber 148 (FIG. 19 (D)); however, since the valve passage 179 of the valve 176 is in a closed state, the back flow of the contents 155 is prevented, so that all of the contents 155 inside the metering chamber 148 can be dispensed from the pouring spout 141, thus ensuring dispensing stability and superior metering characteristics. When the pressing of the metering chamber 148 is stopped, the contents 155 pass through the valve passage 179 of the valve 176 from the accommodating compartment 147, and fill the metering chamber 148, and the packaging members that form the pouch P4 are bent into a V shape by the pressure of the contents 155 in the connecting part between the pouring spout 141 and the metering chamber 148, so that the facing side walls of the pouring spout 141 are caused to adhere tightly [to each other], thus closing the pouring spout 141.

Since the pouring spouts 33, 41 and 141 of the pouches P1 through P4 are manufactured by the manufacturing methods shown in FIGS. 2 through 6, the cross-sectional shapes of the pouring spouts 3, 33 and 141 and the cross-sectional shapes of the segments cut out from the pouring spouts 3, 33 and 141 are specified shapes that are stipulated by the present invention. Accordingly, even if the pouches are suspended with the pouring spouts 3, 33 and 141 at the bottom after the pouring spouts 3, 33, 141 have been opened, the leakage a small amount at a time of the contents such as a liquid or the like accommodated inside the pouches from the pouring spouts 3, 33 and 141 can be prevented.

In all of the abovementioned pouches P1 through P4, a pair of valve members 103 are sealed to the inside surfaces of body members 101 and 102, and the valve members 103 are also sealed to each other, with a valve passage 150 being left. Furthermore, a single valve member 103c is also sealed to the inside surfaces of the body members 101 and 102. Accordingly, it is necessary that both surfaces of the valve members 103 and 103c be sealable. However, in such valve members 103 and 103c, when the valve members are sealed to the inside surfaces of the respective body members 101 and 102, the opposite surfaces of the valve members 103 are also simultaneously sealed to each other in the case of the valve members 103, while in the case of the valve member 103c, double sealing is performed; accordingly, in both cases, there is a danger that the function as a valve may be lost. However, sealing can be prevented in advance by using a sealing preventing member.

There are no particular restrictions on the contents such as a liquid or the like that are accommodated in the pouch of the present invention; all liquid-form or gel-form contents such as liquid detergents, shampoos, rinses, disinfectant liquids, soy sauce, sauces, ketchup and the like can be appropriately accommodated.

FIG. 20 shows an example in which the pouch of the present invention with a self-closable pouring spout is applied to a self-standing branched pouch equipped with a suspension fitting. FIG. 20 (A) is an overall perspective view, and FIG. 20 (B) is a diagram showing a state in which the self-standing pouch is used while suspended by means of the suspending fitting. Parts and the like that are shared with the construction of the self-standing branched pouch P3 shown in FIG. 18 are labeled with the same symbols, and a redundant description of such parts is omitted. In the self-standing branched pouch P5 shown in FIG. 20, as is shown in FIG. 20 (A), a gusset part 186 is formed in the bottom part of the pouch main body 180, and on the inside of the gusset part 186, band-form suspension means 185 which have a heat-sealable resin layer on both outside surfaces are fastened by heat sealing together with the gusset part 186 to the exposed portion 184 of the heat-sealable resin layer of the multi-layer plastic film forming the pouch main body 180, which is disposed in order to prevent this gusset part 186 in the bottom part from opening. In regard to the band-form suspension means 185, this can also be formed in a configuration in which a weakened part formed by perforated line working or the like, and a cutting initiating part such as a slit which is connected to this weakened part, are formed in the gusset part 186, and a portion is separated from the gusset part 186 in a state in which both ends are connected to the gusset part 186, by cutting the weakened part beginning from the cutting initiating part.

In the self-standing branched pouch P5, the pouch main body 180 and the branched part 161 are partitioned by an easily peelable sealed part 187, and a pouring spout 141 is disposed in the vicinity of the tip end portion of the pouring spout periphery seal 144 of the branched part 161. The pouch main body 180 is filled with liquid contents 155 such as detergents, shampoos, face lotions or the like.

When the self-standing branched pouch P5 is used, the branched part 155 is folded back on an extension line of the pouch main body 180, and the contents 155 filling the pouch main body 180 are pressed with the palm of the hand, so that the easily peelable sealed part 187 partitioning the pouch main body 180 and branched part 161 is ruptured, thus causing both of these parts to communicate. Furthermore, the self-standing branched pouch P5 is stood upright, the suspension means 185 are pulled out, and the pouch P5 is suspended by means of a hook 190 or the like (FIG. 20 (B)). Moreover, in the pouch P5, the pouch is designed so that even if the pouch P5 is suspended, the pouring spout 141 is closed, so that outflow of the contents 155 can be prevented; this is accomplished by selecting the shapes and dimensions of the pouring spout 141 and the tip end portion of the branched part 161. The contents 155 can be removed by pressing the part directly above the pouring spout 141 with the fingers so that the pouring spout 141 is deformed and opened; when this pressing is stopped, the pouring spout 141 is closed.

In the pouch manufacturing method shown in FIGS. 7 through 10, in cases where a bottom part or branched part is formed by folding back at least one body member, the web fold-back method shown in FIGS. 21 through 27 can be used. FIG. 21 shows the conditions of web fold-back according to this web fold-back method; FIG. 21 (A) is a perspective view, FIG. 21 (B) is a plan view, and FIG. 21 (C) is a side view.

For example, the web 201 shown in FIG. 21 is a web used as the bottom member of the self-standing pouch, and consists of a main body part 203 which has a lateral direction center line 202 in the center, and folded-back parts 204, 204 that are continuously connected to both sides of the main body part 203 in the lateral direction. The fold-back of the web 201 is initiated from a fold-back initiation line 205, and this fold-back is completed at a fold-back completion line 206. Prior to reaching the fold-back initiation line 205, the web 201 fed as a flattened flat web running part 207 that has not yet been folded back; the web 201 that has passed the fold-back completion line 206 is fed as a folded-back web running part 208. In the example shown in FIG. 21, especially as shown in FIG. 21 (C), it is assumed that the flat web running part 207 and folded-back web running part 208 are located in a common plane 209; however, these running parts can also be caused to run with an angle applied at the fold-back initiation line 205 and fold-back completion line 206. Furthermore, since the web 201 is a bottom member that is applied on both sides with respect to the center line 202 in the manufacture of self-standing pouches in two rows, this web is cut on both sides of the center line 202 following the manufacture of pouches by joining with the pouch body members.

The region extending from the fold-back initiation line 205 of the web 201 to the fold-back completion line 206 is the fold-back process part 210 (FIG. 21 (C)); here, the folded-back parts 204, 204 on both sides are folded back on the upper side of the main body part 203 toward the center line 202 in the respective main body parts 203. As will be described later, since the length of the pass line is fixed in an arbitrary position in the lateral direction of the web 201, the main body part 203 follows the pass line bent in the opposite direction (downward direction) when the folded-back parts 204, 204 are folded back on the upper side. The folded-back parts 204, 204 are folded back with inside tangential lines taken as the fold-back lines 204b, 204b so that both outside end edges 204a, 204a coincide with the center line 202; accordingly, there is no mutual interference even after the fold-back completion line 206 is passed. When the folded-back parts 204, 204 are folded back, both outside end edges 204a, 204a can follow the pass line in the plane 209 that connects the fold-back initiation line 205 and fold-back completion line 206.

In the fold-back process part 210 extending from the fold-back initiation line 205 to the fold-back completion line 206, the main body part 203 is a part that undergoes only folding; this part is not subjected to any twisting action for the purpose of fold-back. The folded-back parts 204, 204 on both sides of the main body part 203 are subjected to a twisting action for the purpose of fold-back. In the fold-back process part 210, the folded-back parts 204, 204 are folded back at fold-back lines 204b, 204b that extend in the feeding direction of the web 201 so that the length of the pass line S (see FIG. 24) which is the path followed by the portion occupying an arbitrary position in the lateral direction is substantially constant. As a result, there is no generation of slack in the web 201 caused by differences in length of the pass line in the lateral direction of the web 201, and the web 201 can be naturally folded back even without the application of any tension other than the tension used for feeding.

FIG. 22 shows diagrams illustrating one embodiment of a web fold-back method that can be used in the pouch manufacturing method of the present invention. FIG. 22 (A) is a side view of the fold-back process, and FIGS. 22 (B) through 22 (E) are cross-sectional views at the respective positions of b through e in the fold-back process shown in FIG. 22 (A). In the web fold-back process shown in FIG. 22, an outside guide 211 which guides the web from the outside is used. The outside guide 211 applies a positive fold-back action to the folded-back parts 204, 204 on both sides of the web 201, i.e., causes a fold-back force to be applied to the folded-back parts 204, 204 in a direction oriented toward the main body part 203, so that the folded-back parts 204, 204 are folded back over the main body part 203 by this fold-back force. Furthermore, the outside guide 211 has a guide shape in which the length of the pass line of the web 201 is substantially fixed. Accordingly, the outside guide 211 guides the web 201 so that the length of the pass line of a portion occupying an arbitrary position in the lateral direction of the folded-back parts 204, 204 that pass through from the initiation of fold-back (the position of the fold-back initiation line 205 in FIG. 21) to the completion of fold-back (the position of the fold-back completion line 206 in FIG. 21) in the fold-back process is substantially fixed.

When the folded-back parts 204, 204 are folded back, the outside guide 211 acts as a guide that guides the web while applying substantially no tension other than the tension that is required for the feeding of the web 201 to the folded-back parts 204, 204; furthermore, this outside guide 211 also has the function of a former which guides the outsides during the folding back of the web 201, and causes deformation of the web 201 from the flat web running part 207 into the folded-back web running part. Accordingly, the outside guide 211 prevents the generation of elongation or slack caused by differences in the pass length in the web 201, and makes it possible to fold back the web naturally even without applying any special tension other than the tension used for feeding.

As is shown in FIGS. 22 (B) through 22 (E), the outside guide 211 has a fold-back wall whose cross-sectional shape varies according to the running of the web 201. Specifically, in the initial stage of fold-back, the outside guide 211 has a guide wall 212 whose cross-sectional shape shows a shallow inclination as shown in FIG. 22 (B); furthermore, in the intermediate stage of fold-back, the outside guide 211 has a guide wall 213 whose cross-sectional shape shows substantially a right angle as shown in FIG. 22 (C), and further has a guide wall 214 with a shape constricted by a deep cut in from a right angle as shown in FIG. 22 (D), and in the final stage of fold-back, the outside guide 211 has a guide wall 215 with an acutely constricted shape corresponding to the fold-back lines 204b, 204b as shown in FIG. 22 (E). The guide walls 212 through 215 of the outside guide 211 vary continuously and smoothly through the entire process including these cross-sectional positions. The central portion 216 of the outside guide 211 that guides the main body part 203 of the web 201 is formed as a surface in which a flat plate is curved in the longitudinal direction, so that the cross section in the lateral direction is rectilinear.

The folding back of the web 201 is performed in a state in which tension is applied to the web 201 for feeding. When tension is caused to act on the web 201, the main body part 203 which is not folded back, and the folded-back parts 204 with a shallow degree of fold-back which are in positions such as those indicated in FIGS. 22 (B) and 22 (C), are subjected to an effect that causes these parts to float upward from the central portion 216, shallowly inclined guide wall 212 and substantially perpendicular guide wall 213. Accordingly, the main body part 203 of the web 201 can be caused to run along the central portion 216 of the outside guide 211 by disposing a central retaining plate 217 along the central portion 216 of the outside guide 211. In this case, the central retaining plate 217 functions as an inside guide in combination with the outside guide 211. The main body part 203 of th4e web 201 runs through the slight gap 219 that is formed between the central portion 216 and the undersurface 218a of the central retaining plate 217, and the folded-back parts 204 are folded back toward the upper surface 218b of the central retaining plate 217.

Another embodiment of a web fold-back method that can be applied to the pouch manufacturing method of the present invention is shown in FIG. 23. In the method shown in FIG. 23, a web fold-back apparatus equipped with an inside guide is used; FIG. 22 (A) is a perspective view of this web fold-back apparatus, and FIG. 22 (B) is a longitudinal sectional view. In this example, the inside guide 220 comprises a main plate 221 that guides only the bending of the main body part 203, a flat guide plate 222 that extends rearward ("forward and rearward" are hereafter defined according to the feeding direction of the web 1) as an integral part of the main plate 221 on the base end side of the main plate 221 in the web feeding direction, and retaining plates 223 and 234 that are disposed on both the front and rear end portions of the main plate 221.

The main plate 221 is a curved plate in which the cross-sectional shape of the convexly curved guide surface 221a is formed on the basis of a second-order curve; this plate guides the feeding of the main body part 203 of the web 201. The main plate 221 and guide plate 222 are respectively supported by supporting members 229a and 229b which are attached to the machine frame 228 in positions which are such that these parts do not interfere with the folding back of the web 201 on the side of the back surface 221b that is curved in a concave curve. The rear-side retaining plate 223 has a width that is at least the same as the width of the web 201, and faces the guide plate 222 via a gap 225 equivalent to a thickness that allows the passage of the web 201. Accordingly, the web 201 is guided through the gap 225 formed between the guide plate 222 and retaining plate 223.

The retaining plate 224 on the side of the front end is formed in a flattened annular shape that surrounds the front end part of the main plate 221, and a gap 226 that allows the passage of the web 201 is formed around the front end part of the main plate 221. The retaining plate 224 is supported on the machine frame 228 via a supporting member 229c that extends from the supporting member 229a.

The inside guide 220 guides only the bending deformation of the main body part 203 of the web 201, and does not directly guide the folded-back parts 204, 204; however, by causing the bending deformation of the main body part 203, inside guild3e 220 exerts an effect that narrows the folded-back parts 204, 204 in the inside fold-back direction. The retaining plate 224 acts substantially as a former that performs fold-back, and the inside guide 220 performs a guiding function without generating any substantial tension in the web 201 in this case other than the tension used for feeding. The folded-back parts 204, 204 are not directly guided by the inside guide 220 or of course by the other guides either; however, these folded-back parts 204, 204 are folded back in a natural shape without the generation of any substantial tension, and assume a state in which these parts are folded back with sufficient accuracy when they pass over the retaining plate 224. However, the inside guide 220 may also be constructed as an inside guide which has a structure that directly guides the folded-back parts 204, 204 from the inside, i.e., which has a guide surface that is complementary to the guide surface consisting of the guide walls 212 through 215 and central portion 216 of the outside guide 211 as an inside guide part of the outside guide 211 shown in FIG. 22. The length of the pass line of the main plate 221 is set so that this length is the same as the length of the pass line of the folded parts 204, 204.

In the embodiment shown in FIG. 22, at least the folded-back parts 204 of the web 201 are guided from the outside by overall guide surfaces in which the pass line length is fixed, while in the embodiment shown in FIG. 23, the main body part 203 of the web 201 is also guided from the inside by an overall guide surface; however, the folding back of the web can also be guided linearly by means of low-friction guide rods that are disposed so as to extend along a plurality of pass lines of the web, instead of using the abovementioned planar guides. FIG. 24 is a diagram illustrating another embodiment of a web fold-back method that can be applied to the pouch manufacturing method of the present invention. In regard to the fold-back configuration of the web 1, the symbols used in FIG. 21 are used "as is", and a redundant description is omitted. The guide 230 used in the web fold-back process shown in FIG. 24 consists of a plurality of guide rods 230a through 230j which extend along pass lines of the web 201, and in all of which the length from the initiation of fold-back to the completion of fold-back is set at a fixed value. It is desirable that the guide rods be disposed more densely as the cross-sectional variation in the lateral direction of the web 201 increases in the case of fold-back. The portions of the web 201 that are not directly guided by the guide rods 230a through 230j are folded back and deformed in conformity to the guide rods 230a through 230j. Furthermore, instead of guide rods, it would also be possible to dispose a plurality of rollers in a plurality of pass lines with these rollers spaced in the longitudinal direction on the respective pass lines, and to guide the web 201 at a plurality of point-form positions on the surface.

FIG. 25 shows diagrams illustrating the determination of the shape of the guide such as the outside guide 211 in particular. FIG. 25 (A) is a perspective view, FIG. 25 (B) is a view seen in the plane connecting the fold-back initiation line and fold-back completion line, and FIG. 25 (C) is a side view. In regard to the fold-back configuration of the web 201, the symbols used in FIG. 21 are used "as is", and a redundant description is omitted. The shape of the pass line in portions occupying an arbitrary position in the lateral direction constructing the folded-back parts 204 of the web 201 can be determined by synthesizing a cosine curve and a second-order curve under the condition of a fixed pass line length. Specifically, as has already been described, the pass line S1 followed by the end edges 204a of the fold-back parts 204 of the web 201 lies on a plane 209 that connects the fold-back initiation line 205 and the fold-back completion line 206; the shape of the pass line S1 is determined as a shape that conforms to a cosine curve (Equation 1) on this plane. Here, wm is the fold-in width of the web 201.

[Equation 1]

In this case, the length s1 of the pass line S1 is expressed by the following equation (Equation 2).

[Equation 2]

Here, E(m) indicates completely elliptical integration of the second type, $E(0)=\pi/2 \cong 1.57$, and $E(1)=1$. The pass line S2 where the main body part 203 of the web 201 passes through points P and Q is determined as a pass line that conforms to the following second-order curve (Equation 3) from the conditions that z=hm when x=0, and z=0 when X=L.

[Equation 3]

The length s2 of the pass line S2 is determined by the integration of the following Equation 4.

[Equation 4]

If this is applied so that x=2 hm/L is sufficiently smaller than 1, and is approximately 0.2 or less, then the error can be sufficiently reduced even if the equation up to the third term is a approximated by subjecting sin h−1(x) to a series expansion.

[Equation 5]

If this approximation is used, hm that establishes s1=s2 can be expressed by Equation 6.

[Equation 6]

If another pass line S3 between the pass line S1 and pass line S2 is expressed as xyz coordinates using the parameter t, this can be expressed by the following Equation 7.

[Equation 7]

The length s3 of the pass line S3 is determined by the integration expressed by Equation 8.

[Equation 8]

The value of h at which s1=s3 is determined for an arbitrary w in the range of 0≦w≦wm, and the curve S3 can be determined from the value of h thus obtained.

Thus, in regard to the pass lines of the folded-back parts 204 of the web 201, the lengths of the pass lines for parts occupying any position in the lateral direction of the folded-back parts 204 of the web 201 can be caused to coincide with sufficient accuracy by determining the pass lines S1 and S2 with the connecting portion 204b of the respective sides of the folded-back parts 204 in the lateral direction, i.e., the end edge 204a of the web 201 and the main body part 203 of the web 201 that is subjected only to bending, and determining the pass line S3 of other portions of the folded-back parts 204 on the basis of both of these pass lines S1 and S2, so that the guide thus obtained is a guide that is sufficiently suitable for practical use.

In the abovementioned embodiment, folded-back parts 204, 204 were disposed on both sides of the web 201; however, it is not absolutely necessary to fold back the web on both sides; it would also be possible to fold back the web on only a single side. For example, even in the case of the same self-standing pouch, a pouch with a branched chamber with a dispenser function that can dispense a small amount of the contents at a time has a construction in which a web that has only one side folded back is joined by sealing to the body members, and this can be applied to the folding back of such a web. Furthermore, the folding back of a bottom member used in the manufacture of a standing pouch with a self-standing function was described; in addition, however, it is clear that this can also be applied to the manufacture of packaging members such as pouches and the like seen in the fold-back of webs used for gazette molding in gazette pouches, the fold-back of webs used to manufacture pouches with three-way sealing and the like, and the manufacture of stationery, miscellaneous articles for daily use and the like that are molded by folding back webs such as paper or film webs or the like.

Figure 26:
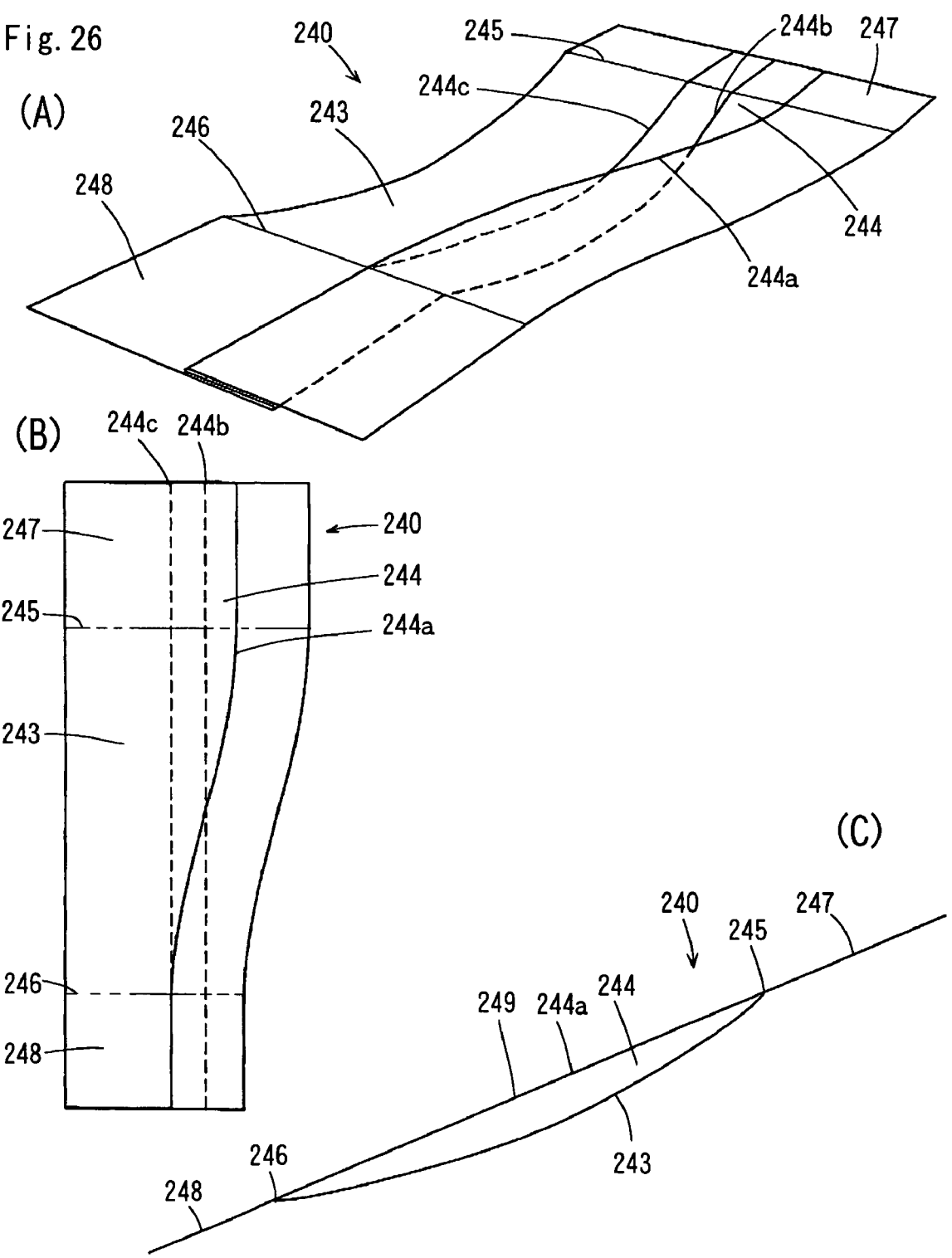
FIGS. 26(A)-(C) are diagrams showing another configuration of web fold-back to which the web fold-back method of the present invention is applied.
Figure 27:
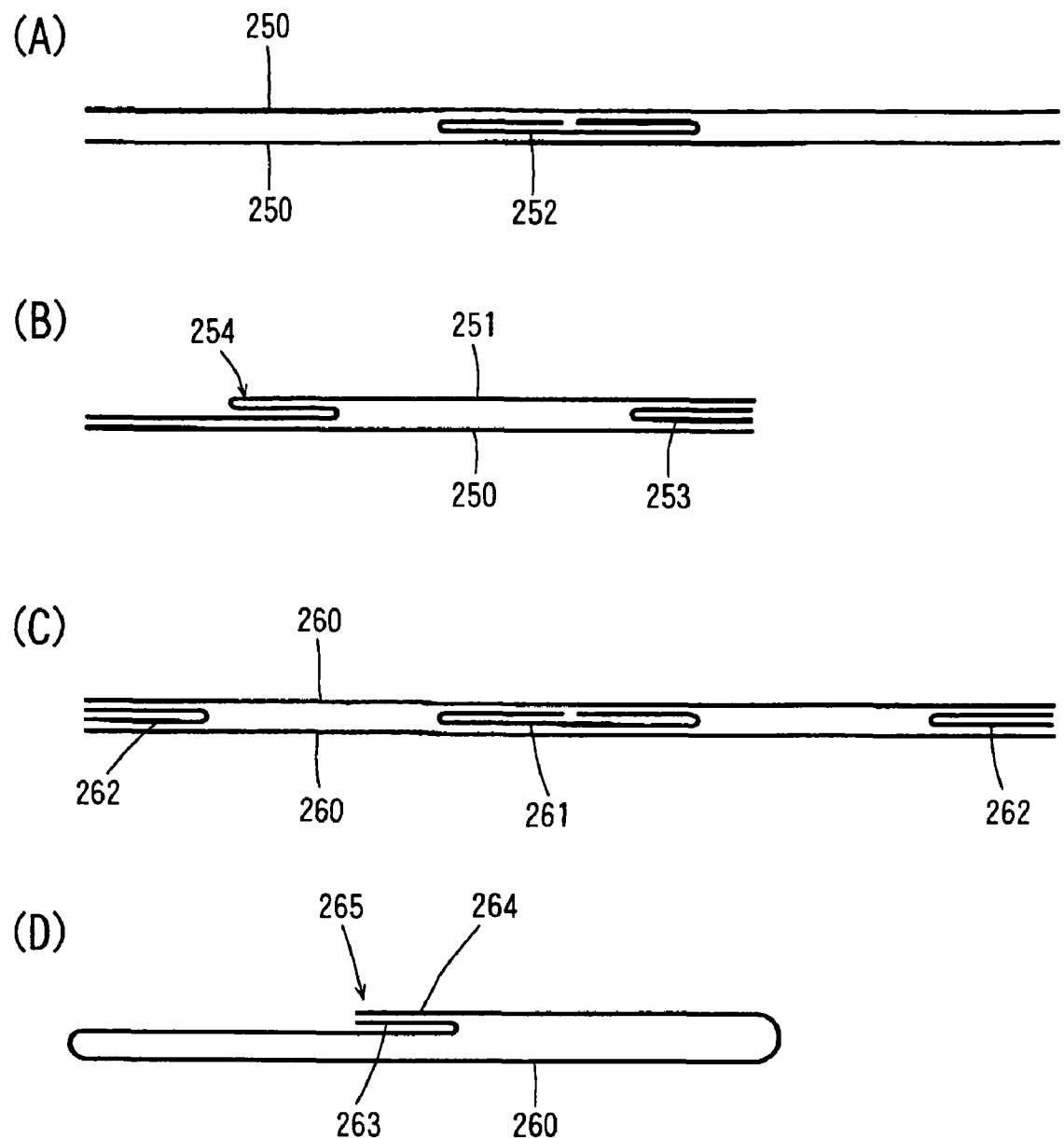
FIGS. 27(A)-(D) are sectional views showing an outline of a pouch or bag manufacturing process to which the web fold-back method of the present invention is applied.

Another fold-back configuration based on the web fold-back method used in the pouch manufacturing method of the present invention is shown in FIGS. 26 and 27. FIG. 26 shows diagrams that illustrate another web fold-back configuration; FIG. 26 (A) is a perspective view, FIG. 26 (B) is a plan view, and FIG. 26 (C) is a side view. The fold-back configuration of the web 240 shown in FIG. 26 is a configuration in which a portion of the web 240 forming the body member of a branched pouch is folded double in a pleated state for the purpose of forming a filling opening separately from the pouring spout or the like in the process of manufacture of the branched pouch. In this fold-back configuration, both sides of the web 240 are not folded back; instead, only a folded-back part 244 on one side is folded back onto the main body part 243. The folded-back part 244 is folded back along the fold-back line 244b while being conveyed from the fold-back initiation line 245 which is the end point position of the flat web running part 247 to the fold-back completion line 246 so that the folded-back edge parts 244a meet on a virtual symmetrical line 244c enclosing the fold-back line 244b; this folded-back part 244 is then further conveyed as the folded-back web running part 248. In this example, the flat web running part 247 and folded-back web running part 248 are present in the same plane 249. A filling opening used to fill the pouch with the contents is formed by unfolding and cutting open the folded-back edge parts 244a in a subsequent process.

Furthermore, FIG. 27 comprises sectional views that show an outline of the manufacturing process in a pouch manufacturing method in which folding back of the web is used. FIG. 27 (A) is a sectional view showing a case in which an ordinary self-standing pouch is manufactured; here, the folding back of the web is applied to the folding back of a bottom member 252 that is clamped between a pair of body members 250, 250 when pouches are manufactured in two rows on the left and right. FIG. 27 (B) is a sectional view showing a case in which a self-standing branched pouch is manufactured; this web fold-back is applied to the folding back of a bottom member 253 that is clamped between a pair of body members 250 and 251, and to the folding back that is performed when a branched part 254 disposed on one of the body members 251 is formed. Furthermore, FIG. 27 (C) is a sectional view showing a case in which a gazette pouch is manufactured in two rows; here, the folding back of the web is applied to the folding back of gazette members 261, 262, 262 that are clamped between a pair of body members 260, 260. In addition, FIG. 27 (D) is a sectional view showing a case in which a pouch with a back-bonded type three-way seal is manufactured; here, the folding back of the web is applied to the folding back of one end edge portion 263 in order to form a back-bonded part 265 by bonding together both end edge portions 263 and 264 of the body members 260 in the form of joined palms.

In the folding back of the web that is used in the pouch manufacturing method of the present invention, the folded-back parts of the web can be folded back smoothly without applying any substantial tension other than the tension used for feeding of the web. Accordingly, even in the case of materials with an extremely small elongation such as plastic films, papers or the like on which metal foils such as aluminum foil or the like are laminated, which have been difficult to fold back in the past, can be folded back smoothly and with a favorable appearance. Furthermore, in regard to guiding, it is possible to form a gap through which the web 1 can pass while being guided using not only an outside guide or inside guide alone, but using both an outside guide and an inside guide. In addition, in regard to the type of guide used as well, an inside guide and outside guide can be appropriately combined.

INDUSTRIAL APPLICABILITY

Thus, the pouch of the present invention equipped with a self-closable pouring spout makes it possible to dispense the contents in a metering chamber a small amount at a time from the pouring spout by pressing these contents or the like. At the same time, even if the pouch is suspended following the opening the pouring spout so that the pouring spout is at the bottom, the contents such as a liquid or the like accommodated inside the pouch can be securely prevented from leaking out a small amount at a time from the pouring spout, so that the pouch of the present invention is useful as a pouch with a self-closable pouring spout.

Furthermore, in the pouch manufacturing method of the present invention, the heat-sealed part and non-heat-sealed part of the self-closable pouring spout are also uniformly pressed in the boundary area between these parts. Accordingly, in the manufacture of the pouch, a closed state in which the inside surfaces of the films that form the portion of the boundary area between the heat-sealed part and non-heat-sealed part of the pouring spout passage located on the side of the non-heat-sealed part contact each other with no gap can be securely obtained.

Furthermore, in the pouch manufacturing method of the present invention, pouches can be continuously manufactured from web-form body members in a state in which the top-bottom directions of these pouches are caused to intersect with the conveying direction of the body members. In this case, web-form valve members that are heat-sealable on both sides are conveyed in accordance with the conveying of the body members, and the body members and valve members are thermally welded in a state in which a sealing preventing member is interposed on the side of the valve members along which the contents pass through; accordingly, the valve members are thermally welded to the body members while these valve members are conveyed in accordance with the conveying of the web-form body members; however, since the valve members have a valve function such as a back flow preventing function or the like, the thermal welding of the valve members to each other or to the portions of the body members where thermal welding is to be avoided can be securely avoided, which is extremely useful from the standpoint of continuously manufacturing pouches that have such a valve function.

Furthermore, in the pouch manufacturing method of the present invention, in order to form branched parts in pouches, a method is used in which at least one side part of a web-form body member is folded back at a fold-back line that runs along the feeding direction of this body member, and a guiding action is performed by a guide so that the pass line length of a portion occupying an arbitrary position in the lateral direction of the body member passing through is substantially fixed from the initiation of fold-back up to the completion of fold-back; accordingly, natural and favorable folding back in which there is no generation of slack in the web or wrinkles based on such slack can be accomplished, and pouches such as self-standing pouches that have a branched part can be manufactured as pouches with a good appearance and high commercial value can be manufactured without distortion of the shape and without generating any incomplete sealing.

The invention claimed is:

1. A pouch, comprising:
   a self-closable pouring spout defined by a boundary area between heat-sealed parts and a non-heat sealed part, said non-heat sealed part forming a pouring spout passage,
   a metering chamber that communicates with said self-closable pouring spout, and
   a handle provided in the lower part of said self-closable pouring spout and adapted to be removable by cutting or tearing,
   wherein when said self-closable pouring spout is in a closed state, no gap is present between inside surfaces of plastic films contacting each other at a non-heat sealed side of said boundary area,
   wherein the pouch is produced by a process comprising heat sealing said plastic films while uniformly pressing said plastic films in the boundary area between said heat sealed parts and said non-heat sealed part,
   wherein said plastic films are heat-sealed by pressing and heating using a heat sealing head equipped with heating pressing members in regions corresponding to said heat-sealed parts and a cooling member in a region corresponding to said non-heat-sealed part,
   wherein said cooling member is disposed between said heating pressing members, and
   wherein said cooling member pressurizes said plastic films to form said non-heat sealed part wherein when said self-closable pouring spout is in an open state, in a portion of said self-closable pouring spout from said boundary area to a point that is separated from said boundary area by a distance equivalent to the thickness of one of said plastic films, each of said plastic films have a cross-sectional shape which is a rectilinear shape or a convex shape with respect to an interior of said pouring spout passage, and
   wherein when said self-closable pouring spout is in the open state, an angle of greater than 0 degrees but less than or equal to 20 degrees or less is formed by tangent lines of said inside surfaces of said plastic films, said tangent lines passing through said boundary area.

2. The pouch according to claim 1, wherein said cooling member of said heat sealing head further comprises a flow passage for coolant.

3. The pouch according to claim 2, wherein said cooling member further comprises a heat exchanger connected to said flow passage.

* * * * *